US010165603B2

(12) United States Patent
Shao et al.

(10) Patent No.: US 10,165,603 B2
(45) Date of Patent: Dec. 25, 2018

(54) COLLISION DETECTION DEVICE, COMMUNICATION DEVICE, COLLISION DETECTION METHOD, AND PROGRAM

(71) Applicant: NEC Communication Systems, Ltd, Tokyo (JP)

(72) Inventors: Peng Shao, Tokyo (JP); Akira Matsumoto, Tokyo (JP); Ikumi Wada, Tokyo (JP); Yuki Baba, Tokyo (JP)

(73) Assignee: NEC Communication Systems, Ltd., Tokyo (JP)

( * ) Notice: Subject to any disclaimer, the term of this patent is extended or adjusted under 35 U.S.C. 154(b) by 126 days.

(21) Appl. No.: 15/032,149

(22) PCT Filed: Sep. 5, 2014

(86) PCT No.: PCT/JP2014/004575

§ 371 (c)(1),
(2) Date: Apr. 26, 2016

(87) PCT Pub. No.: WO2015/063993

PCT Pub. Date: May 7, 2015

(65) Prior Publication Data

US 2016/0262049 A1 Sep. 8, 2016

(30) Foreign Application Priority Data

Oct. 28, 2013 (JP) ................................ 2013-223060
Feb. 14, 2014 (JP) ................................ 2014-026462

(51) Int. Cl.
*H04W 4/00* (2018.01)
*H04W 74/08* (2009.01)
(Continued)

(52) U.S. Cl.
CPC ........... *H04W 74/0858* (2013.01); *H04L 1/00* (2013.01); *H04L 69/22* (2013.01); *H04L 69/324* (2013.01);
(Continued)

(58) Field of Classification Search
CPC .................................................... H04W 24/08
See application file for complete search history.

(56) References Cited

U.S. PATENT DOCUMENTS

2004/0052209 A1* 3/2004 Ortiz ..................... H04L 43/026 370/230
2005/0286465 A1* 12/2005 Zhuang ................. H04L 5/0007 370/329
(Continued)

FOREIGN PATENT DOCUMENTS

JP 09-064884 A 3/1997
JP H11-252080 A 9/1999
(Continued)

OTHER PUBLICATIONS

International Search Report corresponding to PCT/JP2014/004575, dated Nov. 25, 2014 (3 pages).
(Continued)

*Primary Examiner* — Farah Faroul
(74) *Attorney, Agent, or Firm* — Wilmer Cutler Pickering Hale and Dorr LLP

(57) ABSTRACT

A transmission part transmits a packet by radio. A power detection part performs, at a given cycle, sampling of power of a spatial radio signal in a packet transmission period during which the transmission part transmits the packet. A collision detection part calculates, as an index value, at least one of the average value and the degree of variation of power of the spatial radio signal in the packet transmission period on the basis of sampled data obtained in the sampling by the power detection part. The collision detection part also determines a reference value on the basis of transmission power of the packet. The collision detection part detects whether or not collision of the packet is present by comparing the index value with the reference value.

17 Claims, 41 Drawing Sheets

(51) Int. Cl.

| | |
|---|---|
| ***H04L 29/06*** | (2006.01) |
| ***H04L 29/08*** | (2006.01) |
| ***H04W 24/08*** | (2009.01) |
| ***H04L 1/00*** | (2006.01) |
| ***H04W 52/28*** | (2009.01) |
| *H04L 5/00* | (2006.01) |
| *H04W 52/26* | (2009.01) |
| *H04W 84/12* | (2009.01) |

(52) U.S. Cl.
CPC ......... *H04W 24/08* (2013.01); *H04W 52/286* (2013.01); *H04W 74/0825* (2013.01); *H04L 5/0048* (2013.01); *H04W 52/265* (2013.01); *H04W 84/12* (2013.01)

(56) References Cited

U.S. PATENT DOCUMENTS

2007/0206523 A1* 9/2007 Huynh .................. H03G 3/001 370/318
2007/0274201 A1* 11/2007 Kawasaki ........... H04L 27/2614 370/203
2008/0144493 A1* 6/2008 Yeh ....................... H04W 52/50 370/230
2009/0291692 A1* 11/2009 Kazmi .................. H04W 16/04 455/452.2
2010/0195553 A1* 8/2010 Myers ....................... H03J 7/02 370/311
2010/0201564 A1* 8/2010 Foster ..................... G01S 7/411 342/159
2012/0195212 A1* 8/2012 Zhang ............... H04W 72/1215 370/252
2012/0320759 A1 12/2012 Shao et al.
2014/0001879 A1* 1/2014 Van Wageningen ... G01R 21/00 307/104

FOREIGN PATENT DOCUMENTS

JP 2004-193987 A 7/2004
JP 2007-096902 A 4/2007
JP 2008-167200 A 7/2008
JP 2013-005097 A 1/2013

OTHER PUBLICATIONS

Japanese Office Action issued in corresponding Japanese Patent Application No. 2015-544770, dated Feb. 28, 2017, 6 pages.

* cited by examiner

FIG. 2

115 TRANSMISSION PARAMETER STORAGE PART

| TRANSMISSION POWER | STARTING TIME OF TRANSMISSION | ENDING TIME OF TRANSMISSION |
|---|---|---|
| W1 | t1 | t2 |
| W1 | t3 | t4 |
| W2 | t5 | t6 |
| ⋮ | ⋮ | ⋮ |

FIG. 3

125 SAMPLED DATA STORAGE PART

| SAMPLED DATA | SAMPLING TIME |
|---|---|
| SD1 | ST1 |
| SD2 | ST2 |
| SD3 | ST3 |
| ⋮ | ⋮ |

FIG. 4

126 THRESHOLD STORAGE PART

| TRANSMISSION POWER | THRESHOLD A |
|---|---|
| W1 | Tha |
| W2 | Thb |
| W3 | Thc |
| ⋮ | ⋮ |

FIG. 6

126b THRESHOLD STORAGE PART

| TRANSMISSION POWER | THRESHOLD A | THRESHOLD b |
|---|---|---|
| W1 | Tha | Thx |
| W2 | Thb | Thy |
| W3 | Thc | Thz |
| ⋮ | ⋮ | ⋮ |

(+P) : PULSE WHICH IS LARGER THAN Th3
(−P) : PULSE WHICH IS SMALLER THAN −Th3

(+P) : PULSE WHICH IS LARGER THAN Th3
(−P) : PULSE WHICH IS SMALLER THAN −Th3

(+P) : PULSE WHICH IS LARGER THAN Th3
(−P) : PULSE WHICH IS SMALLER THAN −Th3

(+P) : PULSE WHICH IS LARGER THAN Th3
(−P) : PULSE WHICH IS SMALLER THAN −Th3

COLLISION DETECTION DEVICE, COMMUNICATION DEVICE, COLLISION DETECTION METHOD, AND PROGRAM

CROSS-REFERENCE TO RELATED APPLICATIONS

This application is a national stage application of International Application No. PCT/JP2014/004575 entitled "Collision Detection Device, Communication Device, Collision Detection Method, and Program," filed on Sep. 5, 2014, which claims priority to Japanese Patent Application No. 2013-223060, filed on Oct. 28, 2013, and Japanese Patent Application No. 2014-026462, filed on Feb. 14, 2014. The disclosures of each which are hereby incorporated by reference in their entirety.

TECHNICAL FIELD

The present invention relates to a collision detection device detecting packet collision, a communication device, a collision detection method, and a program.

BACKGROUND ART

In recent years, a wireless LAN (WLAN) employing IEEE802.11 has become popular rapidly as wireless equipment such as a smartphone and a mobile router has increased. When a plurality of wireless LAN communications are concentrated and performed close to each other, many users share an available frequency resource and hence there arises a problem that mutual communication interference occurs. In IEEE802.11, the CSMA/CA (Carrier Sense Multiple Access/Collision Avoidance) method is used for the purpose of suppression of interference between WLAN devices. In the CSMA/CA method, a terminal performs carrier sensing of a channel always before transmission and starts transmission after confirming the channel is not being used.

However, packet collision cannot be avoided completely by the CSMA/CA method. One reason is that even if it is determined in carrier sensing that a channel to be used for communication is available, packet collision occurs when a plurality of users start communication at the same timing. The other reason is that when the power of a transmission signal of another user is weaker than a detection threshold, the presence of the packet cannot be detected in carrier sensing. Herein, a packet is the unit of transmitted/received data handled in the data link layer of the seven layers of the OSU model.

Thus, there is a problem that it is impossible to determine whether a failure of packet transmission results from collision with an interference signal such as a packet transmitted by another terminal or results from attenuation of signal power depending on a radio wave propagation distance and it is impossible to take proper measures against transmission failures due to different causes. In view of the problems of a wireless LAN employing IEEE802.11, there is a need to detect packet collision, which is one of the causes of transmission failures, in order to take proper measures against transmission failures.

As a technique for detecting packet collision, the following technique is known (see Patent Document 1, for example). According to the technique disclosed in Patent Document 1, a transmission device transmits packets at given intervals, and a reception device detects reception power during a packet reception period and obtains an average value H1 thereof. After that, the reception device calculates a difference $\Delta H=(H1-H2)$ between the average value H1 in the current reception period and an average value H2 in the last reception period, and compares the difference $\Delta H$ with a predetermined threshold Th. In a case where the difference $\Delta H$ is equal to or more than the threshold Th, the reception device determines that packet collision is occurring in the current reception time. In a case where the difference $\Delta H$ is less than the threshold Th, the reception device determines that packet collision is not occurring.

Patent Document 1: Japanese Unexamined Patent Application Publication No. JP-A 2008-167200

In a case where transmission power in a transmission device is fixed, it is possible to correctly determine whether or not packet collision is occurring by the technique disclosed in Patent Document 1. However, according to the technique disclosed in Patent Document 1, it is determined whether or not packet collision is occurring, on the basis of whether the difference $\Delta H$ between the average value H1 of reception power in the current reception period and the average value H2 of reception power in the last reception period is equal to or more than the predetermined threshold Th. Thus, there is a problem that a current determination result cannot be obtained in a case where transmission power in a transmission device changes.

For example, in a case where transmission power in the transmission device increases and the average H1 during the current reception period increases by the threshold Th or more from the average value H2 during the last reception period, it is determined that packet collision is occurring even if packet collision is not occurring. Moreover, in a case where transmission power in the transmission device decreases, it may be determined that packet collision is not occurring though packet collision is occurring. These problems occur in the case of using a transmission device which has a power control function of switching transmission power on the basis of the strength of a signal transmitted from the other party of communication, a packet loss rate and so on, or a transmission device which has a function of switching transmission power in accordance with a setting operation by the user.

SUMMARY

Accordingly, an object of the present invention is to provide a collision detection device which solves an issue that it is impossible to correctly detect whether or not packet collision is present in a case where transmission power in a transmission device changes.

A collision detection device according to the present invention is a collision detection device in a communication device having a transmission device transmitting a packet by radio. The collision detection device detects collision of the transmitted packet with another packet. The collision detection device includes:

a power detection part performing, at a given cycle, sampling of power of a spatial radio signal in a packet transmission period during which the transmission device transmits the packet; and a collision detection part calculating, as an index value, at least one of an average value and a degree of variation of power of the spatial radio signal in the packet transmission period on a basis of sampled data obtained in the sampling, and also determining a reference value on a basis of transmission power of the packet, and detecting whether or not collision of the packet is present by comparing the index value with the reference value.

A communication device according to the present invention includes:

a transmission part transmitting a packet by radio;

a power detection part performing, at a given cycle, sampling of power of a spatial radio signal in a packet transmission period during which the transmission part transmits the packet; and a collision detection part calculating, as an index value, at least one of an average value and a degree of variation of power of the spatial radio signal in the packet transmission period on a basis of sampled data obtained in the sampling by the power detection part, and also determining a reference value on a basis of transmission power of the packet, and detecting whether or not collision of the packet is present by comparing the index value with the reference value.

A collision detection method according to the present invention is a packet collision detection method executed by a communication device transmitting a packet by radio. The packet collision detection method includes:

performing sampling of power of a spatial radio signal in a packet transmission period during which the packet is transmitted;

calculating, as an index value, at least one of an average value and a degree of variation of power of the spatial radio signal in the packet transmission period on a basis of sampled data obtained in the sampling;

determining a reference value on a basis of transmission power of the packet; and detecting whether or not collision of the packet with another packet is present by comparing the index value with the reference value.

A program according to the present invention includes instructions for causing a computer to function as:

a transmission part transmitting a packet by radio;

a power detection part performing, at a given cycle, sampling of power of a spatial radio signal in a packet transmission period during which the transmission part transmits the packet; and a collision detection part calculating, as an index value, at least one of an average value and a degree of variation of power of the spatial radio signal in the packet transmission period on a basis of sampled data obtained in the sampling by the power detection part, and also determining a reference value on a basis of transmission power of the packet, and detecting whether or not collision of the packet is present by comparing the index value with the reference value.

According to the present invention, it is possible to correctly detect whether or not packet collision is present in a case where transmission power in a transmission device changes.

BRIEF DESCRIPTION OF DRAWINGS

FIG. 2 is a diagram showing an example of the content of a transmission parameter storage part in the communication device according to the first exemplary embodiment of the present invention;

FIG. 3 is a diagram showing an example of the content of a sampled data storage part in the communication device according to the first exemplary embodiment of the present invention;

FIG. 4 is a diagram showing an example of the content of a threshold storage part in the communication device according to the first exemplary embodiment of the present invention;

FIG. 6 is a diagram showing an example of the content of a threshold storage part used in a second exemplary embodiment of the present invention;

EXEMPLARY EMBODIMENTS

Figure 1:
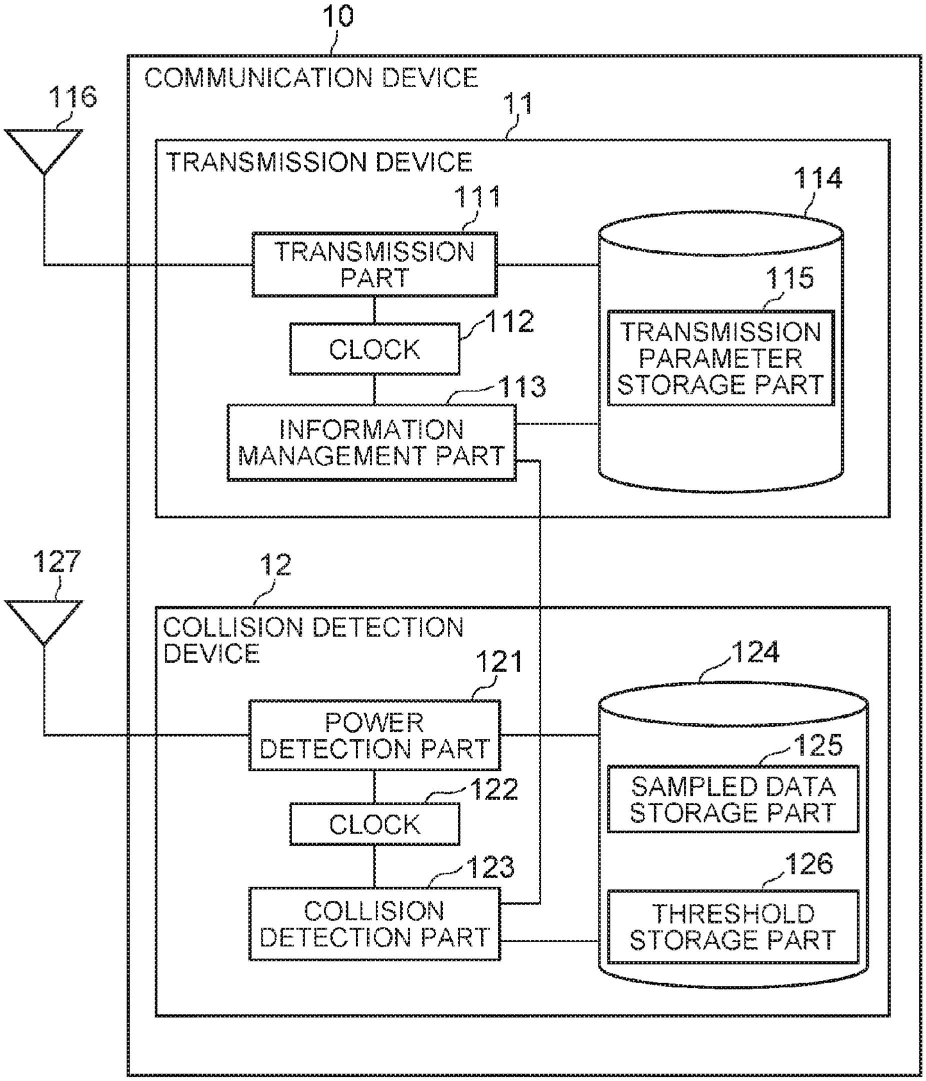
FIG. 1 is a block diagram showing an example of the configuration of a communication device according to a first exemplary embodiment of the present invention.

Next, exemplary embodiments of the present invention will be described in detail referring to the drawings.

[First Exemplary Embodiment of the Present Invention]

Referring to FIG. 1, a communication device 10 according to a first exemplary embodiment of the present invention includes a transmission device 11 and a collision detection device 12.

The transmission device 11 transmits a communication packet (may be simply referred to as a packet) in conformity with IEEE802.11. The transmission device includes a transmission part 111, a clock 112, an information management part 113, a storage device 114 such as a disk device or a semiconductor memory, and an antenna 116.

The storage device 114 is provided with a transmission parameter storage part 115. In the transmission parameter storage part 115, transmission parameters including the transmission power, starting time of transmission and ending time of transmission of each transmitted packet are recorded. FIG. 2 is a diagram showing an example of the content of the transmission parameter storage part 115. The transmission parameter storage part 115 in this example has a plurality of rows. On each of the rows, the transmission power, starting time of transmission and ending time of transmission of a transmitted packet are recorded. For example, a first row shows that transmission of a packet is started with transmission power W1 at time t1 and transmission of the packet ends at time t2.

The transmission part 111 has a function of transmitting a packet by using a selected communication frequency channel, a function of changing transmission power on the basis of an setting operation by the user, the strength of a signal transmitted from the other party of communication, a packet loss rate and so on, and a function of recording the transmission parameters of each transmitted packet into the transmission parameter storage part 115. The clock 112 has a function of displaying time.

The information management part 113 has a function of transmitting time displayed by the clock 112 of the transmission device 11 to the collision detection device 12 in response to a time acquisition request sent from the collision detection device 12, and a function of transmitting the transmission parameters recorded in the transmission parameter storage part 115 to the collision detection device 12 in response to a transmission parameter acquisition request sent from the collision detection device 12. In this exemplary embodiment, the transmission part 111 records transmission parameters into the transmission parameter storage part 115, but the information management part 113 may record transmission parameters generated by the transmission part 111 into the transmission parameter storage part 115. Further, the transmission part 111 and the information management part 113 can be realized by a CPU (Central Processing Unit). In this case, these parts can be realized in the following way, for example. A semiconductor memory, a disk or another kind of recording medium which stores a program causing a CPU to function as the transmission part 111 and the information management part 113 is prepared, and the CPU is caused to retrieve the program. The CPU controls its own operation in accordance with the retrieved program, thereby realizing the transmission part 111 and the information management part 113 on the CPU.

The collision detection device 12 has a function of determining whether or not collision of a packet transmitted from the transmission device 11 with a packet transmitted from another radio is present. The collision detection device 12 includes a power detection part 121, a clock 122, a collision detection part 123, a storage device 124, and an antenna 127.

The storage device 124 is provided with a sampled data storage part 125 and a threshold storage part 126.

In the sampled data storage part 125, sampled data and sampling time of the sampled data are recorded are associated and recorded. The sampled data is sampled data of the power (power values) of a spatial radio signal present in a frequency band (a communication frequency channel) used when the transmission part 111 transmits a packet. FIG. 3 is a diagram showing an example of the content of the sampled data storage part 125. The sampled data storage part 125 in this example has a plurality of rows. On each of the rows, the power value and the sampling time are recorded. For example, a first row shows that a power value SD1 is sampled at time ST1.

Figure 4:
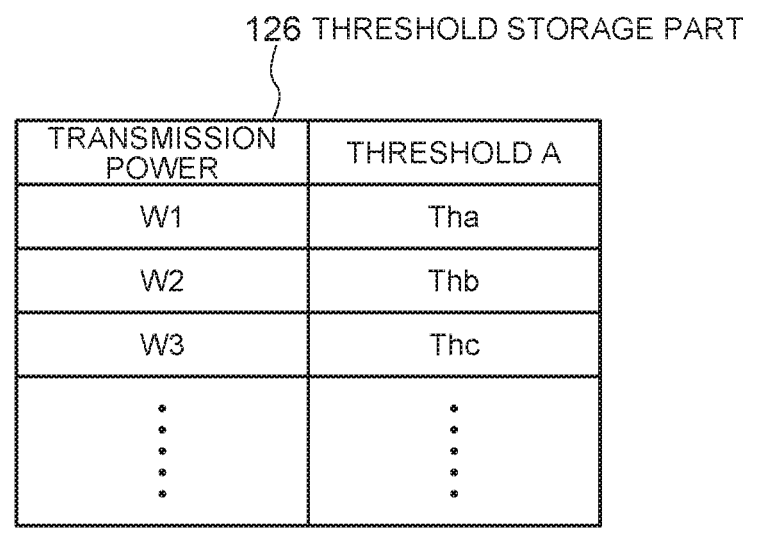

In the threshold storage part 126, a threshold A used in determining whether or not occurrence of packet collision is present is recorded. Moreover, in the threshold storage part 126, a candidate for the threshold A is recorded in association with each transmission power which can be taken in packet transmission by the transmission part 111. FIG. 4 is a diagram showing an example of the content of the threshold storage part 126. The threshold storage part 126 in this example has a plurality of rows. On each of the rows, transmission power and the threshold A are recorded. For example, a first row shows that "Tha" is taken as the threshold A when the transmission power of a packet is "W1." In general, the threshold A becomes a larger value as transmission power becomes larger. A specific method for determining the threshold A will be described later.

The power detection part 121 has a function of sensing the power of a spatial radio signal present in a frequency band used when the transmission part 111 transmits a packet, and associating the sampled data (the power value) with sampling time and recording them into the sampled data storage part 125. The clock 122 has a function of displaying time.

The collision detection part 123 has the following functions:

transmitting a time acquisition request to the information management part 113;

synchronizing time shown by the clock 122 of the collision detection device 12 with time shown by the clock 112 of the transmission device 11 on the basis of the time shown by the clock 112 sent from the information management part 113 in response to the time acquisition request;

transmitting a transmission parameter acquisition request to the information management part 113; and determining whether or not collision of a packet transmitted from the transmission device 11 with a packet transmitted from another radio is present on the basis of transmission parameters sent from the information management part 113 in response to the transmission parameter acquisition request, sampled data and sampling time recorded in the sampled data storage part 125, and a threshold recorded in the threshold storage part 126.

The power detection part 121 and the collision detection part 123 can be realized by a program-controlled CPU.

[Description of Operation in First Exemplary Embodiment]

Next, referring to FIGS. 1 to 4 and FIG. 5, operation in this exemplary embodiment will be described in detail.

In this exemplary embodiment, packet transmission by the transmission device 11 and sensing of a spatial radio signal by the collision detection device 12 are performed asynchronously. When the transmission part 111 divides data into packets and transmits the packets, processing shown in FIG. 5 is executed.

Figure 5:
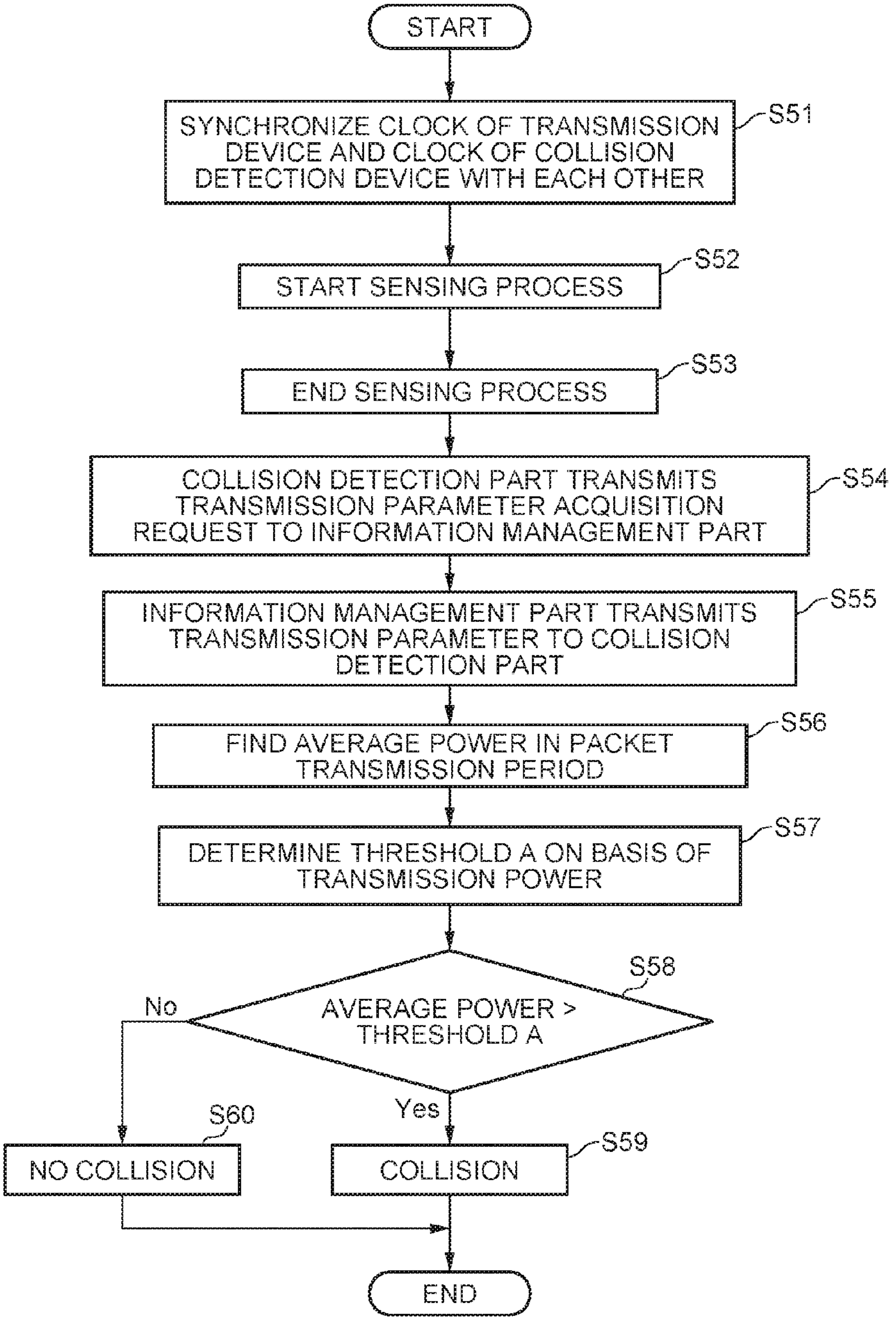
FIG. 5 is a flowchart showing an example of processing executed by the communication device according to the first exemplary embodiment of the present invention.

Referring to FIG. 5, first, a process of synchronizing time shown by the clock 112 of the transmission device and time shown by the clock 122 of the collision detection device with each other is executed (step S51). To be specific, time shown by the clock 112 and time shown by the clock 122 are synchronized with each other by execution of a process as described below, for example. First, the collision detection part 123 transmits a time acquisition request to the information management part 113. Next, the information management part 113 inputs time from the clock 112, and transmits the time to the collision detection part 123. After that, the collision detection part 123 determines time to be set in the clock 122 on the basis of the time sent from the information management part 113 and a time required to complete time setting after the collision detection part 123 inputs the time, and sets the determined time in the clock 122. That is the details of processing executed at step S51.

After that, the power detection part 121 starts a sensing process (step S52). In the sensing process, the power detection part 121 senses the power of a spatial radio signal present in a frequency band used in packet transmission by the transmission part 111, and performs sampling at a given sampling frequency. Then, the power detection part 121 associates the sampled power value (the sampled data) with sampling time, and records them into the sampled data storage part 125.

Upon executing the sensing process for a predetermined power sensing time, the power detection part 121 ends the sensing process (step S53).

When the power detection part 121 ends the sensing process, the collision detection part 123 transmits a transmission parameter acquisition request to the information management part 113 (step S54).

In response to the transmission parameter acquisition request sent from the collision detection part 123, the information management part 113 notifies transmission parameters (including transmission power, starting time of transmission, and ending time of transmission) of each packet recorded in the transmission parameter storage part 115 to the collision detection part 123 (step S55).

For each packet, the collision detection part 123 extracts sampled data (power values) sampled during a period of transmission of the packet from the sampled data storage part 125 on the basis of the starting time and ending time of transmission of the packet notified by the information management part 113 and the sampling time recorded in the sampled data storage part 125, and calculates the average value (the average power) of the extracted sampled data (step S56).

Next, the collision detection part 113 determines the threshold A for each packet on the basis of the transmission power of the packet notified from the information management part 113 (step S57). To be more specific, the collision detection part 113 searches the threshold storage part 126 for a threshold recorded in association with the transmission power notified from the information management part 113, and determines the searched threshold as the threshold A. For example, in a case where the transmission power sent from the information management part 113 is "W3" and the content of the threshold storage part 126 is that shown in FIG. 4, the threshold A=Thc is obtained.

Thresholds Tha, Thb, Thc, . . . for transmission power W1, W2, W3, . . . are determined in the following way, for example. First, in an environment without a spatial radio signal of another radio, a packet is transmitted from the transmission part 111 at transmission power W1. Next, the average value of reception power in a packet transmission period is calculated by execution of the same processes as those of steps S51 to S56 described above. After that, a power fluctuation component caused by environmental noise and device noise is added to the calculated average value, and the addition result Tha is determined as the threshold A for the transmission power W1. The same processes are executed on the other transmission power W2, W3, . . . , and the thresholds Thb, Thc, . . . are determined.

After that, the collision detection part 123 compares the average value of power in a period of transmission of each packet calculated at step S56 with the threshold A for the packet determined at step S57 (step S58).

Then, in a case where the power average values in the packet transmission period calculated at step S56 contain an average value exceeding the threshold A (Yes at step S58), it is determined that occurrence of packet collision is present (step S59). On the other hand, in a case where all the average values are equal to or less than the thresholds A (No at step S58), it is determined that occurrence of packet collision is not present (step S69).

In this exemplary embodiment described above, the transmission device 11 and the collision device 12 include the clock 112 and the clock 122, respectively, but only one clock shared by the transmission device 11 and the collision detection device 12 may be provided. In this case, the process of step S51 in FIG. 5 is unnecessary. However, in this case, in order to cause the transmission device 11 and the collision detection device 12 operate at the same time, it is necessary to arrange a circuit (place a clock and wires) so that a transmission delay time in transmitting time information from the clock to the transmission device 11 coincides with a transmission delay time in transmitting time information from the clock to the collision detection device 12. Moreover, in this case, it is possible to use, instead of the clock, a clock generation circuit and a counter in combination.

[Effect of First Exemplary Embodiment]

According to this exemplary embodiment, even when packet transmission power changes, it is possible to acquire a correct result of determination whether or not occurrence of packet collision is present. This is because it is determined whether or not occurrence of packet collision is present by comparison of a threshold corresponding to packet transmission power with the average power of a spatial radio signal in a packet transmission period.

Further, according to this exemplary embodiment, even when a packet size and a transmission speed change, it is possible to acquire a correct result of determination whether or not occurrence of packet collision is present. This is because the power detection part 121 obtains average power in a packet transmission period on the basis of power of a spatial radio signal sensed during a period from starting time of transmission to ending time of transmission managed by the information management part 113.

[Second Exemplary Embodiment of the Present Invention]

Next, a second exemplary embodiment of the present invention will be described. This exemplary embodiment is realized by using a threshold storage part **126*b* shown in FIG. 6 instead of the threshold storage part 126 shown in FIG. 4 and causing the communication device 10 to execute processing shown in FIG. 7 instead of the processing shown in FIG. 5**.

Referring to FIG. 6, in the threshold storage part **126*b*, candidates for thresholds A and B used in determining whether or not occurrence of packet collision is present are recorded in association with the respective transmission power that the transmission part 111 may take when transmitting packets. As stated before, the threshold A is used in determining whether or not occurrence of packet collision is present on the basis of the average value of reception power in a packet transmission period. Further, the threshold B is used in determining whether or not occurrence of packet collision is present on the basis of the degree of variation of sampled data (power values) sampled in a packet transmission time. The threshold storage part 126*b* shown in FIG. 6 has a plurality of rows. On each of the rows, the transmission power, the threshold A, and the threshold B are recorded. For example, a first row shows that the thresholds A and B are "Tha" and "Thx," respectively, when packet transmission power is "W1**."

Figure 7:
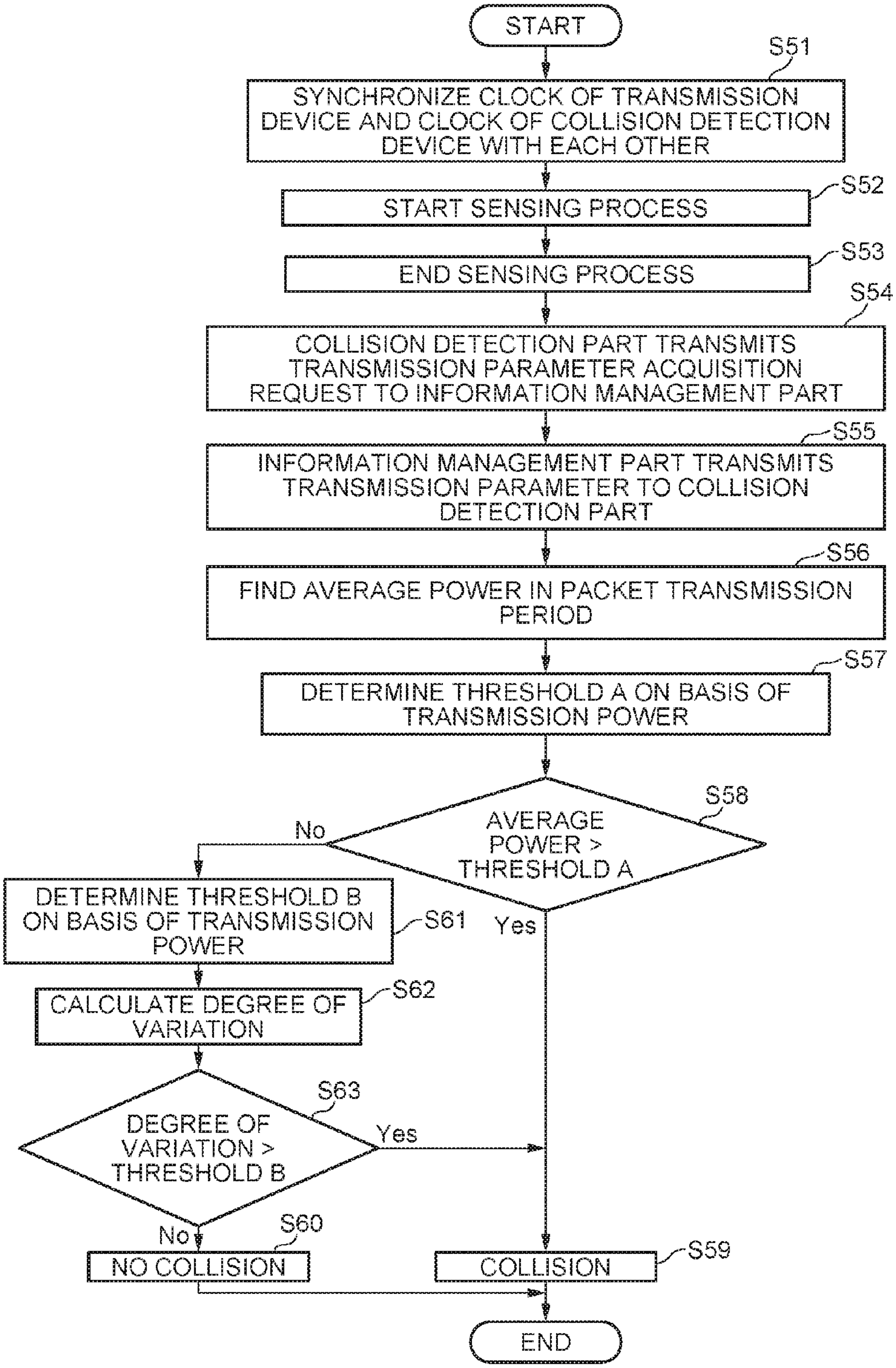
FIG. 7 is a flowchart showing an example of processing executed by a communication device according to the second exemplary embodiment of the present invention.

Next, operation in this exemplary embodiment will be described referring to a flowchart of FIG. 7. Referring to FIG. 7, the communication device 10 first executes the same processes as those of steps S51 to S58 of FIG. 5 described before.

Then, in a case where the power average values in the transmission periods of the respective packets calculated at step S56 contain an average value exceeding the threshold A (Yes at step S58), it is determined that occurrence of packet collision is present (step S59). On the contrary, in a case where all the average values are equal to or less than the threshold A (No at step S58), a process of step S61 is executed.

At step S61, the collision detection part 123 determines the thresholds B for the respective packets on the basis of the transmission power of the respective packets notified from the information management part 113. To be more specific, the collision detection part 123 searches the threshold storage part **126*b* for candidates for the threshold B recorded in association with the transmission power notified from the information management part 113**.

After that, for each packet, the collision detection part 123 extracts sampled data sampled during a period of transmission of the packet from the sampled data storage part 125 on the basis of the starting time and ending time of transmission of the packet notified from the information management part 113 and the sampling time recorded in the sampled data storage part 125, and calculates the degree of variation (step S62). In this exemplary embodiment, dispersion calculated by the following equation (1) is used as the degree of variation. However, the degree of variation is not limited to that, and standard deviation or the like may be used.

$$\text{Degree of variation}=\{(1/M)/\Sigma_{i=1}^{m}(x_i-\mu^2)^2\}^{1/2} \quad \text{(Equation 1)}$$

In the equation, $x_i$ represents $i^{th}$ sampled data of the sampled data sampled in a packet transmission period and μ represents the average value of $x_i$ (the average value found at step S56).

After that, the collision detection part 123 compares the degree of variation with the threshold B (step S63). In a case where the degree of variation exceeds the threshold B (Yes at step S63), the collision detection part 123 determines that occurrence of packet collision is present (step S59). On the contrary, in a case where the degree of variation is equal to or less than the threshold B (No at step S63), the collision detection part 123 determines that occurrence of packet collision is not present (step S60).

The threshold B corresponding to the transmission power of a packet is determined in the following way, for example. To be specific, thresholds Thx, Thy, Thz, . . . corresponding to transmission power W1, W2, W3, . . . are determined in the following way. First, in an environment without a spatial radio signal of another radio, a packet is transmitted from the transmission part 111 at transmission power W1. After that, in the same manner as stated before, the degree of variation is calculated (step S62), and either the calculated degree of variation or a value obtained by correcting the calculated degree of variation in consideration of an environmental noise and the like is determined as the threshold Thx corresponding to the transmission power W1. The same process is executed on the other transmission power W2, W3, . . . , and the thresholds Thy, Thz, are determined.

Alternatively, the threshold B may also be determined in the following way: regarding one transmission power, a packet is transmitted a plurality of times at the transmission power, the degree of variation is calculated every time, and the maximum degree of variation of the calculation results is determined as the threshold B for the transmission power.

[Effect of Second Exemplary Embodiment]

Figure 24:
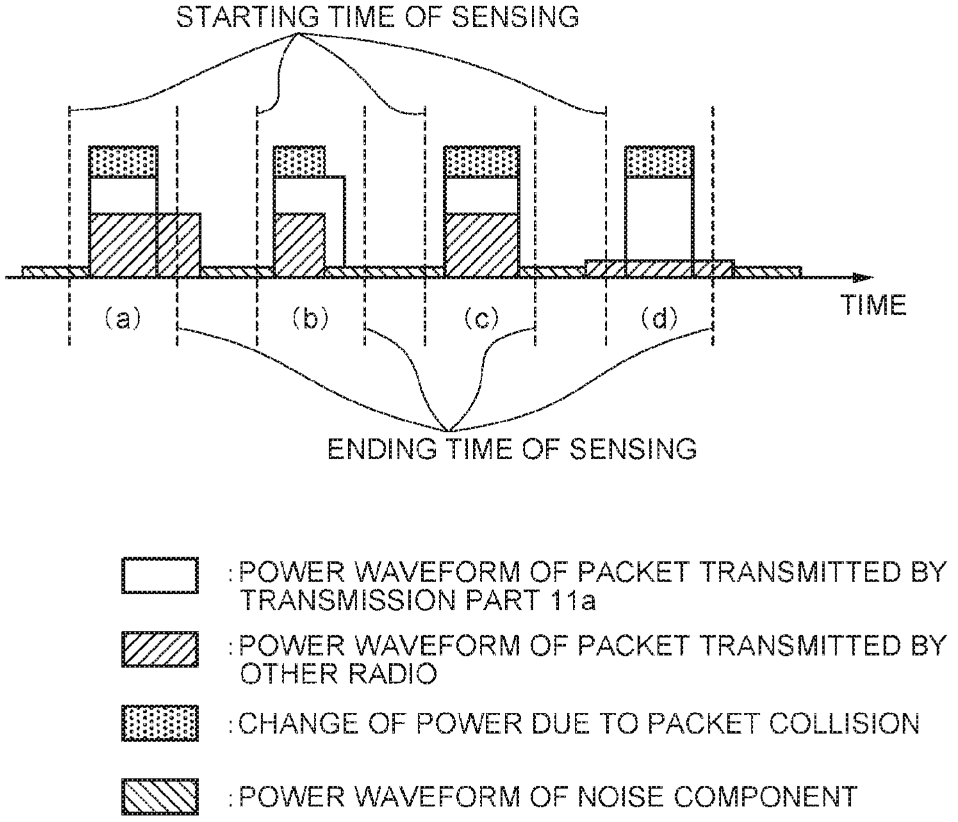
FIG. 24 is a diagram for describing the operation of the communication device according to the seventh exemplary embodiment of the present invention.

According to this exemplary embodiment, even when fluctuation is caused in power detected by the power detection part 121 and the power detected by the power detection part 121 decreases, it is possible to detect packet collision as shown in FIG. 24(*b*), namely, collision of part of a packet transmitted by the transmission part 111 with another packet. Moreover, in this exemplary embodiment, the collision detection process based on the average power and the threshold A (step S58) and the collision detection process based on the degree of variation and the threshold B (step S63) are executed, but only the collision detection process based on the degree of variation and the threshold may be executed without executing the collision detection process based on the average power and the threshold A. In this case, even if power detected by the power detection part 121 increases due to fluctuation, it is not determined by mistake that occurrence of packet collision is present.

[Third Exemplary Embodiment of the Present Invention]

Figure 8:
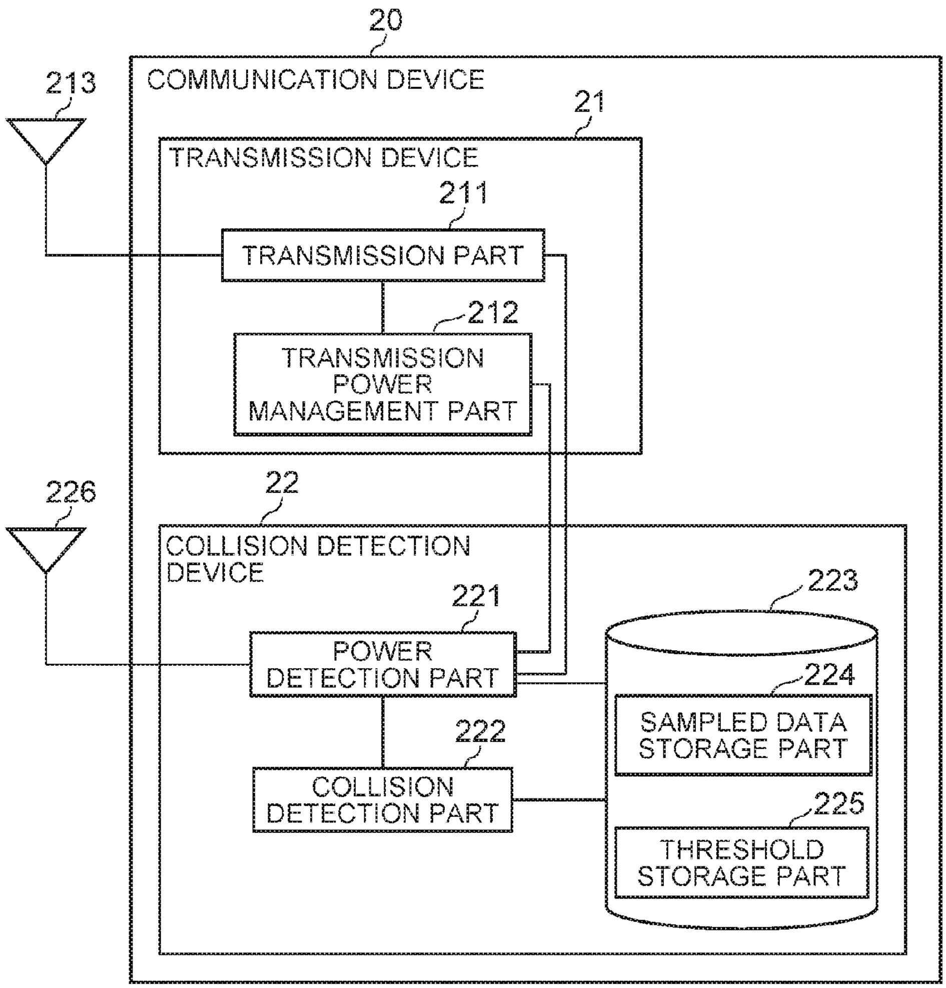
FIG. 8 is a block diagram showing an example of the configuration of a communication device according to a third exemplary embodiment of the present invention.

Next, a third exemplary embodiment of the present invention will be described. Referring to FIG. 8, a communication device 20 according to the third exemplary embodiment of the present invention includes a transmission device 21 and a collision detection device 22.

The transmission device 21 includes a transmission part 211, a transmission power management part 212, and an antenna 213.

The transmission part 211 has a function of transmitting a packet by using a selected communication frequency channel, a function of transmitting a transmission start signal and a transmission end signal to the collision detection device 22 when starting packet transmission and ending packet transmission, and a function of changing transmission power on the basis of an setting operation by the user, the strength of a signal sent from the other party of communication, a packet loss rate and the like.

The transmission power management part 212 has a function of, every time the transmission part 211 transmits a packet, transmitting the transmission power of the packet to the power detection part 221.

The transmission part 211 and the transmission power management part 212 can be realized by a program-controlled CPU.

The collision detection device 22 includes a power detection part 221, a collision detection part 222, a storage device 223, and an antenna 226.

The storage device 223 is provided with the sampled data storage part 224 and the threshold storage part 225.

Figure 9:
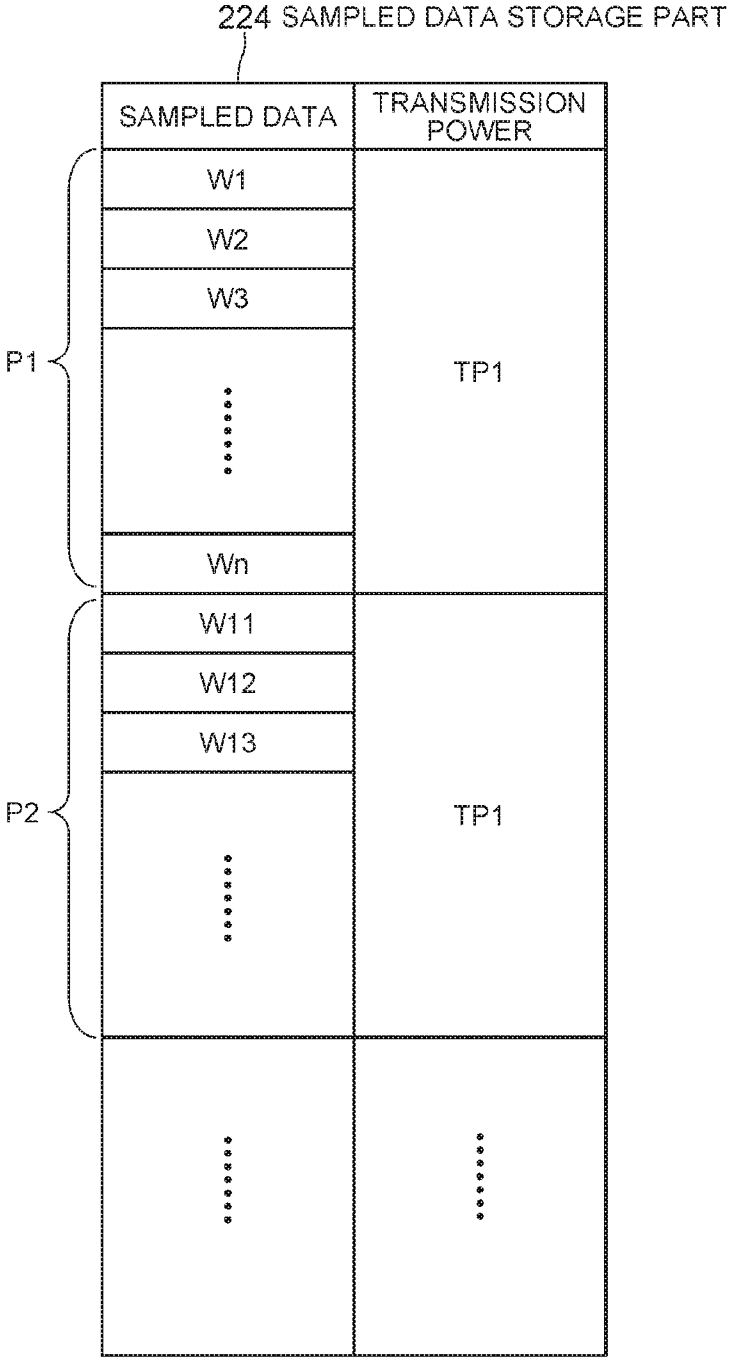
FIG. 9 is a diagram showing an example of the content of a sampled data storage part in the communication device according to the third exemplary embodiment of the present invention.

In the sampled data storage part 224, sampled data and packet transmission power are associated and recorded. The sampled data is sampled data of the power values of a spatial radio signal present in a frequency band used in packet transmission by the transmission part 211 and is sampled in a packet transmission period. FIG. 9 is a diagram showing the content of the sampled data storage part 224. The sampled data storage part 224 in this example has a plurality of rows, and the sampled data and the transmission power are recorded in each of the rows. For example, it is recorded that sampled data sampled in a transmission period of a packet P1 is "W1, W2, Wn" and the transmission power of the packet P1 is "TP1."

In the threshold storage part 225, candidates for the threshold A used for determining whether or not occurrence of packet collision is present are recorded in the same manner as in the threshold storage part 126 described in the first exemplary embodiment (see FIG. 4).

The power detection part 221 has: a function of sensing the power of a spatial radio signal present in a frequency band used for packet transmission by the transmission part 211 during a period (a packet transmission period) from reception of a transmission start signal to reception of a transmission end signal, and recording the sampled data (the power values) into the sampled data storage part 224; and a function of associating transmission power sent from the transmission power management part 212 with the corresponding sampled data and recording them into the sampled data storage part 224.

The collision detection part 222 has a function of determining whether or not occurrence of collision of a packet transmitted from the transmission device 21 with a packet transmitted from another radio is present, on the basis of the transmission power sent from the transmission power management part 212, the sampled data recorded in the sampled data storage part 224, and the threshold recorded in the threshold storage part 225.

The power detection part 221 and the collision detection part 222 can be realized by a program-controlled CPU.

[Description of Operation in Third Exemplary Embodiment]

Next, operation in this exemplary embodiment will be described in detail referring to FIGS. 8, 9 and 10.

In this exemplary embodiment, transmission of a packet by the transmission device 21 and sensing of a spatial radio signal by the collision detection device 22 are performed synchronously. Referring to FIG. 10, the transmission part 211 within the transmission device 21 sends a transmission start signal representing start of packet transmission to the power detection part 221 simultaneously with start of packet transmission. Further, the transmission power management part 212 sends transmission power in packet transmission to the power detection part 221 (step S81).

Upon receiving the transmission start signal, the power detection part 221 starts a power sensing process immediately (step S82). In the sensing process, the power detection part 221 senses the power of a spatial radio signal present in a frequency band used in packet transmission by the transmission part 211, and samples the power values at a predetermined sampling frequency. Then, the power detection part 221 associates the sampled power values (sampled data) with the transmission power sent from the transmission power management part 212, and records them into the sampled data storage part 224 (see FIG. 9).

Simultaneously with end of transmission of the packet, the transmission part 211 transmits a transmission end signal representing end of transmission of the packet to the power detection part 221 (step S83). Upon receiving the transmission end signal, the power detection part 221 ends the power sensing process immediately (step S84). By execution of the processes of steps S81 to S84, the power of the packet transmitted by the transmission part 211 is sensed from the head portion to the end portion of the packet, and sampled data is recorded into the sampled data storage part 224.

When the sensing process ends, the collision detection part 22 calculates the average value (the average power) of the sampled data recorded in the sampled data storage part 224 with respect to a currently received packet (step S85).

Next, the collision detection part 222 searches the threshold storage part 225 for a threshold recorded in association with the transmission power of the currently received packet, and determines the searched value as the threshold A used in determination of collision (step S86).

After that, the collision detection part 222 compares the average power calculated at step S85 with the threshold determined at step S86 (step S87). In a case where the average power is larger than the threshold A (Yes at step S87) the collision detection part 222 determines that occurrence of packet collision is present (step S88). In a case where the average power is equal to or less than the threshold A (No at step S87), the collision detection part 222 determines that occurrence of collision is not present (step S89).

[Effect of Third Exemplary Embodiment]

According to this exemplary embodiment, in addition to the effect obtained in the first exemplary embodiment, an effect that the configuration can be simpler than that of the first exemplary embodiment can be obtained. This is because, in this exemplary embodiment, the collision detection device specifies the packet transmission period on the basis of the transmission start signal and transmission end signal of the packet sent from the transmission device, and it is not necessary to provide the transmission device and the collision detection device with clocks to specify the packet transmission period unlike in the first exemplary embodiment. Moreover, according to this exemplary embodiment, transmission of a packet by the transmission device 21 and sensing of a spatial radio signal by the collision detection device 22 are performed synchronously, it is possible to prevent a period of sensing power of spatial radio signal from becoming longer uselessly.

[Fourth Exemplary Embodiment of the Present Invention]

Next, a fourth exemplary embodiment of the present invention will be described. This exemplary embodiment is realized by causing the threshold storage part 225 to use the threshold storage part content example 126*b* shown in FIG. 6 instead of the threshold storage part content example 126 shown in FIG. 4 and causing the communication device 20 to execute processing shown in FIG. 11 instead of the processing shown in FIG. 10.

Figure 10:
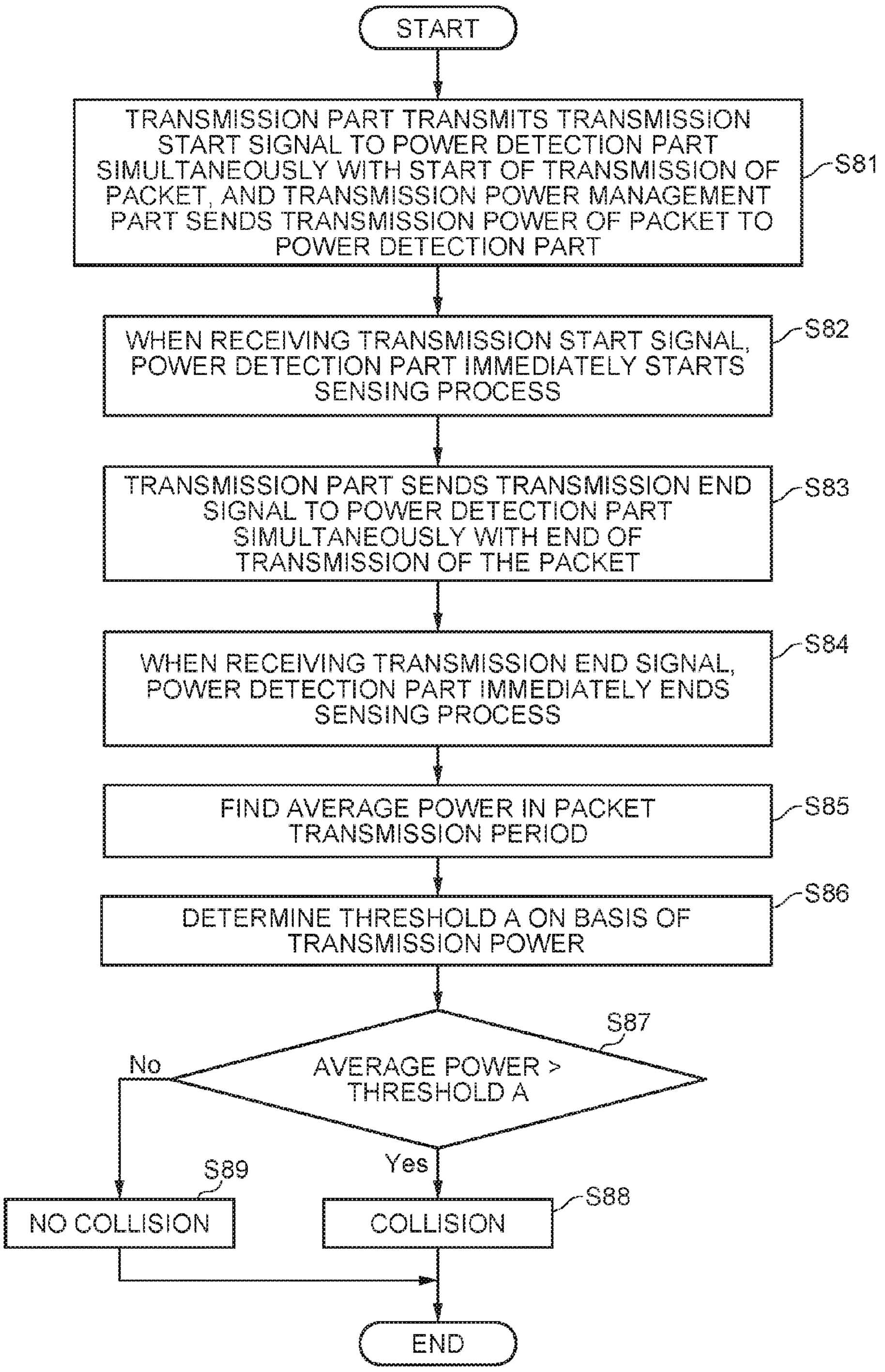
FIG. 10 is a flowchart showing an example of processing executed by the communication device according to the third exemplary embodiment of the present invention.
Figure 11:
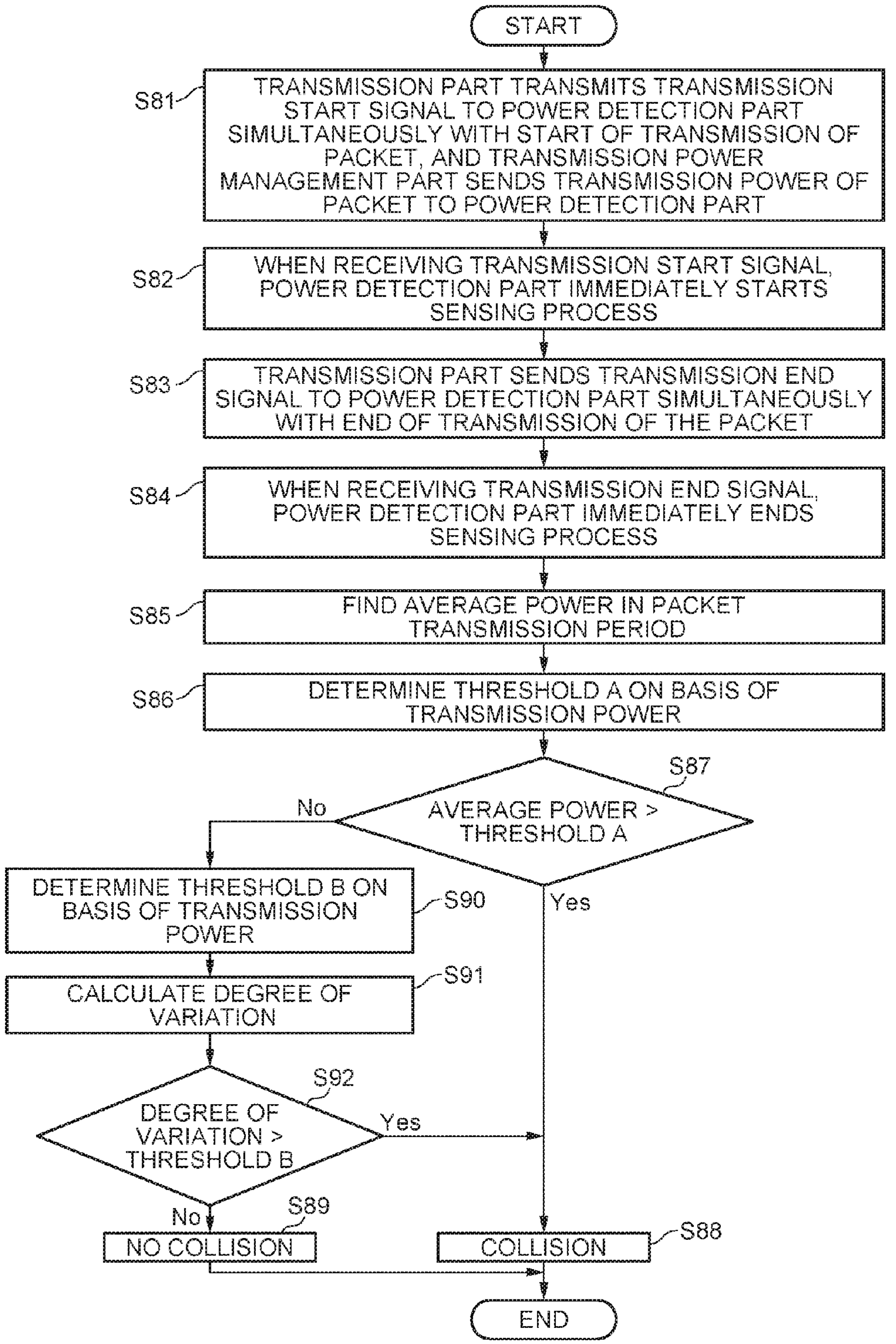
FIG. 11 is a flowchart showing an example of processing executed by a communication device according to a fourth exemplary embodiment of the present invention.

Referring to FIG. 11, first, the communication device 20 executes the same processes as those of steps S81 to S87 shown in FIG. 10.

In a case where the average power is more than the threshold A (Yes at step S87), the collision detection part 222 determines that occurrence of packet collision is present (step S88). On the contrary, in a case where the average power is equal to or less than the threshold A (No at step S87), the collision detection part 222 determines the threshold B on the basis of the transmission power (step S90). After that, the collision detection part 222 finds the degree of variation by executing the operation shown by the equation 1 stated before (step S91) and compares the degree of variation with the threshold B (step S92). In a case where the degree of variation is more than the threshold B (Yes at step S92), it is determined that occurrence of packet collision as shown in FIG. 24(*b*) is present (step S88). In a case where the degree of variation is equal to or less than the threshold B (No at step S92), it is determined that occurrence of packet collision is present (step S88).

In this exemplary embodiment, the failure detection process using the degree of variation and the threshold B (step S92) is executed in addition to the collision detection process using the average power and the threshold A (step S87), but only the failure detection process using the degree of variation and the threshold B may be executed.

[Effect of Fourth Exemplary Embodiment]

According to this exemplary embodiment, it is possible to obtain not only the effect obtained in the second exemplary embodiment but also an effect that the configuration can be simplified as compared with that of the second exemplary embodiment. This is because, in this exemplary embodiment, the collision detection device specifies the period of transmission of a packet on the basis of the transmission start signal and transmission end signal of the packet sent from the transmission device and hence the transmission device and the collision detection device do not need to have clocks, respectively, to specify a packet transmission period unlike in the second exemplary embodiment. Further, according to this exemplary embodiment, transmission of a packet by the transmission device 21 and sensing of a spatial radio signal by the collision detection device 22 are performed synchronously, so that it is possible to prevent a period to sense the power of a spatial radio signal from becoming long uselessly.

[Fifth Exemplary Embodiment of the Present Invention]

Next, a communication device according to a fifth exemplary embodiment of the present invention will be described. In the first exemplary embodiment described above, the clock 112 of the transmission device 11 and the clock 122 of the collision detection device 12 cause deviation from each other in a case where there is variation in performance of the devices configuring the communication device 10. Further, in the third exemplary embodiment, in the event of delay in processing, the power detection part 221 cannot start or end power sensing immediately after receiving a transmission start signal or a transmission end signal from the transmission device 21 because of the delay. In this case, the average power of a spatial radio signal in a transmission period of a packet transmitted by the transmission part 111 or 211 cannot be correctly calculated, and the collision detection part 123 or 222 may be unable to correctly detect the collision of the packet stated above. This leads to decrease in precision of collision detection. This exemplary embodiment provides solution of the problems mentioned above.

Figure 12:
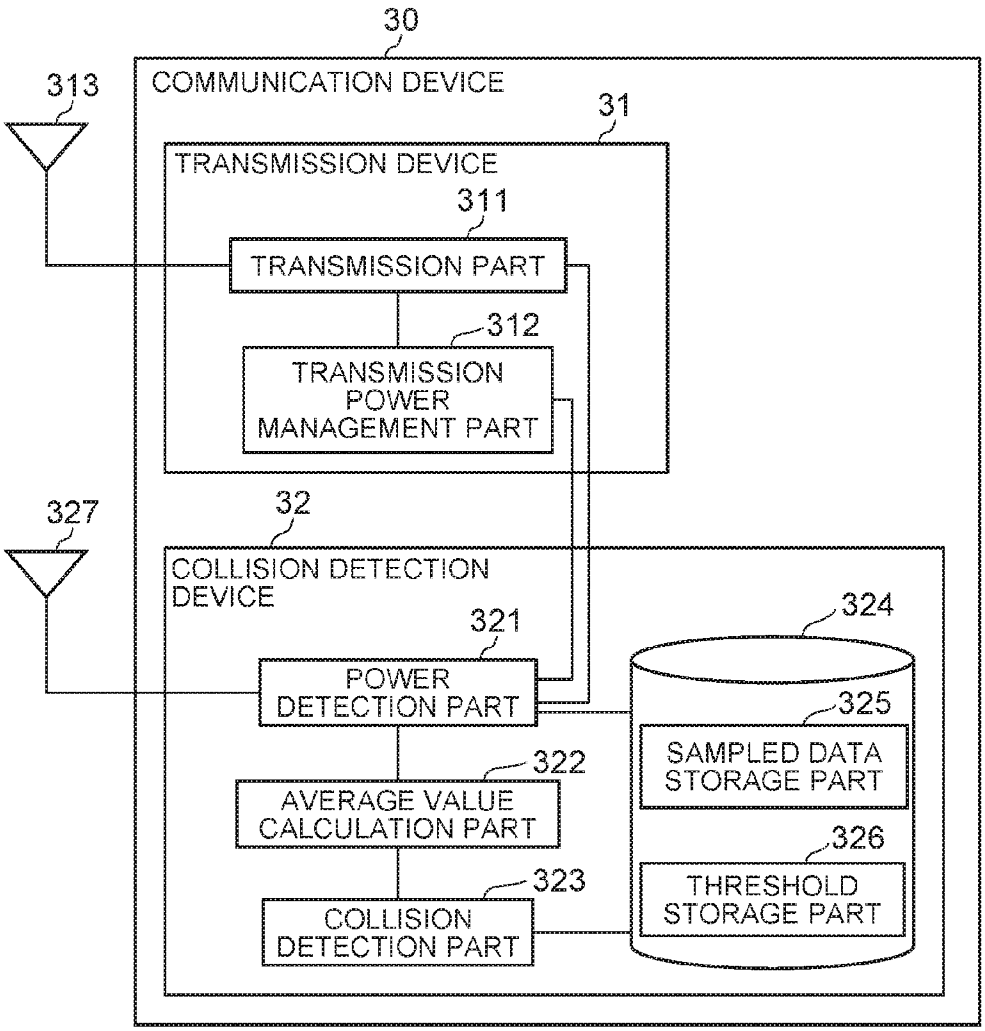
FIG. 12 is a block diagram showing an example of the configuration of a communication device according to a fifth exemplary embodiment of the present invention.

Referring to FIG. 12, a communication device 30 according to the fifth exemplary embodiment of the present invention includes a transmission device 31 and a collision detection part 32.

The transmission device 31 includes a transmission part 311, a transmission power management part 312, and an antenna 313.

The transmission part 311 has a function of transmitting a packet by using a selected communication frequency channel, a function of outputting a transmission start signal to a power detection part 321 before starting transmission of a packet, a function of outputting a transmission end signal to the power detection part 321 when ending transmission of a packet, and a function of changing transmission power on the basis of a setting operation performed by the user, the strength of a signal sent from the other party of communication, a packet loss rate, and so on.

The transmission power management part 312 has a function of, every time the transmission part 311 transmits a packet, notifying the transmission power of the packet to the power detection part 321.

The transmission part 311 and the transmission power management part 312 can be realized by a program-controlled CPU.

The collision detection device 32 includes a power detection part 321, an average value calculation part 322, a collision detection part 323, a storage device 324, and an antenna 327.

The storage device 324 is provided with a sampled data storage part 325 and a threshold storage part 326.

In the sampled data storage part 325, sampled data sampled in a transmission period of a packet and the transmission power of the packet are associated and recorded as in the sampled data storage part 224 described before (see FIG. 9).

In the threshold storage part 326, candidates for the threshold A are recorded in association with the respective transmission power which can be taken by the transmission part 311 as in the threshold storage parts 126 and 225 described before (see FIG. 4).

Likewise the power detection part 221 described before, the power detection part 321 has: a function of sampling the power of a spatial radio signal present in a frequency band used in packet transmission by the transmission part 311, in a packet transmission period from reception of a transmission start signal to reception of a transmission end signal; and a function of associating sampled data and transmission power sent from the transmission power management part 312 and recording them into the sampled data storage part 325.

The average value calculation part 322 has a function of putting sampled data recorded in the sampled data storage part 325 into groups each including N pieces of adjacent sampled data (N represents an integer equal to or more than 2) and calculating the average value for each of the groups.

The collision detection part 323 has: a function of comparing a first threshold Th1 (Th1 is constant for one transmission power) having a smaller value than the lowest transmission power that can be taken by the transmission part 311 and having a larger value than a clear channel assessment (CCA) level with the average value for each of the groups, and finding the average power of a spatial radio signal in a packet transmission period on the basis of the average values from the average value first exceeding the first threshold Th1 to the average value last exceeding the first threshold Th1; a function of searching the threshold storage part 326 for the threshold A corresponding to the transmission power of a packet; and a function of determining whether or not occurrence of packet collision is present by comparing the average value with the threshold A. As the threshold Th1, it is also possible to use a value (a variable value) which is corresponding to the transmission power of a packet transmitted by the transmission part 311 and which is smaller than the transmission power of the packet and larger than the clear channel assessment level. In this case, candidates for the threshold Th1 are previously recorded in the threshold storage part 326 in association with a plurality of transmission power that can be taken by the transmission part 311, respectively, and the collision detection part 323 determines the candidate recorded in association with the transmission power sent from the transmission power management part 312 as the threshold Th1.

The power detection part 321, the average value calculation part 322, and the collision detection part 323 can be realized by a program-controlled CPU.

[Description of Operation in Fifth Exemplary Embodiment]

Next, operation in this exemplary embodiment will be described in detail referring to FIGS. 12 and 13.

Figure 13:
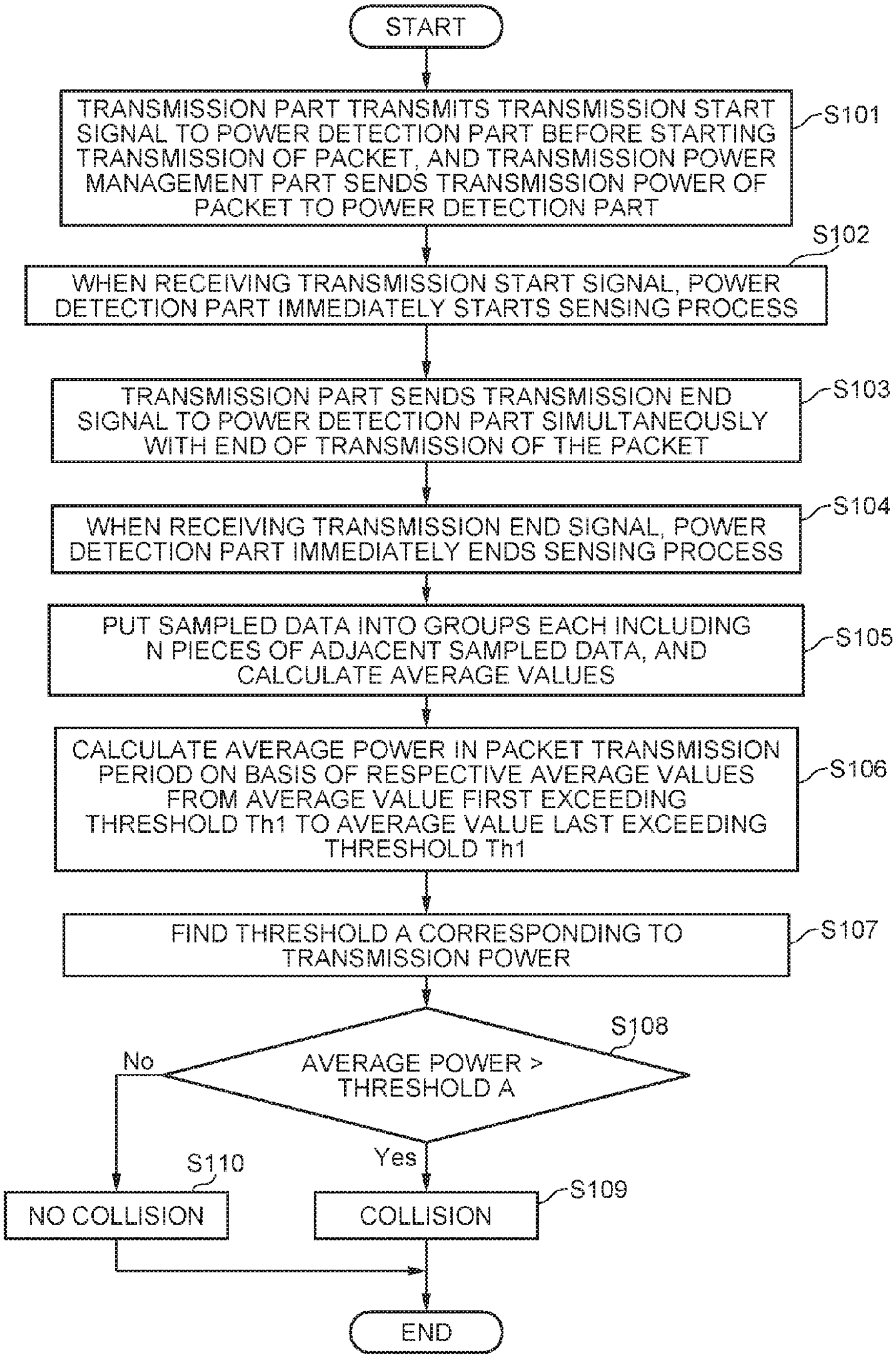
FIG. 13 is a flowchart showing an example of processing executed by the communication device according to the fifth exemplary embodiment of the present invention.

Referring to a flowchart of FIG. 13, the transmission part 311 transmits a transmission start signal to the power detection part 321 before starting transmission of a packet. Moreover, the transmission power management part 312 sends transmission power of the packet to the power detection part 321 (step S101).

As soon as receiving the transmission start signal, the power detection part 321 starts a sensing process, and records sampled data of the power of a spatial radio signal having been sampled and the transmission power sent from the transmission power management part 312 into the sampled data storage part 325 in association with each other (step S102).

Further, simultaneously with end of transmission of the packet, the transmission part 311 transmits a transmission end signal to the power detection part 321 (step S103). Thus, the power detection part 321 ends the sensing process (step S104).

Figure 14:
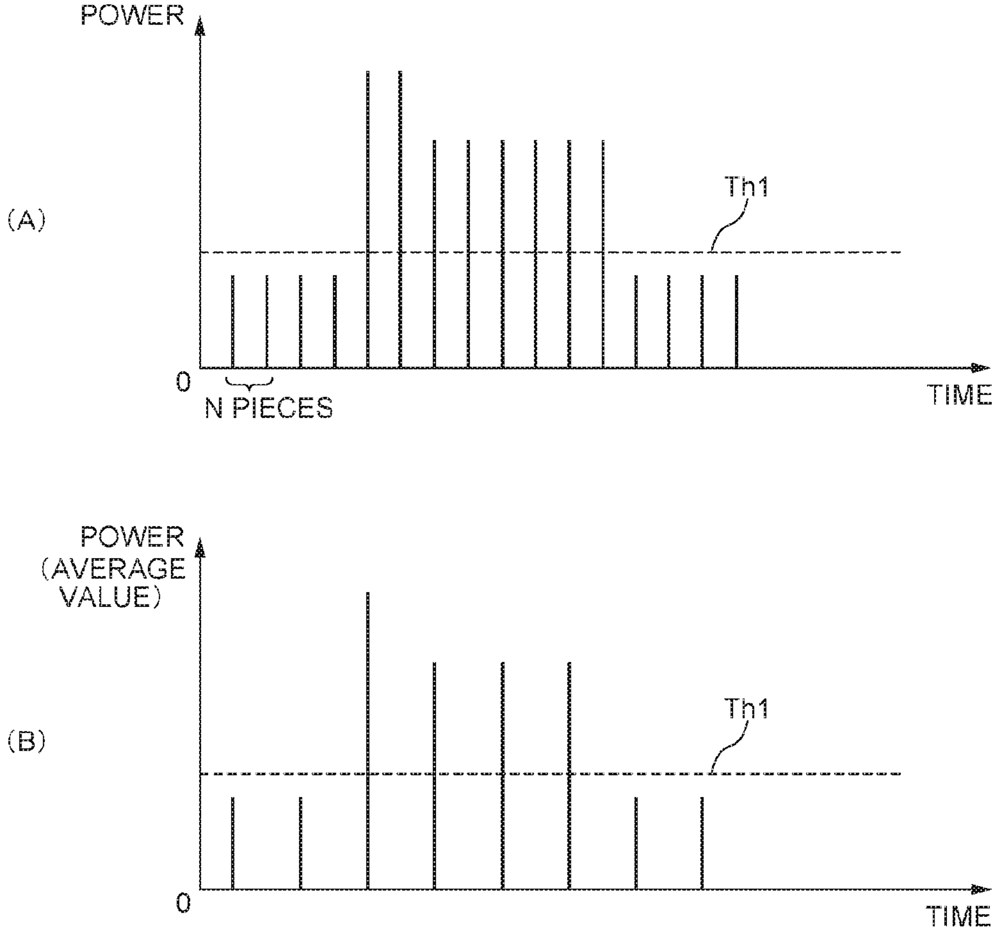
FIG. 14 is a diagram for describing the operation of the communication device according to the fifth exemplary embodiment of the present invention.

When the sensing process ends, as shown in FIGS. 14A and 14B, the average value calculation part 322 puts the sampled data recorded in the sampled data storage part 325 into groups each including N pieces of adjacent data (N=2 in FIG. 14) and calculates the average value for each of the groups (step S105).

When the average values for the respective groups are calculated, the collision detection part 323 compares the first threshold Th1 with the average values for the respective groups, and calculates the average power of a spatial radio signal in a packet transmission period, on the basis of the respective average values from the average value first exceeding the first threshold Th1 to the average value last exceeding the first threshold Th1 (step S106). Next, the collision detection part 323 searches the threshold storage part 326 for the threshold recorded in association with the transmission power of the currently received packet, and determines the threshold as the threshold A (step S107).

After that, the collision detection part 323 compares the average power calculated at step S106 with the threshold A (step S108). In a case where the average power is more than the threshold A (Yes at step S108), the collision detection part 323 determines that occurrence of packet collision is present (step S109). In a case where the average power is equal to or less than the threshold A (No at step S108), the collision detection part 323 determines that occurrence of collision is not present (step S110).

In this exemplary embodiment described above, the sampled data is put into groups each including N pieces of adjacent sampled data and the average values for the respective groups are calculated, and further, the average power of a spatial radio signal in a packet transmission period is calculated on the basis of the respective average values from the average value first exceeding the first threshold Th1 to the average value last exceeding the first threshold Th1. Meanwhile, the average power of a spatial radio signal in a packet transmission period may be calculated on the basis of the respective sampled data from the sampled data first exceeding the first threshold Th1 to the sampled data last exceeding the first threshold Th1. However, it is possible to specify a packet transmission period with more accuracy when using the average values for the respective groups as in this exemplary embodiment.

[Effect of Fifth Exemplary Embodiment]

According to this exemplary embodiment, it is possible to obtain the same effects as in the first and third exemplary embodiments. Further, according to this exemplary embodiment, it is possible to obtain the following effect: the accuracy of packet collision detection can be kept high even when the power detection part cannot start or end power sensing immediately after receiving a transmission start signal or a transmission end signal from the transmission device because of delay in processing. The accuracy of packet collision detection can be kept high because it is possible to correctly calculate the average power of a spatial radio signal in a packet transmission period. Further, the average power of a spatial radio signal in a packet transmission period can be correctly calculated because the sampled data is put into groups each including N pieces of adjacent sampled data and the average values for the respective groups are calculated, and moreover, the average power of a spatial radio signal in a packet transmission period is calculated on the basis of the respective average values from the average value first exceeding the first threshold Th1 to the average value last exceeding the first threshold Th1.

[Sixth Exemplary Embodiment of the Present Invention]

Next, a sixth exemplary embodiment of the present invention will be described. This exemplary embodiment can be realized by using the threshold storage part 126*b* shown in FIG. 6 instead of the threshold storage part 326 and causing the communication device 30 to execute processing shown by a flowchart of FIG. 15 instead of the processing shown by the flowchart of FIG. 13.

Figure 15:
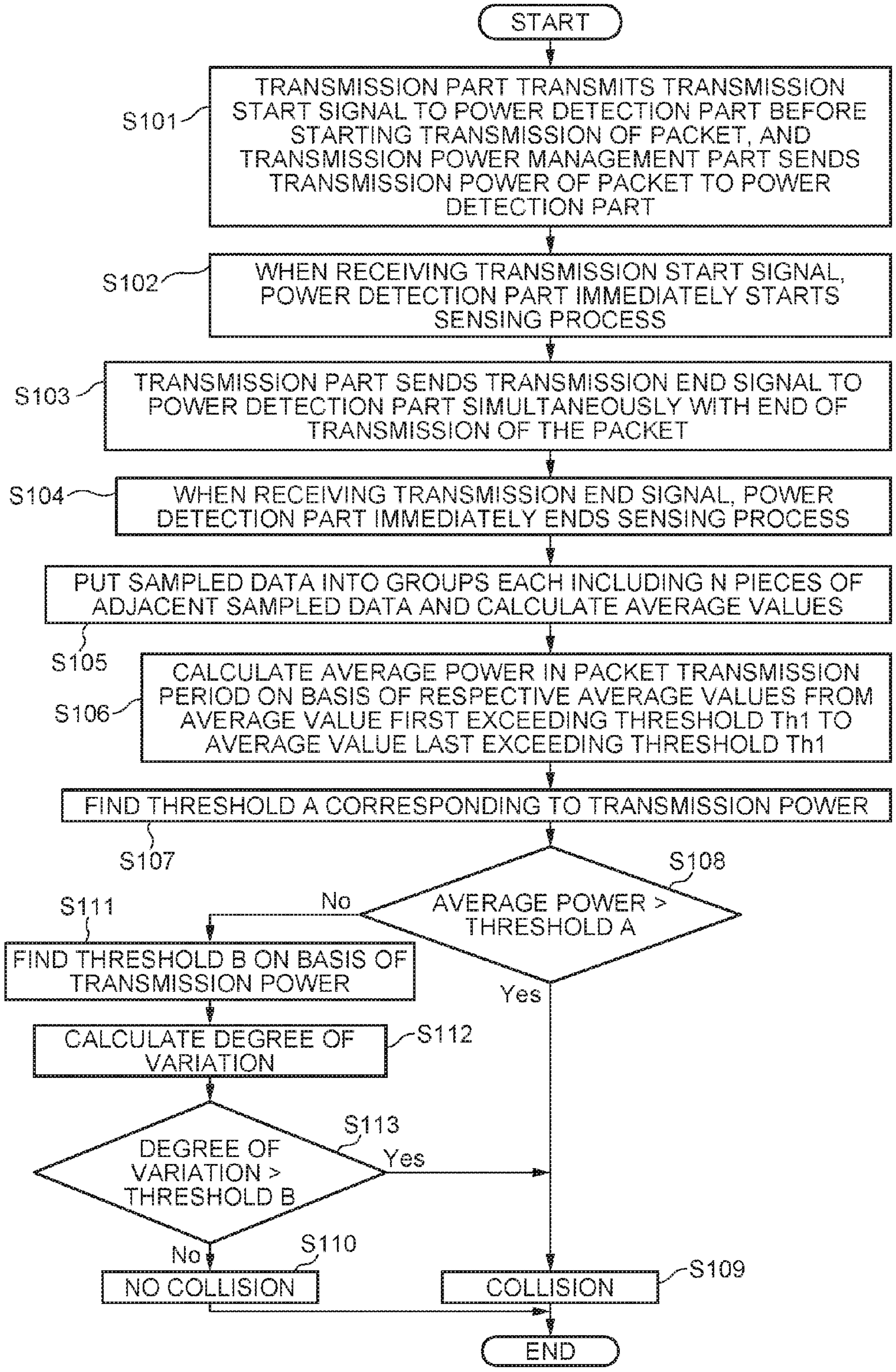
FIG. 15 is a flowchart showing an example of processing executed by a communication device according to a sixth exemplary embodiment of the present invention.

Referring to FIG. 15, first, the communication device 30 executes the same processes as those of steps S101 to S108 described before.

In a case where the average power is more than the threshold A (Yes at step S108), it is determined that occurrence of packet collision is present (step S109). On the contrary, in a case where the average value is equal to or less than the threshold A (No at step S108), the threshold B corresponding to the transmission power is calculated (step S111). After that, the collision detection part 323 calculates the degree of variation by executing the operation shown by the equation 1 described before, and compares the degree of variation with the threshold B (steps S112 and S113). In a case where the degree of variation is larger (Yes at step S113), it is determined that occurrence of packet collision as shown in FIG. 24(*b*) is present (step S109). In the other case (No at step S113), it is determined that occurrence of packet collision is not present (step S110).

In this exemplary embodiment, in addition to the collision detection process based on the average power and the threshold A (step S108), the collision detection process based on the degree of variation and the threshold B is executed (step S113). However, only the collision detection process based on the degree of variation and the threshold B may be executed.

[Effect of Sixth Exemplary Embodiment]

According to this exemplary embodiment, it is possible to obtain the same effects as in the second and fourth exemplary embodiments. Further, according to this exemplary embodiment, it is possible to obtain the following effect: the accuracy of packet collision detection can be kept high even when the power detection part cannot start or end power sensing immediately after receiving a transmission start signal or a transmission end signal from the transmission device because of delay in processing. The accuracy of packet collision detection can be kept high because the average power of a spatial radio signal in a packet transmission period can be correctly calculated. Further, the average power of a spatial radio signal in a packet transmission period can be correctly calculated because the sampled data is put into groups each including N pieces of adjacent sampled data and the average values for the respective groups are calculated, and moreover, the average power of a spatial radio signal in a packet transmission period is calculated on the basis of the respective average values from the average value first exceeding the first threshold Th1 to the average value last exceeding the first threshold Th1.

[Seventh Exemplary Embodiment of the Present Invention]

Next, a communication device according to a seventh exemplary embodiment of the present invention will be described in detail.

Figure 16:
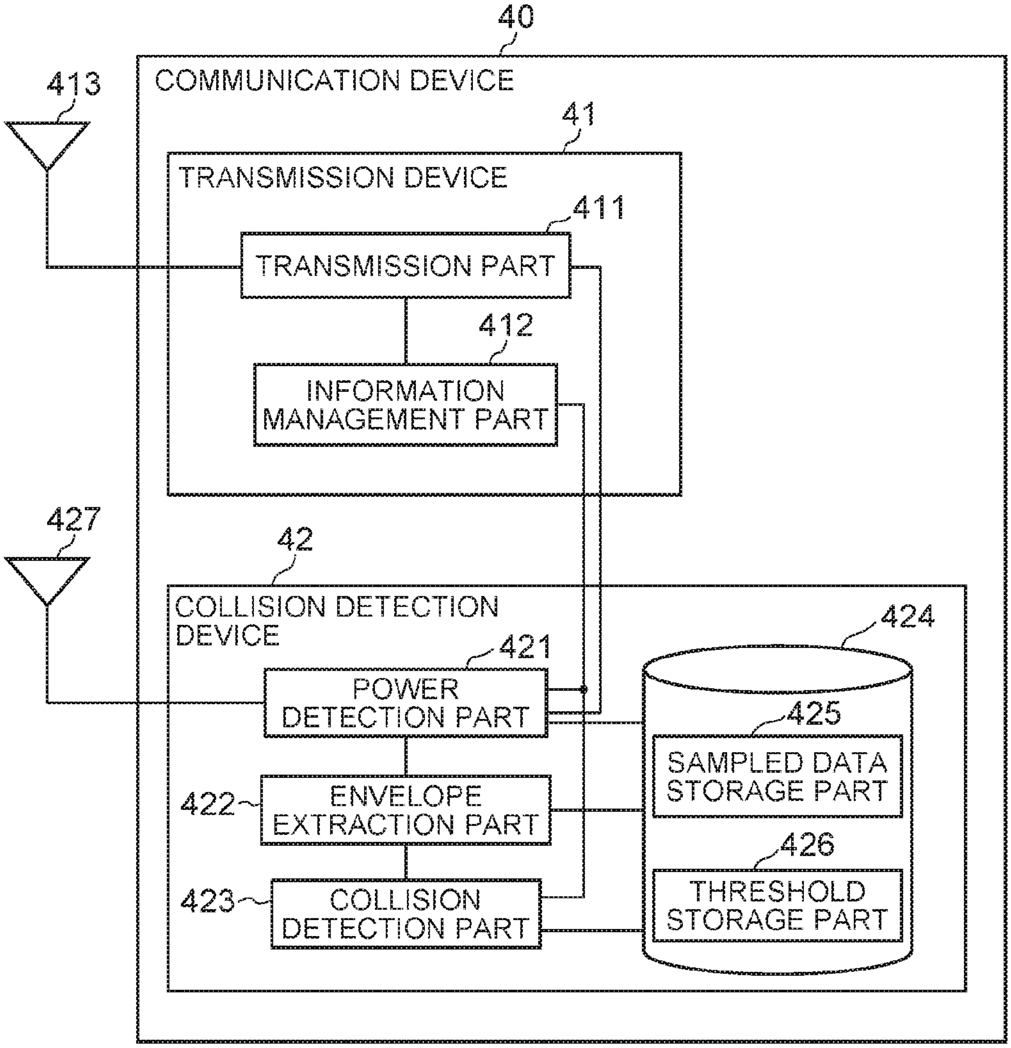
FIG. 16 is a block diagram showing an example of the configuration of a communication device according to a seventh exemplary embodiment of the present invention.

Referring to FIG. 16, a communication device 40 according to the seventh exemplary embodiment of the present invention includes a transmission device 41 and a collision detection device 42.

The transmission device 41 includes a transmission part 411, an information management part 42, and an antenna 413.

The transmission part 411 has the same functions as the transmission part 311 in the fifth exemplary embodiment shown in FIG. 12. The information management part 412 has a function of transmitting transmission parameters including packet transmission power and a packet transmission time to the collision detection device 42. A transmission time represents a time from start of transmission of a packet to end of transmission of the packet. The transmission part 411 and the information management part 412 can be realized by a program-controlled CPU.

The collision detection device 42 includes a power detection part 421, an envelope extraction part 422, a collision detection part 423, a storage device 424, and an antenna 427.

The storage device 424 is provided with a sampled data storage part 425 and a threshold storage part 426. In the sampled data storage part 425 and the threshold storage part 426, the same information as in the sampled data storage part 325 and the threshold storage part 326 in the fifth exemplary embodiment shown in FIG. 12 is recorded.

The power detection part 421 has the same function as the power detection part 321 in the fifth exemplary embodiment shown in FIG. 12.

The envelope extraction part 422 has the following functions:

a function of calculating the number of sampled data corresponding to a packet sent from the information management part 412, on the basis of a transmission time of the packet and a frequency of sampling by the power detection part 421;

a function of finding two positive integers N and M which make a multiplication result N×M match the calculated number of sampled data, where N is preferably about 1% of the number of sampled data;

a function of putting sampled data sampled by the power detection part 421 into groups each including N pieces of adjacent sampled data and calculating the average values for the respective groups;

a function of, on the basis of the calculated average values for the respective groups, the first threshold Th1 larger than the clear channel assessment level and the second threshold Th2 larger than the threshold A corresponding to packet transmission power, detecting a portion including M pieces of consecutive average values equal to or more than the first threshold Th1 from chronological data of the average values for the respective groups and, among the average values for the respective groups included in the detection portion, replacing consecutive average values less than the second threshold Th2 with an average value of these consecutive average values and replacing consecutive average values equal to or more than the second threshold Th2 with an average value of these consecutive average values, where the threshold Th2 can be calculated by, for example, multiplying the threshold A corresponding to the transmission power searched from the threshold storage part 426 by a given value larger than 1;

a function of detecting a portion including (M−1) or less pieces of consecutive average values equal to or more than the first threshold Th1 and, among the average values for the respective groups included in the detection portion, replacing consecutive average values less than a second threshold Th2 with an average value of these consecutive average values and replacing consecutive average values equal to or more than the second threshold Th2 with an average value of these consecutive average values; and a function of generating chronological difference data showing the amount of change of the power of a spatial radio signal and the direction of the change by taking differences of adjacent average values in the chronological data of the average values after the replacement process.

The collision detection part 423 has a function of determining whether or not occurrence of packet collision is present on the basis of the chronological difference data generated by the envelope extraction part 422.

The power detection part 421, the envelope extraction part 422, and the collision detection part 423 can be realized by a program-controlled CPU.

[Description of Operation in Seventh Exemplary Embodiment]

Next, operation in this exemplary embodiment will be described in detail.

The operation of the communication device 40 shown in FIG. 16 will be described referring to flowcharts shown in FIGS. 17, 18 and 19.

Figure 17:
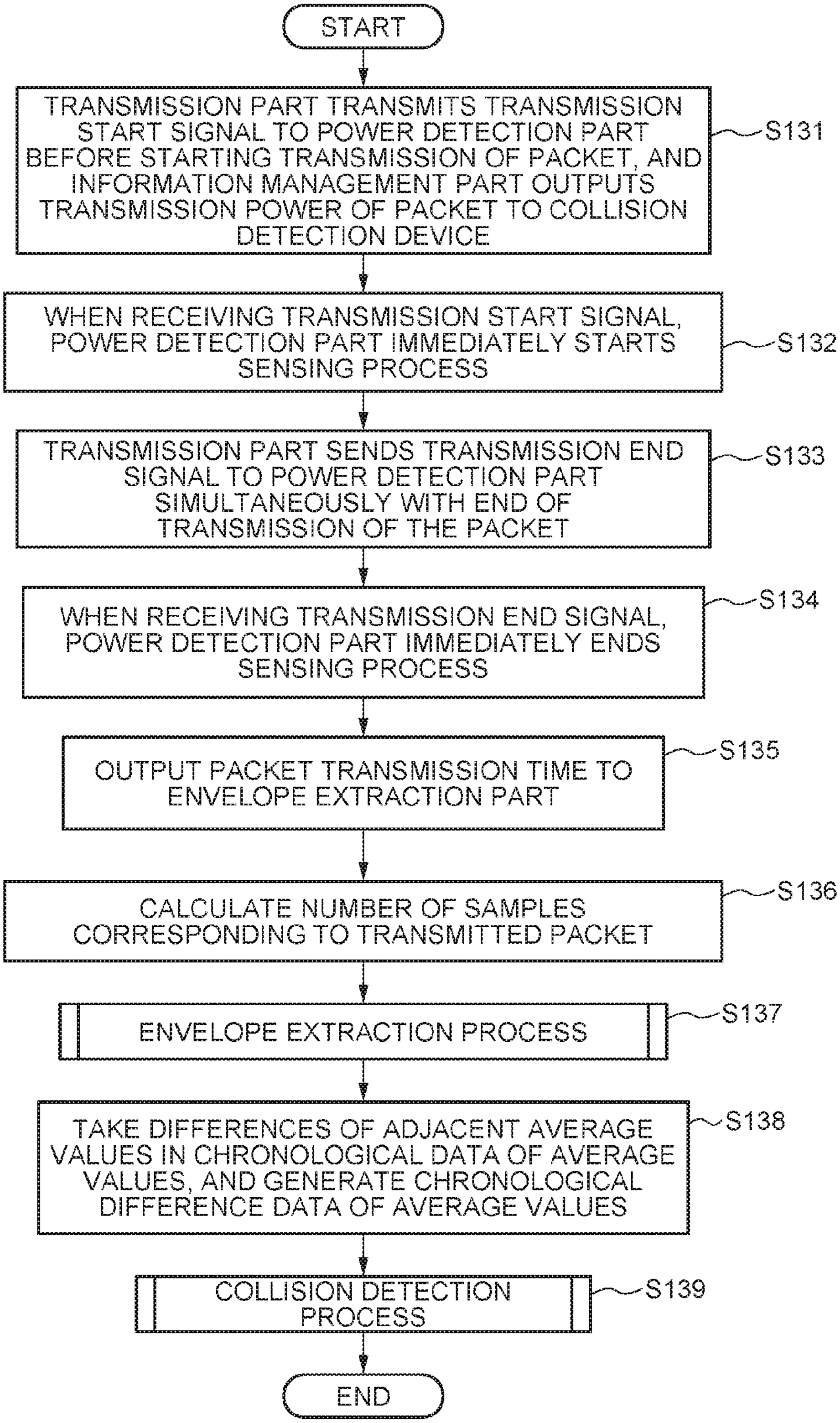
FIG. 17 is a flowchart showing an example of processing executed by the communication device according to the seventh exemplary embodiment of the present invention.

Referring to FIG. 17, before starting transmission of a packet, the transmission part 411 outputs a transmission start signal representing start of transmission of the packet to the power detection part 421. Further, the information management part 412 outputs the transmission power of the packet to the collision detection device 42 (step S131 of FIG. 17). Upon receiving the transmission start signal, the power detection part 421 immediately starts the same sensing process as described in the third exemplary embodiment in a selected frequency band (step S132). The selected frequency is the same frequency band as a frequency band used in packet transmission by the transmission part 411.

Next, simultaneously with end of transmission of the packet, the transmission part 411 outputs a transmission end signal representing end of transmission of the packet to the power detection part 421 (step S133). The power detection part 421 ends the power sensing process immediately after receiving the transmission end signal (step S134). The relation of packets transmitted by the transmission part 411 with the starting time and ending time of sensing is shown in FIG. 24.

After that, the information management part 412 outputs a transmission time required by the transmission part 411 to transmit the packet, to the envelope extraction part 422 (step S135).

The envelope extraction part 422 multiplies the transmission time of the packet described above and a sampling frequency used in power sensing by the power detection part 421, thereby calculating the number of sampled data corresponding to the packet (step S136). Moreover, at step S136, the envelope extraction part 422 also executes a process of obtaining two positive integers N and M which make the result of multiplication thereof to be the abovementioned number of sampled data. The sampling frequency used in power sensing is information previously recorded in the envelope extraction part 422. Meanwhile, the sampling frequency may be output from the power detection part 421 to the envelope extraction part 422 before the power detection part 421 starts power sensing. The process of calculating the number of sampled data at step S136 may be executed by the power detection part 421. The result of the process is output to the envelope extraction part 422. In this case, at step S135 of FIG. 17, the packet transmission time is output from the transmission part 411 to the power detection part 421.

Figure 25:
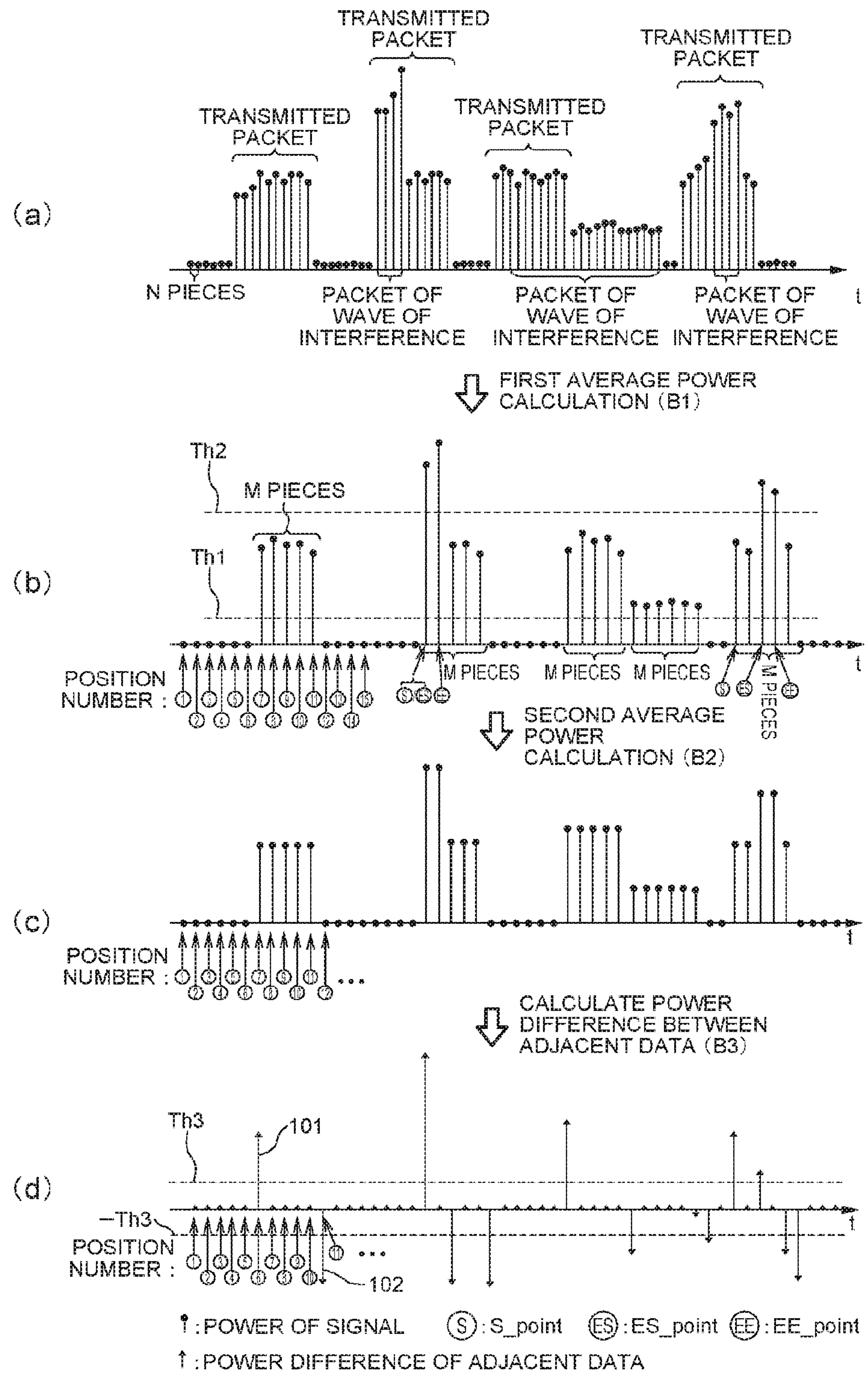
FIG. 25 is a diagram for describing the envelope detection process in the communication device according to the seventh exemplary embodiment of the present invention.

Next, the envelope extraction part 422 executes an envelope extraction process, which is extracting envelope information of a signal sensed by the power detection part 421, on the basis of the sampled data recorded into the sampled data storage part 425 by the power detection part 421 (step S137). Referring to FIG. 25, the summary of the envelope extraction process will be described. In FIG. 25, power is shown on the vertical axis and time is shown on the horizontal axis.

First, the envelope extraction part 422 executes a first average power calculation (B1 in FIG. 25) on the basis of sampled data shown in FIG. 25(*a*) recorded in the sampled data recording part 425 by the power detection part 421. To be specific, the envelope extraction part 422 divides the sampled data recorded in the sampled data storage part 425 into groups each including N pieces of sampled data, and calculates the average values for the respective groups. After that, in order to suppress the influence of noise, the envelope extraction part 422 converts elements which are smaller than the threshold of noise to L pieces of zeros. As a result, chronological data of the average values for the respective groups shown in FIG. 25(*b*) is obtained. In FIG. 25, N=2.

Next, the envelope extraction part 422 executes a second average power calculation (B2 in FIG. 25). In the second average power calculation, first, on the basis of the calculated average values for the respective groups described above, the first threshold Th1 larger than the clear channel assessment level and the second threshold Th2 larger than the threshold A corresponding to the transmission power of the packet, the envelope extraction part 422 detects a portion including M pieces of consecutive average values equal to or more than the first threshold Th1 from the chronological data of the average values for the respective groups described above. The envelope extraction part 422 replaces consecutive average values less than the second threshold Th2 among the average values for the respective groups included in the detected portion with an average value of these consecutive average values, and replaces consecutive average values equal to or more than the second threshold Th2 with an average value of these consecutive average values. Moreover, the envelope extraction part 422 detects a portion including (M−1) or less pieces of consecutive average values equal to or more than the first threshold Th1, and the envelope extraction part 422 replaces consecutive average values less than the second threshold Th2 among the average values for the respective groups included in the detected portion with an average value of these consecutive average values, and replaces consecutive average values equal to or more than the second threshold Th2 with an average value of these consecutive average values. That is the summary of the envelope extraction process executed at step S137.

Below, the envelope extraction process executed at step S137 will be described in detail referring to FIGS. 18 and 25.

First, the envelope extraction part 422 executes the first average power calculation mentioned above (B1 in FIG. 25). The second average power calculation (B2 in FIG. 25) will be described referring to FIG. 18.

Figure 18:
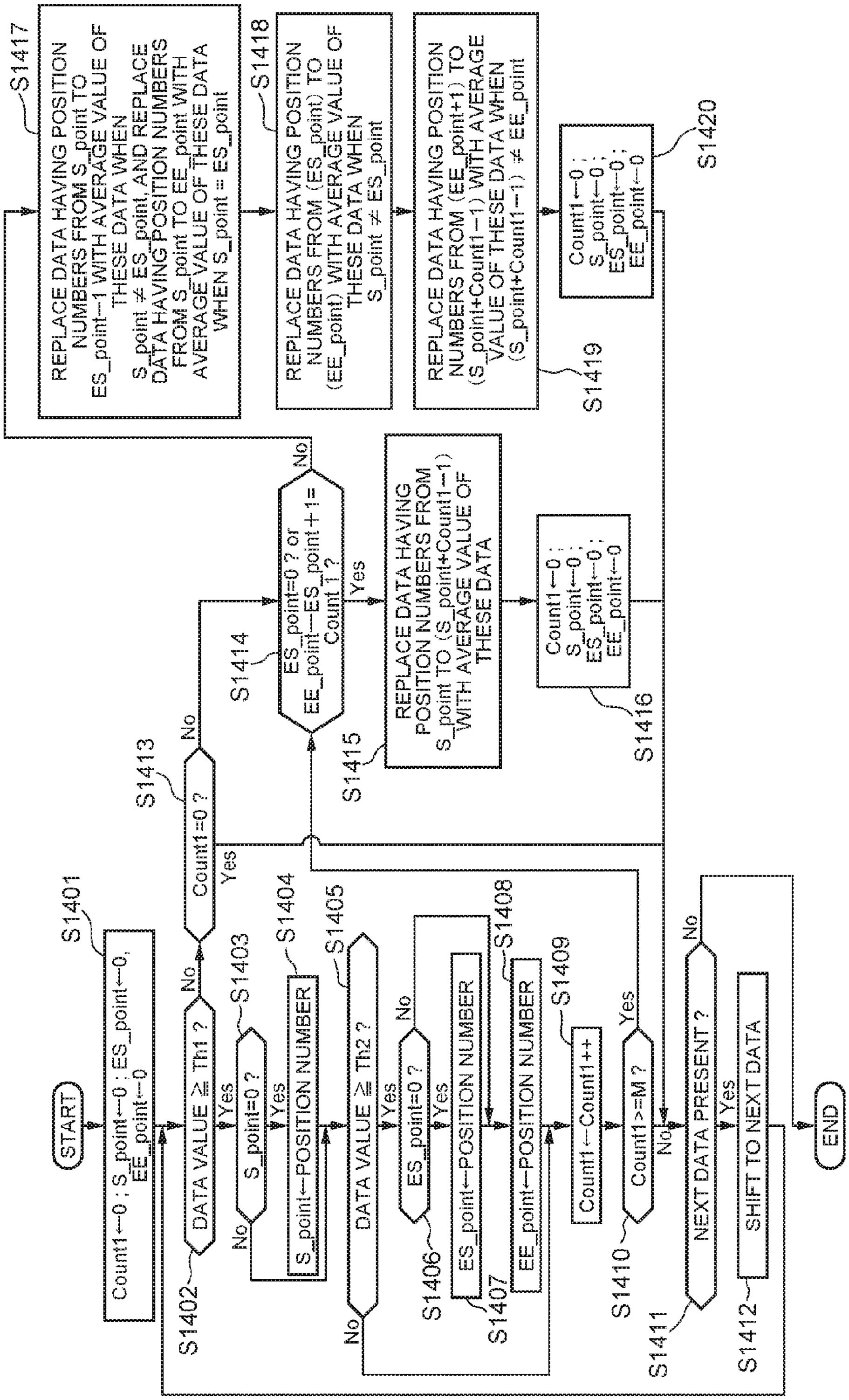
FIG. 18 is a flowchart showing an example of an envelope extraction process in the communication device according to the seventh exemplary embodiment of the present invention.

First, the envelope extraction part 422 gives a value zero to each of integral-type variables Count1, S_point, ES_point, and EE_point (step S1401 of FIG. 18).

Next, the envelope extraction part 422 compares the chronological data of the average values obtained in the first average power calculation with the threshold Th1 in order from first data (a first average value) of the chronological data (step S1402). In a case where the value of the data is equal to or more than the threshold Th1 (Yes at step S1402), the envelope extraction part 422 proceeds to step S1403. On the contrary, in a case where the value of the data is smaller than the threshold Th1 (No at step S1402), the envelope extraction part 422 proceeds to step S1413.

In the case of determining that the value of the variable S_point is zero (Yes at step S1403), the envelope extraction part 422 proceeds to step S1404. In the case of determining that the value of the variable S_point is not zero (No at step S1403), the envelope extraction part 422 proceeds to step S1405.

At step S1404, the envelope extraction part 422 sets the position number of the currently processed data to the variable S_point, and proceeds to step S1405. An example of position numbers is shown in FIG. 25. Position numbers are positive integers representing the order of data in a data stream.

At step S1405, the envelope extraction part 422 compares the value of the data described above with the threshold Th2. In a case where the value of the data is equal to more than the threshold Th2 (Yes at step S1405), the envelope extraction part 422 proceeds to step S1406. On the contrary, in a case where the value of the data is less than the threshold Th2 (No at step S1405), the envelope extraction part 422 proceeds to step S1409.

At step S1406, the envelope extraction part 422 determines whether or not the variable ES_point is zero. In a case where the variable ES_point is zero (Yes at step S1406), the envelope extraction part 422 proceeds to step S1407. In the other case (No at step S1406), the envelope extraction part 422 proceeds to step S1408. At step S1407, the envelope extraction part 422 sets the position number to the variable ES_point. At step S1408, the envelope extraction part 422 sets the position number to the variable EE_point. Next, at step S1409, the envelope extraction part 422 increments (+1) the variable Count1.

At step S1410, the envelope extraction part 422 compares the value of the variable Count1 with the value of M.

In a case where the value of the variable Count1 is equal to or more than M (Yes at step S1410), the envelope extraction part 422 proceeds to step S1414. On the contrary, in a case where the value is less than M (No at step S1410), the envelope extraction part 422 proceeds to step S1411.

At step S1411, the envelope extraction part 422 determines whether or not other data is present after the above-mentioned data. In a case where other data is present (Yes at step S1411), the envelope extraction part 422 proceeds to step S1412. On the contrary, in a case where other data is not present (No at step S1411), the envelope extraction part 422 ends the second average power calculation.

At step S1412, the envelope extraction part 422 proceeds to step S1402 to execute processing on next data.

At step S1413, in the case of determining that the value of the variable Count1 is zero (Yes at step S1413), the envelope extraction part 422 proceeds to step S1411. On the contrary, at step S1413, in the case of determining that the value of the variable Count1 is not zero (No at step S1413), the envelope extraction part 422 proceeds to step S1414.

At step S1414, the envelope extraction part 422 determines whether a condition that the value of the variable ES_point is zero or a condition (EE_point−ES_point+1)=Count1 is satisfied or not. In a case where the condition is satisfied (Yes at step S1414), the envelope extraction part 422 proceeds to step S1415. In a case where the condition is not satisfied (No at step S1414), the envelope extraction part 422 proceeds to step S1417.

At step S1415, the envelope extraction part 422 replaces data having position numbers from S_point to "S_point+Count1−1" with an average value of these data, and proceeds to step S1416.

At step S1416, the envelope extraction part 422 gives a value zero to Count1, S_point, ES_point and EE_point, and proceeds to step S1411.

At step S1417, the envelope extraction part 422 compares the variable S_point with the variable ES_point. In a case where these variables do not coincide with each other, the envelope extraction part 422 replaces data having position numbers from S_point to ES_point−1 with an average value of these data. On the contrary, in a case where these variables coincide with each other, the envelope extraction part 422 replaces data having position numbers from S_point to EE_point with an average value of these data.

Next, at step S1418, the envelope extraction part 422 compares the variable S_point with the variable ES_point. In a case where these variables do not coincide with each other, the envelope extraction part 422 replaces data having position numbers from ES_point to EE_point with an average value of these data, and thereafter, proceeds to step S1419. On the contrary, in a case where these variables coincide with each other, the envelope extraction part 422 proceeds to step S1419.

Next, at step S1419, the envelope extraction part 422 compares (S_point+Count1−1) with the variable EE_point. In a case where these variables do not coincide with each other, the envelope extraction part 422 replaces data having position numbers from (EE_point+1) to (S_point+Count1−1) with an average value of these data, and thereafter, proceeds to step S1420. On the contrary, in a case where these variables coincide with each other, the envelope extraction part 422 proceeds to step S1420. At step S1420, the envelope extraction part 422 gives a value zero to Count1, S_point, ES_point and EE_point, and proceeds to step S1411. That is the details of the envelope extraction process executed at step S137 of FIG. 17.

Through execution of the above processing, the chronological data of the average values as shown in FIG. 25(*c*) is generated. The envelope extraction part 422 records the generated chronological data of the average values into the storage device 424.

After that, the envelope extraction part 422 takes differences of adjacent average values in the chronological data of the average values as shown in FIG. 25(*c*), thereby generating chronological difference data showing the change amount of the power of a spatial radio signal and the direction of the change as shown in FIG. 25(*d*) (step S138).

After that, the collision detection part 423 executes a collision detection process on the basis of the chronological difference data generated by the envelope extraction part 422 (step S139). Step S139 of FIG. 17 will be described referring to FIG. 19.

Figure 19:
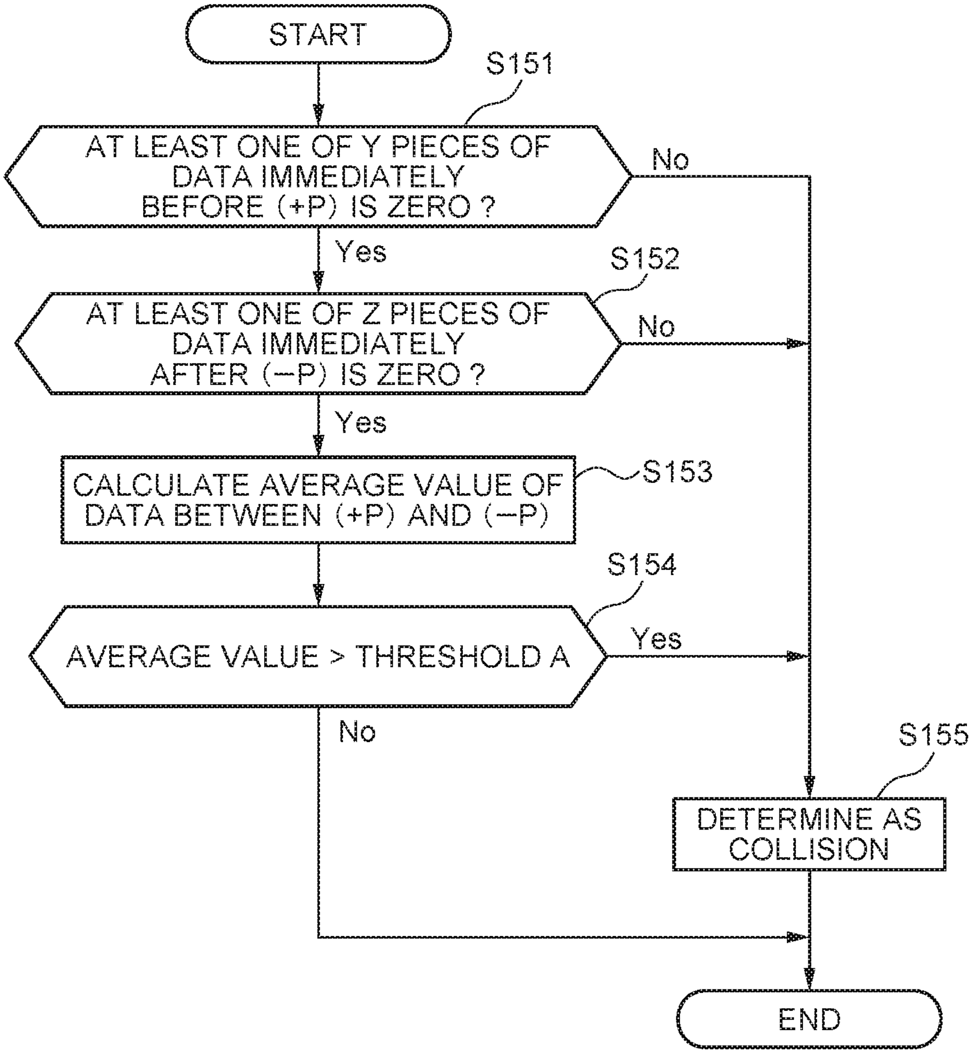
FIG. 19 is a flowchart showing an example of a collision detection process executed in the seventh exemplary embodiment of the present invention.

Referring to a flowchart of FIG. 19, at step S151, the collision detection part 423 determines whether or not zero is present in Y pieces of consecutive data immediately before a pulse first exceeding a threshold Th3 in the chronological difference data shown in FIG. 25(*d*). Herein, the threshold Th3 can be a value (a fixed value) which is smaller than the lowest value of transmission power that can be taken by the transmission part 411 and is larger than the clear channel assessment level. Alternatively, the threshold Th3 can also be a value (a variable value) which is corresponding to the transmission power of a packet transmitted by the transmission part 411, and which is smaller than the transmission power of the packet and larger than the clear channel assessment level. In the case of a variable value, candidates for the threshold Th3 are previously recorded in the threshold storage part 426 in association with a plurality of transmission power that can be taken by the transmission part 411, respectively, and the collision detection part 423 determines the candidate recorded in association with the transmission power sent from the information management part 412 as the threshold Th3. Moreover, Y is set to a proper value in consideration of device performance (for example, a sampling frequency and the like), the number L of elements which are replaced with zero at step S1418 in FIG. 18, and so on. Herein, a pulse larger than the threshold Th3 may be expressed as a pulse (+P), and a pulse smaller than a negative threshold −Th3 may be expressed as a pulse (−P).

In the case of determining that at least one of the Y pieces of consecutive data is zero (Yes at step S151), the collision detection part 423 proceeds to step S152. In the other case, or in a case where none of the Y pieces of consecutive data is zero (No at step S151), the collision detection part 423 determines that occurrence of packet collision is present (at step S155).

At step S152, the collision detection part 423 determines whether or not zero is present in Z pieces of consecutive data immediately after a pulse (−P) first falling below the negative threshold −Th3 in the chronological difference data shown in FIG. 25(*d*). Herein, Z is set to a proper value in consideration of device performance (for example, a sampling frequency and the like), the number L of elements which are replaced with zero at step S1418 in FIG. 18, and so on. Further, as a method for finding a first pulse (−P) in the chronological difference data, it is possible to employ the following methods, for example: actually comparing a pulse with the threshold −Th3; and setting an $M^{th}$ pulse from a pulse (+P) first exceeding the threshold Th3 (for example, $6^{th}$ data in FIG. 25(*d*)) as the pulse (−P) (for example, $11^{th}$ data in FIG. 25(*d*)).

For the processes of steps S151 and 152, it is possible to use the result of the first average power calculation (B1 in FIG. 25) or the result of the second average power calculation (B2 in FIG. 25). In this case, the collision detection part 423 determines at step S152 whether or not at least one zero is present in Z pieces of consecutive data immediately after $(M-1)^{th}$ data (for example, $7^{th}$ data in FIG. 25(*b*) or $7^{th}$ data in FIG. 25(*c*)) from data first exceeding the threshold Th3 (for example, $11^{th}$ data in FIG. 25(*b*) or $11^{th}$ data in FIG. 25(*c*)).

In the case of determining at least one zero is present (Yes at step S152), the collision detection part 423 proceeds to step S153. In the other case, or in a case where none of the Z pieces of data is zero (No at step S152), the collision detection part 423 determines that occurrence of packet collision is present (step S155). The reason for executing the processes of steps S151 and S152 is as follows. There is a case where power of a packet which is the other party of collision is lower than CCA of the communication device 40 (that is, lower than Th1) and larger than a noise threshold. In this case, there are the following two patterns: a packet transmitted from the communication device 40 collides with an early transmitted packet that is the other party of collision; and a packet transmitted from the communication device 40 collides with a later transmitted packet that is the other party of collision. The processes of steps S151 and S152 are executed to detect these two collision patterns. Ideally, it can be determined that there is no packet collision when the Y pieces or Z pieces of consecutive data are all zero. However, there is a case where a noise which is larger than the noise threshold is present, and hence, in order not to mistakenly determine in this case, it is determined that occurrence of packet collision is not present even when at least one of the Y pieces or Z pieces of consecutive data is zero.

At step S153, on the basis of the chronological data of the power average values recorded into the storage device 424 by the envelope extraction part 422, the collision detection part 423 calculates an average value of power of a spatial radio signal in a packet transmission time. To be specific, the collision detection part 423 adds an average value corresponding to a pulse (+P) first exceeding the threshold Th3 among the average values recorded in the storage device 424, to (M−1) pieces of average values immediately after the abovementioned average value, and divides the addition result by M, thereby calculating an average value of power of a spatial radio signal in a packet transmission period. For example, assuming the chronological data of the average values recorded in the storage device 424 is that shown in FIG. 25(*c*) and the chronological difference data generated at step S138 in FIG. 17 is that shown in FIG. 25(*d*), the average value of power of a spatial radio signal in a packet transmission period is found by adding the average values having position numbers from "7" to "11" in FIG. 25(*c*) and dividing the addition result by 5. Meanwhile, the average value of power can also be found in the following manner. The collision detection part 423 adds from an average value corresponding to a pulse (+P) currently processed to an average value immediately previous to an average value corresponding to a pulse (−P) currently processed among the average values recorded in the storage device 424, and divides the addition result by M, thereby calculating the average value of the power of a spatial radio signal in a packet transmission period. At step S154, the collision detection part 423 compares the power average value of a spatial radio signal in a packet transmission period found at step S153 with the threshold A. In a case where the power average value is larger than the threshold A (Yes at step S154), the collision detection part 423 determines that occurrence of packet collision is present (step S155). On the contrary, in a case where the average value is equal to or less than the threshold A (No at step S154), the collision detection part 423 ends the processing.

Figure 27:
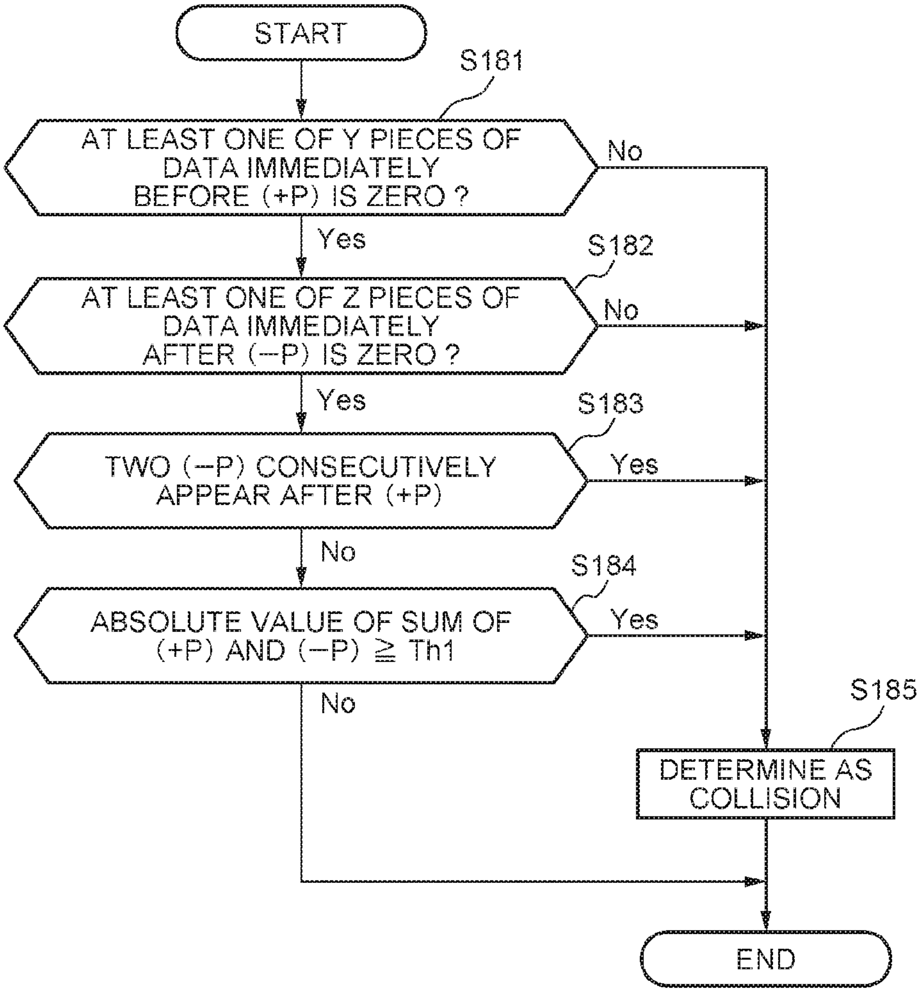
FIG. 27 is a flowchart showing another example of the collision detection process executed in the seventh exemplary embodiment of the present invention.

Meanwhile, as the collision detection process executed at step S139 of FIG. 17, processing as shown in a flowchart of FIG. 27 may be executed.

To be specific, at step S181, the collision detection part 423 determines whether or not at least one zero is present in Y pieces of consecutive data immediately before a pulse (+P) first exceeding the threshold Th3 among the chronological difference data. In the case of determining that at least one zero is present (Yes at step S181), the collision detection part 423 proceeds to step S182. In the other case, or in a case where none of the Y pieces of data is zero (No at step S181), the collision detection part 423 determines that occurrence of packet collision is present (step S185).

At step S182, the collision detection part 423 determines whether or not at least one zero is present in Z pieces of consecutive data immediately after a pulse (−P) first falling below the negative threshold −Th3 among the chronological difference data. In the case of determining that at least one zero is present (Yes at step S182), the collision detection part 423 proceeds to step S183. In the other case, or in a case where none of the Z pieces of data is zero (No at step S182), the collision detection part 423 determines that occurrence of packet collision is present (step S185).

At step S183, the collision detection part 423 determines whether or not at least two minus pulses (−P) smaller than the negative threshold −Th3 consecutive appear in data after a plus pulse (+P) larger than the threshold Th3 among the chronological difference data.

In the case of determining that minus pulses consecutively appear (Yes at step S183), the collision detection part 423 determines that occurrence of packet collision is present (step S185). In the other case (No at step S183), the collision detection part 423 proceeds to step S184. A plus pulse (+P) larger than the threshold Th3 is not present in data between the abovementioned at least two minus pulses which consecutively appear.

At step S184, the collision detection part 423 determines whether or not a minus pulse (−P) smaller than the negative threshold −Th3 is present in the abovementioned data after the plus pulse (+P) larger than the threshold Th3 in the chronological difference data and also the absolute value of the sum of the plus pulse (+P) and the minus pulse (−P) is equal to or more than the threshold Th1. In the case of determining the absolute value is equal to or more than the threshold Th1 (Yes at step S184), the collision detection part 423 determines occurrence of packet collision is present (step S185). In the other case (No at step S184), the collision detection part 423 ends the processing. A difference between the collision detection process shown in FIG. 19 and the collision detection process shown in FIG. 27 is that the collision detection process shown in FIG. 27 allows collision detection from a pulse pattern without using the threshold A.

Figure 20:
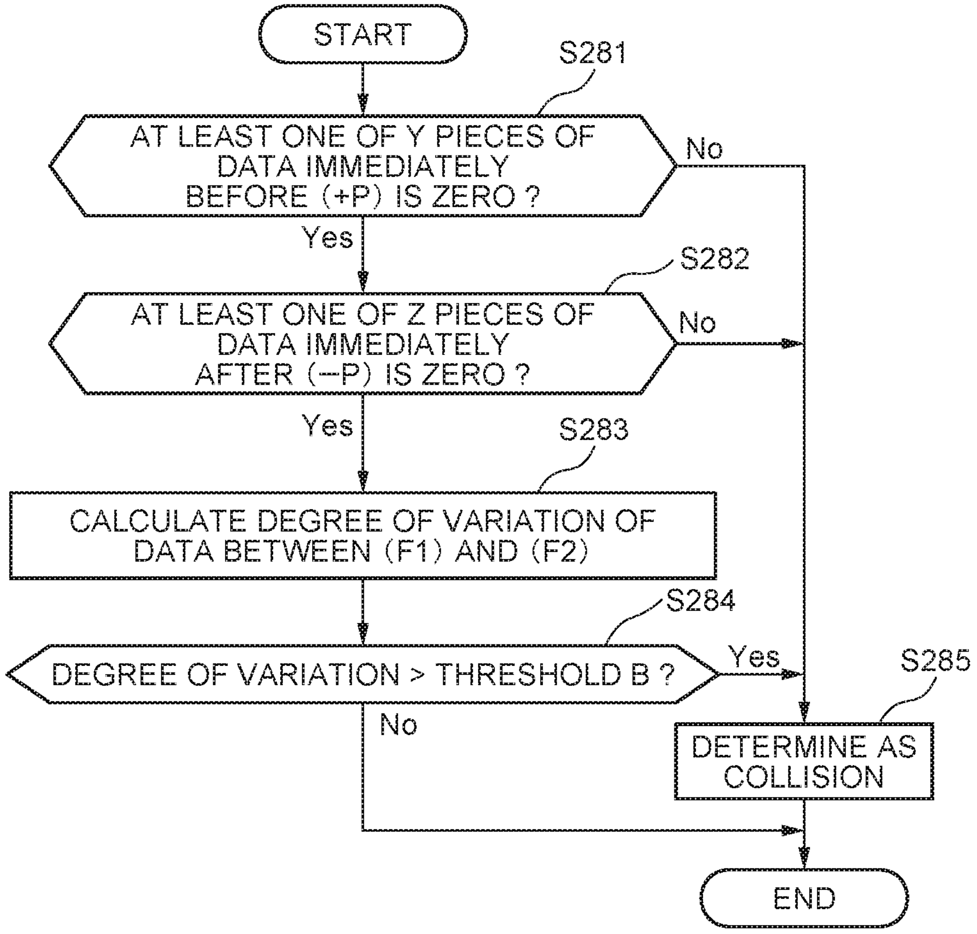
FIG. 20 is a flowchart showing another example of the collision detection process executed in the seventh exemplary embodiment of the present invention.

Meanwhile, as the collision detection process executed at step S139 of FIG. 17, processing shown in a flowchart of FIG. 20 may be executed.

To be specific, at step S281, the collision detection part 423 determines whether or not at least one zero is present in Y pieces of consecutive data immediately before a pulse (+P) first exceeding the threshold Th3 in the chronological difference data. In the case of determining at least one zero is present in the Y pieces of data (Yes at step S281), the collision detection part 423 proceeds to step S282. In the other case, or in a case where none of the Y pieces of data is zero (No at step S281), the collision detection part 423 determines occurrence of packet collision is present (step S285).

At step S282, the collision detection part 423 determines whether or not at least one zero is present in Z pieces of consecutive data immediately after a pulse (−P) first falling below the negative threshold −Th3 in the chronological difference data. In the case of determining at least one zero is present (Yes at step S282), the collision detection part 423 proceeds to step S283. In the other case, or in a case where none of the Z pieces of data is zero (No at step S282), the collision detection part 423 determines occurrence of packet collision is present (step S285).

At step S283, the collision detection part 423 calculates the degree of variation of data from data F1 first exceeding the threshold Th1 to $(M-1)^{th}$ data F2 immediately after the first exceeding data among the data calculated in the first average power calculation process shown in FIG. 25(*b*). That is to say, the collision detection part 423 calculates the degree of variation of the average values for each group in a packet transmission period. The degree of variation is calculated by the equation 1 mentioned before, for example. However, in this exemplary embodiment, $x_1$ represents the value of $i^{th}$ data in the data from F1 to F2, and μ represents the average value of the data from F1 to F2.

At step S284, the collision detection part 423 compares the degree of variation found at step S283 with the threshold B corresponding to packet transmission power searched from the threshold storage part 126*b* as shown in FIG. 6. In a case where the degree of variation is more than the threshold B (Yes at step S284), the collision detection part 423 determines that occurrence of packet collision is present (step S285). On the contrary, in a case where the degree of variation is equal to or less than the threshold B (No at step S284), the collision detection part 423 ends the processing.

The threshold B corresponding to transmission power is determined by the collision detection part 423 before the collision detection process. To be specific, thresholds Thx, Thy, Tyz, . . . corresponding to transmission power W1, W2, W3, . . . are determined in the following way. First, in an environment without a spatial radio signal of another radio, a packet is transmitted from the transmission part 411 at transmission power W1. Next, the average values for the respective groups each including N pieces of sampled data are found by execution of the same processes as those of steps S131 to S137 of FIG. 17 described before (see FIG. 25(*b*)). After that, the degree of variation is calculated by the same method as at step S283 described before. The calculation result Thx is determined as the threshold B for the transmission power W1. Meanwhile, a value obtained by correcting the calculated degree of variation in consideration of environment noise and the like can also be determined as the threshold B. The same processing is executed on the other transmission power W2, W3, . . . , and the thresholds Thy, Thz, . . . are thereby determined. Meanwhile, it is also possible to employ the following method: with respect to one transmission power, transmitting packets a plurality of times at the transmission power, calculating the degree of variation every time at step S283, and determining the largest degree of variation among the calculation results as the threshold B for the transmission power.

Figure 21:
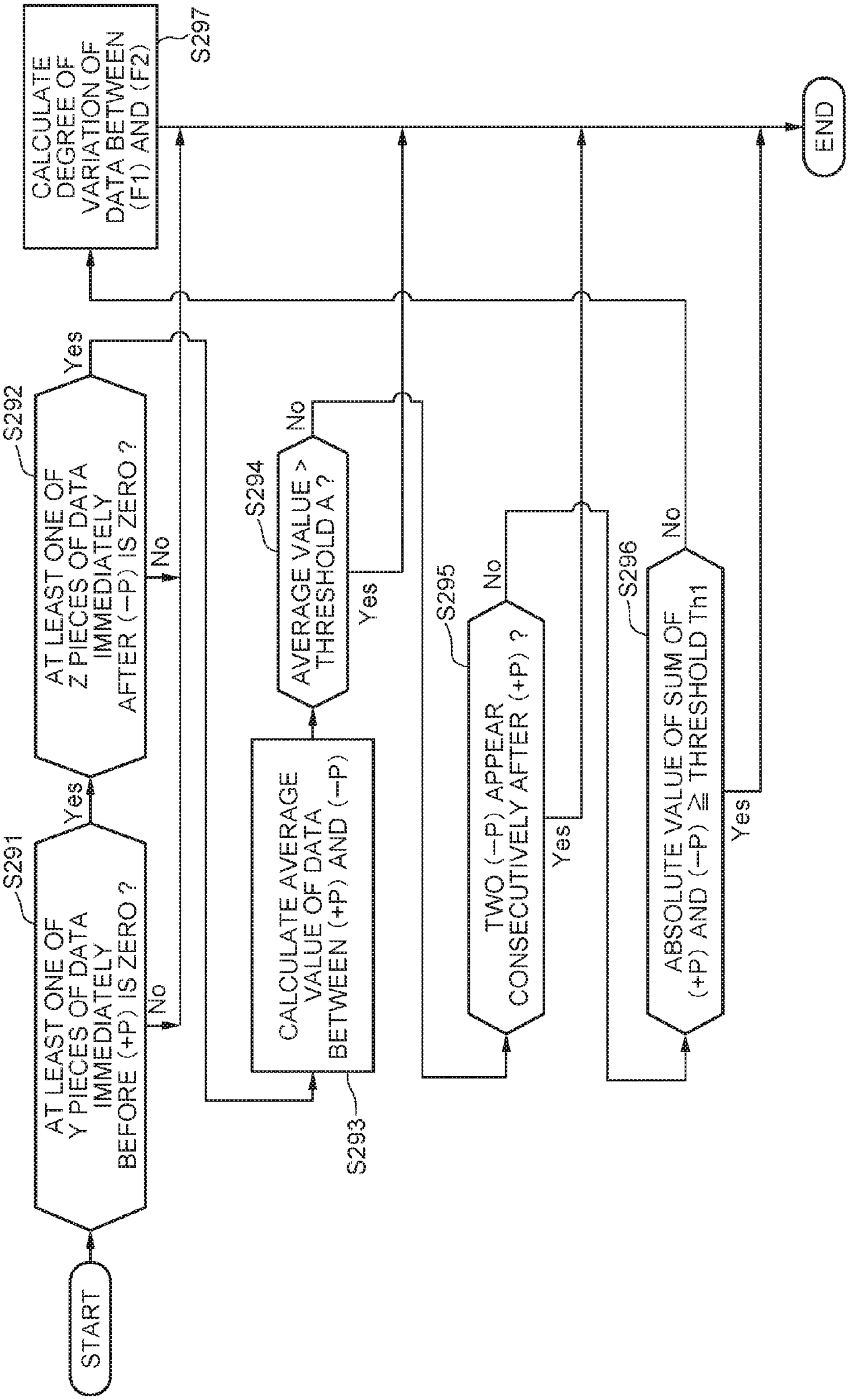
FIG. 21 is a flowchart showing part of an example of a threshold B generation process in the communication device according to the seventh exemplary embodiment of the present invention.
Figure 22:
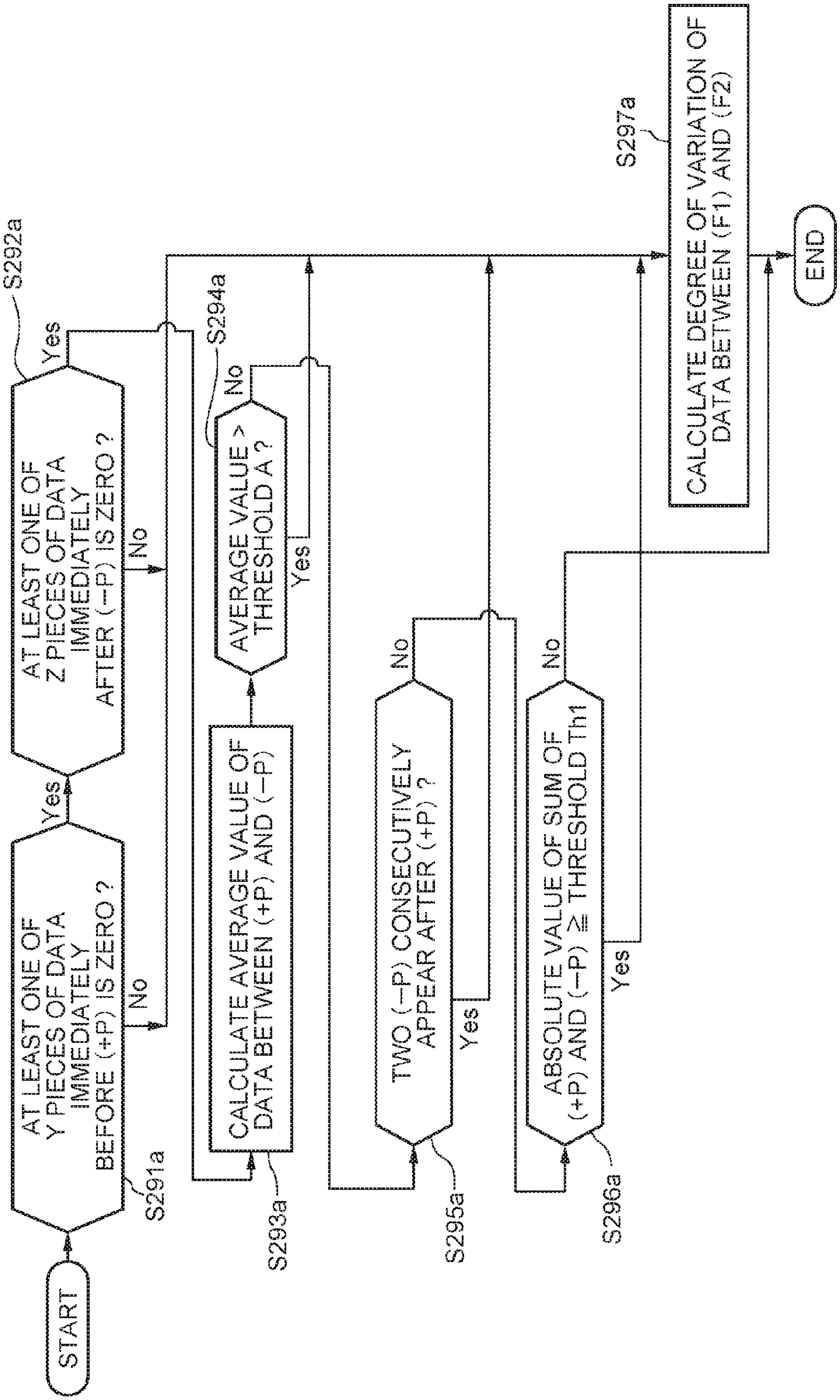
FIG. 22 is a flowchart showing part of an example of the threshold B generation process in the communication device according to the seventh exemplary embodiment of the present invention.

Further, in an environment with a spatial radio signal of another radio, it is possible to determine the threshold B for one transmission power by using the degree of variation calculated in processing shown in FIGS. 21 and 22. Packets are transmitted a plural of times at the transmission power, and the degree of variation is calculated every time in the processing shown by flowcharts of FIGS. 21 and 22.

In FIG. 21, the degree of variation of the data between the data F1 and the data F2 is calculated (step S297) in the following case: zero is present in Y pieces of consecutive data immediately before a pulse (+P) first exceeding the threshold Th3 in the chronological difference data shown in FIG. 25(*d*) (Yes at step S291), zero is present in Z pieces of consecutive data immediately after a pulse (−P) first falling below the negative threshold −Th3 in the chronological difference data (Yes at step S292), the average value of the data between the pulse (+P) and the pulse (−P) is equal to or less than the threshold A mentioned before (step S293, and No at step S294), two pulses (−P) do not appear consecutively after the pulse (+P) (No at step S295), and the absolute value of the sum of the pulse (+P) and the pulse (−P) is less than the first threshold Th1 (Yes at step S296). Step S291 of FIG. 21 corresponds to step S151 of FIG. 19 and step S181 of FIG. 27. Step S292 of FIG. 21 corresponds to step S152 of FIG. 19 and step S182 of FIG. 27. Step S293 of FIG. 21 corresponds to step S153 of FIG. 19. Step S294 of FIG. 21 corresponds to step S154 of FIG. 19. Step S295 of FIG. 21 corresponds to step S183 of FIG. 27. Step S296 of FIG. 21 corresponds to step S184 of FIG. 27. The degree of variation of the data between the data F1 and the data F2, calculated at step S297 of FIG. 21, represents the degree of variation of a packet when occurrence of packet collision is not present.

Further, in FIG. 22, the degree of variation of the data between the data F1 and the data F2 is calculated (step S297*a*) in any of the following cases: none is zero in Y pieces of consecutive data immediately before a pulse (+P) first exceeding the threshold Th3 in the chronological difference data shown in FIG. 25(*d*) (No at step S291*a*); none is zero in Z pieces of consecutive data immediately after a pulse (−P) first falling below the negative threshold −Th3 in the chronological difference data (No at step S292*a*); the average value of the data between the pulse (+P) and the pulse (−P) exceeds the threshold A mentioned before (step S293*a*, and Yes at step S294*a*); two pulses (−P) appear consecutively after the pulse (+P) (Yes at step S295*a*); or the absolute value of the sum of the pulse (+P) and the pulse (−P) is equal to or more than the first threshold Th1 (Yes at step S296*a*). Step S291*a* of FIG. 22 corresponds to step S151 of FIG. 19 and step S181 of FIG. 27. Step S292*a* of FIG. 22 corresponds to step S152 of FIG. 19 and step S182 of FIG. 27. Step S293*a* of FIG. 22 corresponds to step S153 of FIG. 19. Step S294*a* of FIG. 22 corresponds to step S154 of FIG. 19. Step S295*a* of FIG. 22 corresponds to step S183 of FIG. 27. Step S296*a* of FIG. 22 corresponds to step S184 of FIG. 27. The degree of variation of the data between the data F1 and the data F2, calculated at step S297*a* of FIG. 22, represents the degree of variation of a packet when occurrence of packet collision is present.

Figure 26:
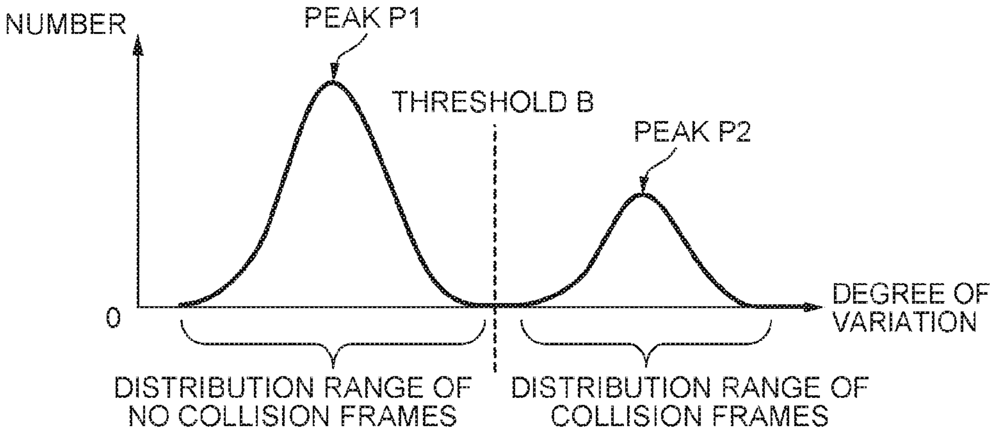
FIG. 26 is a diagram for describing an example of the threshold B determination method in the communication device according to the seventh exemplary embodiment of the present invention.

After that, a distribution diagram as shown in FIG. 26 is created. The diagram shows the degree of variation in no packet collision calculated in accordance with the flowchart of FIG. 21 and the degree of variation in packet collision calculated in accordance with the flowchart of FIG. 22. In FIG. 26, the degree of variation is put on the horizontal axis and the number of pieces is put on the vertical axis.

As apparent from FIG. 26, there is a difference in distribution of the degrees of variation between a case where occurrence of packet collision is not present and a case where occurrence of packet collision is present. In this exemplary embodiment, between a peak P1 of the number of the degrees of variation when occurrence of packet collision is not present and a peak P2 of the number of the degrees of variation when occurrence of packet collision is present, the degree of variation with the smallest number of distributions is determined as the threshold B. In a case where, as shown in FIG. 26, the degrees of variation with the smallest number of distributions have a width to some extent, the degree of variation in the center thereof is determined as the threshold B. Alternatively, the threshold B may be determined in the following manner: regardless of the presence or absence of packet collision, calculating degrees of variation for a plurality of packets, and creating a distribution diagram as shown in FIG. 26 showing the distribution of the calculated degrees of variation; and after that, finding the degree of variation with the smallest number of distributions between two peaks of the degrees of variation, and determining the degree of variation as the threshold B. Further, the threshold B may be determined in the following manner: calculating the degrees of variation of a plurality of packets without occurrence of packet collision and the degrees of variation of a plurality of packets of the collision pattern of FIG. 24(*b*) from which packet collision cannot be completely detected in the processes at steps S293, S294, S295 and S296 (executing the processing of FIG. 21 on a plurality of packets to calculate the degrees of variation for the plurality of packets), and creating a distribution diagram as shown in FIG. 26 showing the distribution of the calculated degrees of variation; and thereafter finding the degree of variation with the smallest number of distributions between two peaks of the numbers of the degrees of variation, and determining the degree of variation as the threshold B.

Now, a difference between the collision detection process shown in FIG. 20 and the collision detection processes shown in FIGS. 19 and 27 will be described. In an ideal environment, when packets are transmitted at the same transmission power from the transmission part 411, the reception power of the packets detected by the power detection part 421 are constant. However, in a real environment, the reception power detected by the power detection part 421 may fluctuate (increase or decrease) due to the influences of reflection, environmental noise and so on. When the reception power detected by the power detection part 421 decreases due to the fluctuation, packet collision as shown in FIG. 24(*b*), namely, collision between part of a packet transmitted by the transmission part 411 and a packet transmitted by another radio may be unable to be detected in the collision detection processes based on the average power and the threshold A as shown in FIGS. 19 and 27. Further, when the reception power increases due to the fluctuation, it may be determined that occurrence of packet collision is present though occurrence of packet collision is not present. On the other hand, in the collision detection process based on the degree of variation of the reception power and the threshold B as shown in FIG. 20, packet collision as shown in FIG. 24(*b*) can be detected even when the reception power decreases due to the fluctuation, and it can be prevented to determine by mistake that occurrence of collision is present even when the reception power increases due to the fluctuation.

Figure 23:
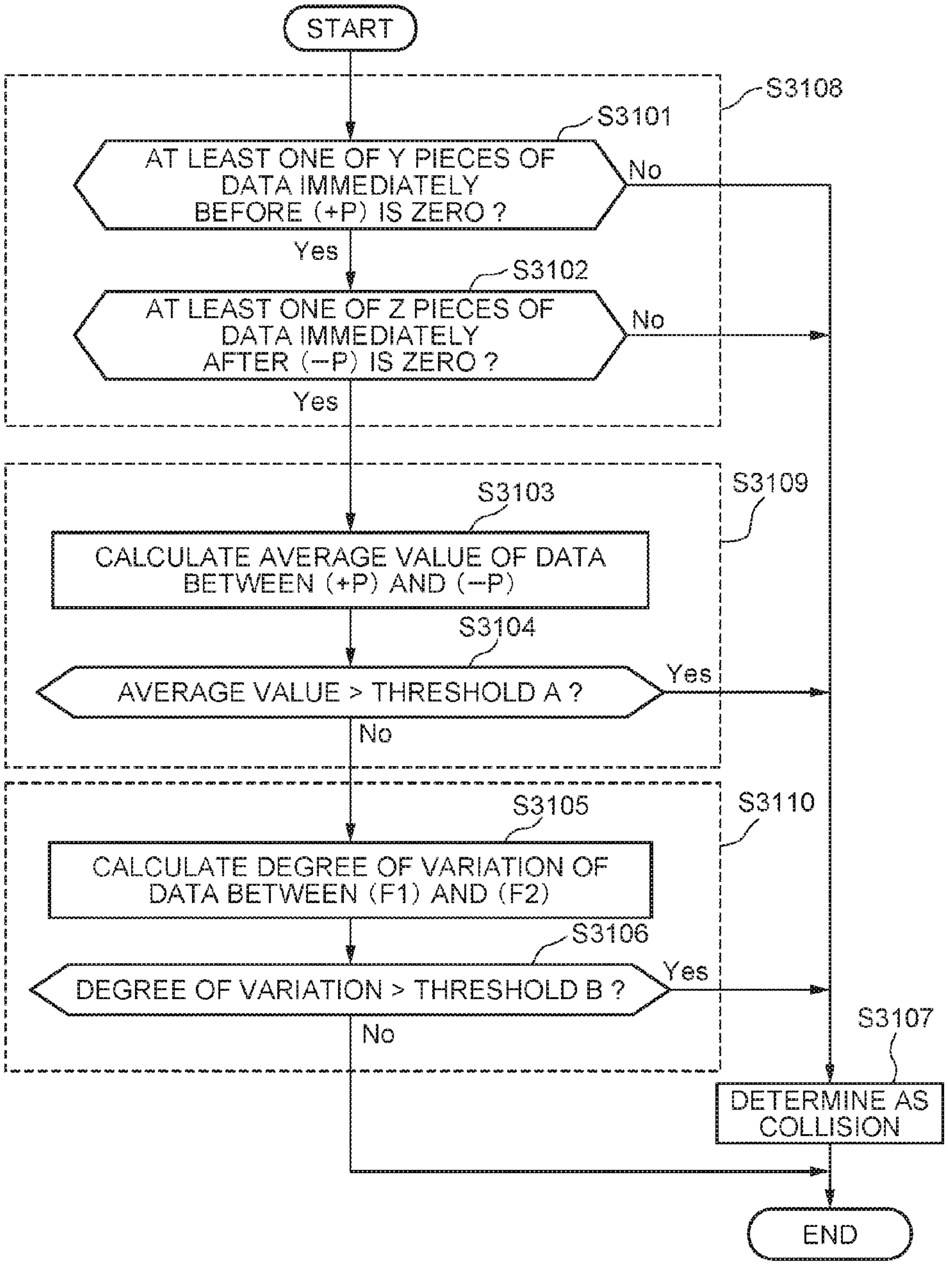
FIG. 23 is a flowchart showing another example of the collision detection process executed in the seventh exemplary embodiment of the present invention.

Further, as the collision detection process executed at step S139 of FIG. 17, processing shown in a flowchart of FIG. 23 may be executed. The collision detection process shown in FIG. 23 is combination of those shown in FIGS. 19, 20 and 27. Blocks S3108, S3109 and S3110 represented by dotted lines in FIG. 23 correspond to the collision detection processes of FIGS. 19, 20 and 27, respectively. That is to say, the block S3108 shown by the dotted line in FIG. 23 corresponds to steps S151 and S152 of FIG. 19, steps S281 and S282 of FIG. 20, and steps S181 and S182 of FIG. 27. The block S3109 shown in FIG. 23 corresponds to steps S153 and S154 of FIG. 19. The block S3110 shown in FIG. 23 corresponds to steps S283 and S284 of FIG. 20. The processes of the blocks S3108, S3109 and S3110 may be executed in an order other than shown in FIG. 23.

Further, in the collision detection process executed at step S139 of FIG. 17, a divergence value may be used. For example, before the collision detection process, in an environment without a spatial radio signal of another radio, the average value of reception power of packets transmitted at respective transmission power and the degree of variation of the reception power of the packets transmitted at the respective transmission power are found and stored as reference data. In an environment where a signal of interference is present, the collision detection part 423 calculates the average value of power of packets received by the power detection part 411 and the degree of variation of the power, compares the power average value and the degree of power variation with the respective reference data, and calculates divergence as the difference. Divergence is an amount representing an information theoretical distance from a statistical value. In a case where the value of the divergence is more than a given range, it is determined that collision is present. For calculation of the value of divergence, KL divergence (Kullback-Leibler divergence), Jeffrey divergence, or the like is used.

Figure 28:
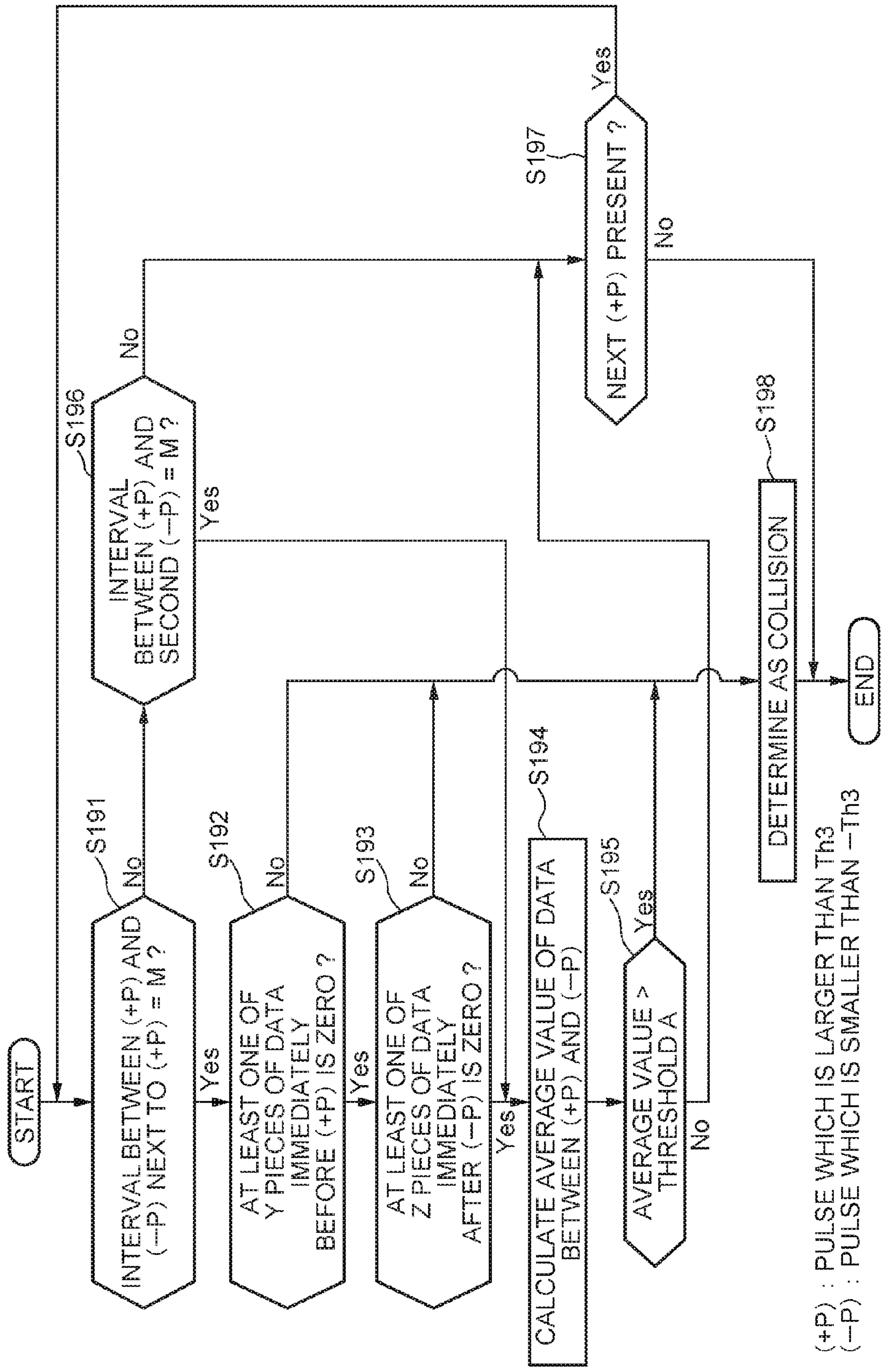
FIG. 28 is a flowchart showing another example of the collision detection process executed in the seventh exemplary embodiment of the present invention.

Further, as the collision detection process executed at step S139 of FIG. 17, a process shown in a flowchart of FIG. 28 may be executed.

To be specific, at step S191, the collision detection part 423 determines whether or not a minus pulse (−P) smaller than the negative threshold −Th3 is present in data after a pulse (+P) first exceeding the threshold Th3 in the abovementioned chronological difference data and also an interval between the plus pulse (+P) and a first minus pulse (−P) in the data after the pulse (+P) is equal to M. Between the pulse (+P) and the pulse (−P), either a pulse (+P) or (−P) is not present. In the case of determining the interval is equal to M (Yes at step S191), the collision detection part 423 proceeds to step S192. In the case of determining the interval is not equal to M (No at step S191), the collision detection part 423 proceeds to step S196. The interval between the pulse (+P) and the pulse (−P) is defined as the difference between the position number of the minus pulse (−P) and the position number of the plus pulse (+P). A specific calculation method will be described referring to FIG. 25.

To be specific, in FIG. 25(*d*), a pulse 101 is a plus pulse (+P) larger than the threshold Th3. A pulse 102 is a minus pulse (−P) smaller than the negative threshold −Th3. The position number of the pulse 102 is "11" and the position number of the pulse 101 is "6." Therefore, the interval between the pulse 102 and the pulse 101 is 5.

At step S196, the collision detection part 423 determines whether or not a second minus pulse (−P) smaller than the negative threshold −Th3 is present in the data after the pulse (+P) first exceeding the threshold Th3 in the chronological difference data and also an interval between the plus pulse (+P) and the minus pulse (−P) is equal to M. In the case of determining the interval is equal to M (Yes at step S196), the collision detection part 423 proceeds to step S194. In the case of determining the interval is not equal to M (No at step S196), the collision detection part 423 proceeds to step S197. Between the first pulse (−P) and the second pulse (−P), a plus pulse (+P) is not present.

At step S197, the collision detection part 423 determines whether or not a plus pulse (+P) larger than the threshold Th3 is present in data after the abovementioned minus pulse (−P). In the case of determining a plus pulse (+P) is present (Yes at step S197), the collision detection part 423 considers the abovementioned plus pulse (+P) as a first plus pulse (+P) in the chronological difference data, and proceeds to step S191. In the case of determining a plus pulse (+P) is not present (No at step S197), the collision detection part 423 ends the collision detection process.

Steps S192, S193, S194, S195 and S198 are the same as steps S151, S152, S153, S154 and S155 of FIG. 19. To be specific, at step S192, the collision detection part 423 determines whether or not zero is included in Y pieces of consecutive data immediately before a pulse (+P) first exceeding the threshold Th3 in the chronological difference data. In the case of determining none of the Y pieces of data is zero (No at step S192), the collision detection part 423 determines occurrence of packet collision is present (step S198). In the case of determining otherwise (Yes at step S192), the collision detection part 423 proceeds to step S193.

At step S193, the collision detection part 423 determines whether or not zero is included in Z pieces of consecutive data immediately after a pulse (−P) first falling below the negative threshold −Th3 in the chronological difference data. In the case of determining none of the Z pieces of data is zero (No at step S193), the collision detection part 423 determines occurrence of packet collision is present (step S198). In the case of determining otherwise (Yes at step S193), the collision detection part 423 proceeds to step S194.

At step S194, on the basis of the chronological data of power average values recorded into the storage device 424 by the envelope extraction part 422, the collision detection part 423 calculates the average value of power of a spatial radio signal in a packet transmission period. To be specific, the collision detection part 423 adds an average value corresponding to the pulse (+P) first exceeding the threshold Th3 and (M−1) pieces of average values immediately after the abovementioned average value among the average values recorded in the storage device 424, and divides the addition result by M, thereby calculating the average value of the power of a spatial radio signal in a packet transmission period. For example, assuming the chronological data of the average values recorded in the storage device 424 is that shown in FIG. 25(*c*) and the chronological difference data generated at step S138 of FIG. 17 is that shown in FIG. 25(*d*), the average value of the power of a spatial radio signal in a packet transmission period is found by adding average values with position numbers from "7" to "11" in FIG. 25(*c*) and dividing the addition result by 5.

Meanwhile, the power average value can also be obtained in the following manner. By adding from an average value corresponding to a pulse (+P) currently processed to an average value immediately before an average value corresponding to a pulse (−P) currently processed, and dividing the addition result by M, the average value of the power of a spatial radio signal in a packet transmission time is calculated.

At step S195, the collision detection part 423 compares the average value of the spatial radio signals in the packet transmission period found at step S194 with the threshold A. In a case where the power average value is more than the threshold A (Yes at step S195), the collision detection part 423 determines occurrence of packet collision is present (step S198). On the contrary, in a case where the average value is equal to or less than the threshold A (No at step S195), the collision detection part 423 proceeds to step S197.

Figure 29:
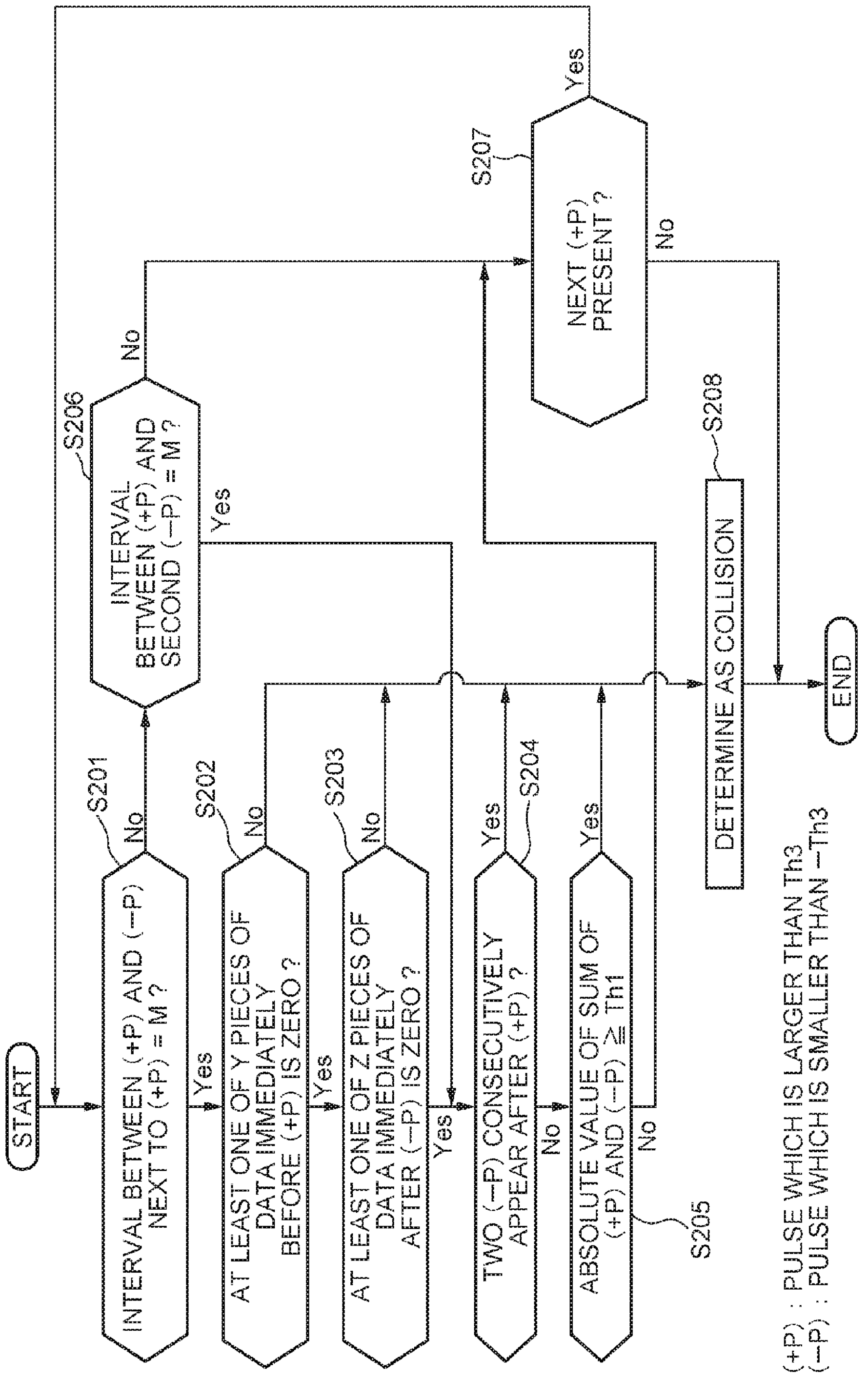
FIG. 29 is a flowchart showing another example of the collision detection process executed in the seventh exemplary embodiment of the present invention.

As the collision detection process executed at step S139 of FIG. 17, processing shown in a flowchart of FIG. 29 may be executed. In FIG. 29, steps S201, S206 and S207 are the same as steps S191, S196 and S197 of FIG. 28.

To be specific, at step S201, the collision detection part 423 determines whether or not a minus pulse (−P) smaller than the negative threshold −Th3 is present in data after a pulse (+P) first exceeding the threshold Th3 in the abovementioned chronological difference data and also an interval between the plus pulse (+P) and a first minus pulse (−P) in the data after the pulse (+P) is equal to M. Between the pulse (+P) and the pulse (−P), either a pulse (+P) or (−P) is not present. In the case of determining the interval is equal to M (Yes at step S201), the collision detection part 423 proceeds to step S202. In the case of determining the interval is not equal to M (No at step S201), the collision detection part 423 proceeds to step S206.

At step S206, the collision detection part 423 determines whether or not a second minus pulse (−P) smaller than the negative threshold −Th3 is present in the data after the pulse (+P) first exceeding the threshold Th3 in the chronological difference data and also an interval between the plus pulse (+P) and the abovementioned minus pulse (−P) is equal to M. In the case of determining the interval is equal to M (Yes at step S206), the collision detection part 423 proceeds to step S204. In the case of determining the interval is not equal to M (No at step S206), the collision detection part 423 proceeds to step S207. Between the first pulse (−P) and the second pulse (−P), a plus pulse (+P) is not present.

At step S207, the collision detection part 423 determines whether or not a plus pulse (+P) larger than the threshold Th3 is present in data after the abovementioned minus pulse (−P). In the case of determining a plus pulse (+P) is present (Yes at step S207), the collision detection part 423 regards the abovementioned plus pulse (+P) as a first plus pulse (+P) in the chronological difference data, and proceeds to step S201. In the case of determining a plus pulse (+P) is not present (No at step S207), the collision detection part 423 ends the collision detection process.

Steps S202, S203, S204, S205 and S208 are the same as steps S181, S182, S183, S184 and S185 of FIG. 27. To be specific, at step S202, the collision detection part 423 determines whether or not zero is included in Y pieces of consecutive data immediately before the pulse (+P) first exceeding the threshold Th3 in the chronological difference data. In the case of determining none of the Y pieces of data is zero (No at step S202), the collision detection part 423 determines occurrence of packet collision is present (step S208). In the case of determining otherwise (Yes at step S202), the collision detection part 423 proceeds to step S203.

At step S203, the collision detection part 423 determines whether or not zero is included in Z pieces of consecutive data immediately after the pulse (−P) first falling below the negative threshold −Th3 in the chronological difference data. In the case of determining none of the Z pieces of data is zero (No at step S203), the collision detection part 423 determines occurrence of packet collision is present (step S208). In the case of determining otherwise (Yes at step S203), the collision detection part 423 proceeds to step S204.

At step S204, the collision detection part 423 determines whether or not at least two minus pulses (−P) smaller than the negative threshold −Th3 consecutively appear in the data after the plus pulse (+P) larger than the threshold Th3 in the chronological difference data. In the case of determining minus pulses consecutively appear (Yes at step S204), the collision detection part 423 determines occurrence of packet collision is present (step S208). In the other case (No at step S204), the collision detection part 423 proceeds to step S205.

At step S205, the collision detection part 423 determines whether or not a minus pulse (−P) smaller than the negative threshold −Th3 is present in the data after the plus pulse (+P) larger than the threshold Th3 in the chronological difference data and also the absolute value of the sum of the plus pulse (+P) and the minus pulse (−P) is equal to or more than the threshold Th1. In the case of determining the absolute value is equal to or more than the threshold Th1 (Yes at step S205), the collision detection part 423 determines occurrence of packet collision is present (step S208). In the other case (No at step S205), the collision detection part 423 proceeds to step S207.

Figure 30:
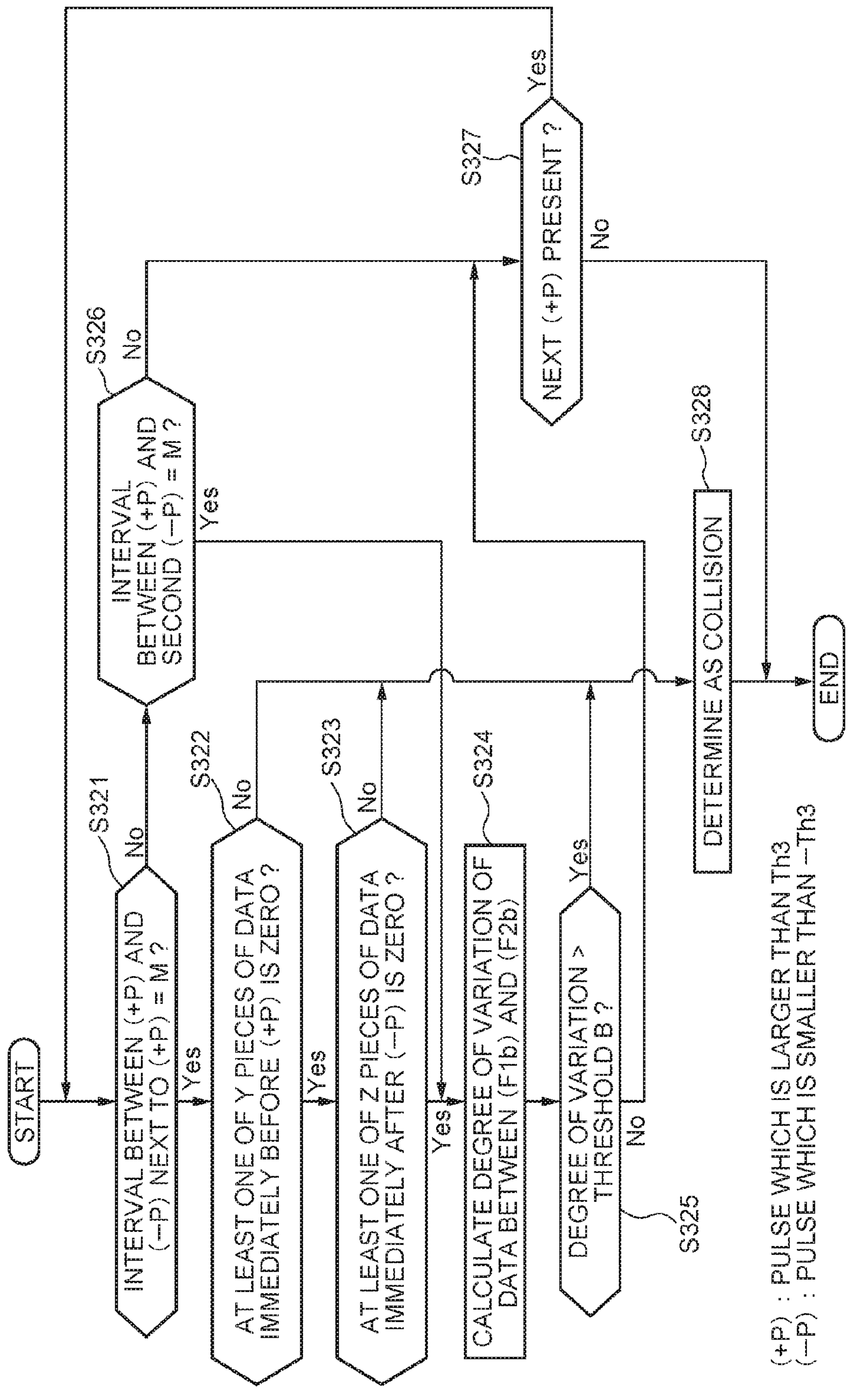
FIG. 30 is a flowchart showing another example of the collision detection process executed in the seventh exemplary embodiment of the present invention.

Further, as the collision detection process executed at step S139 of FIG. 17, processing shown in a flowchart of FIG. 30 may be executed. In FIG. 30, steps S321, S326 and S327 are the same as steps S201, S206 and S207 of FIG. 29. Further, in FIG. 30, steps S322, S323, S324, S325 and S328 correspond to steps S281, S282, S283, S284 and S285 of FIG. 20.

In this case, F1*b* of step S324 represents data with a position number "K1+1" in the data calculated in the first average power calculation process. K1 represents the position number of a plus pulse (+P) calculated in a process for calculating a power difference of adjacent data. Assuming data calculated in the adjacent data power difference calculation process is that shown in FIG. 25(*d*), the position number of a plus pulse (+P) is "6" and F1*b* represents $7^{th}$ data in the data stream shown in FIG. 25(*b*). Further, F2*b* of step S324 represents data with a position number "K2" in the data calculated in the first average power calculation process. K2 represents the position number of a minus pulse (−P) calculated in a process for calculating a power difference of adjacent data. Assuming data calculated in the adjacent data power difference calculation process is that shown in FIG. 25(*d*), the position number of a minus pulse (−P) is "11" and F2*b* represents $11^{th}$ data in the data stream shown in FIG. 25(*b*). Herein, the interval between the plus pulse (+P) and the minus pulse (−P) is M.

Because steps S321 to S323 and S326 to S328 of FIG. 30 are the same as steps S201 to 203 and S206 to S208 of FIG. 29, the difference from FIG. 29, namely, processes of steps S324 and S325 will be described below.

At step S324, the degree of variation of data between the data F1*b* and the data Fb2 is calculated by the abovementioned equation 1 or the like. Next, at step S325, the degree of variation is compared with the threshold B. In a case where the variation degree is larger (Yes at step S325), it is determined that occurrence of packet collision is present (step S328).

A difference between the collision detection process shown in FIG. 30 and the collision detection processes shown in FIGS. 28 and 29 will be described referring to FIG. 24(*a*). According to the collision detection process shown in FIG. 30, which is detecting packet collision on the basis of the degree of variation and the threshold B, even when reception power detected by the power detection part 421 decreases due to fluctuation, packet collision as shown in FIG. 24(*b*) can be detected. However, according to the collision detection processes shown in FIGS. 28 and 29, packet collision as shown in FIG. 24(*b*) cannot be detected.

Figure 31:
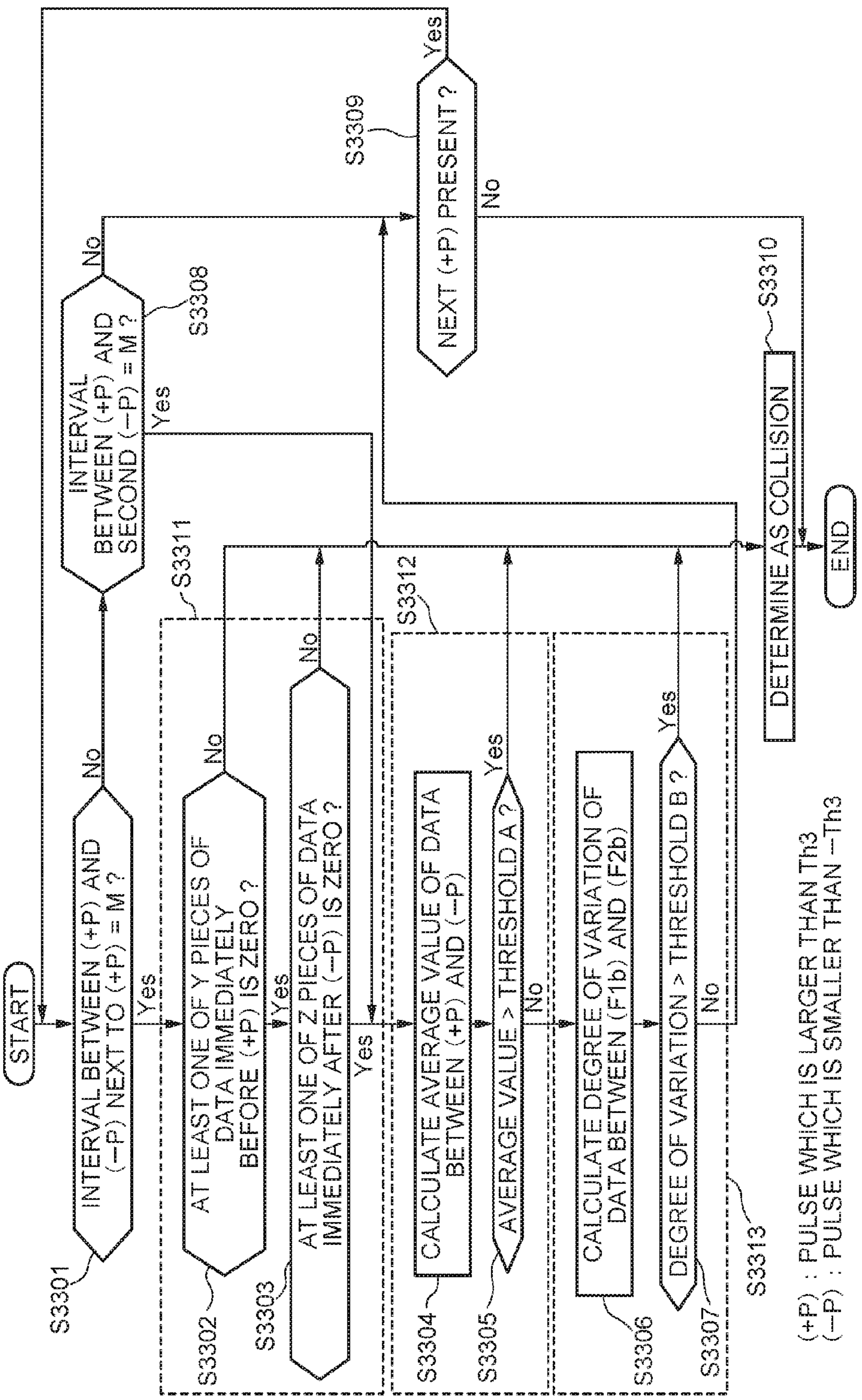
FIG. 31 is a flowchart showing another example of the collision detection process executed in the seventh exemplary embodiment of the present invention.
Figure 33:
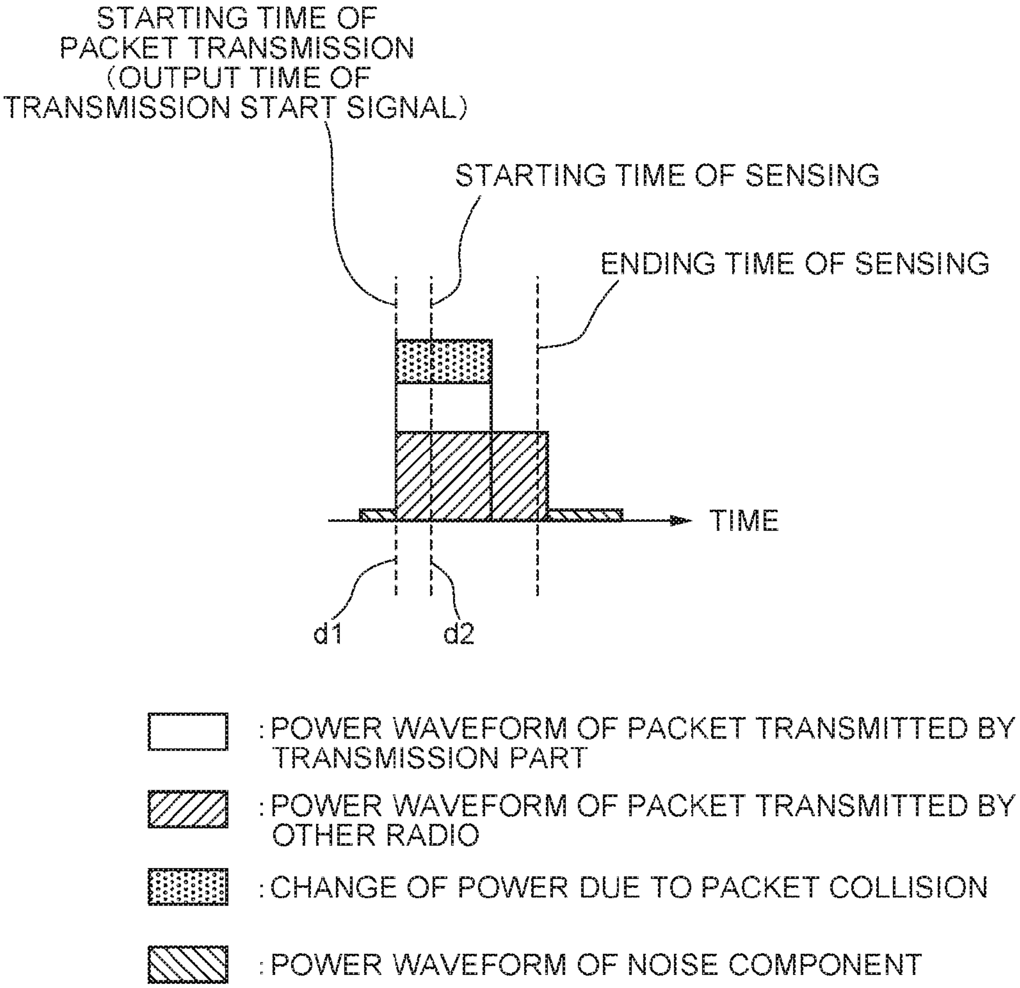
FIG. 33 is a diagram for describing the operation of the eighth exemplary embodiment of the present invention.

Further, as the collision detection process executed at step S139 of FIG. 17, processing shown in a flowchart of FIG. 31 may be executed. The collision detection process shown in FIG. 31 is combination of FIGS. 28, 29 and 30. Blocks S3311, S3312 and S3313 represented by dotted lines in FIG. 31 correspond to the collision detection processes of FIGS. 28, 29 and 30, respectively. That is to say, steps S3301, S3308 and S3309 of FIG. 31 correspond to steps S3301, S3308 and S3309 of FIG. 28, steps S201, S206 and S207 of FIG. 29, and steps S321, S326 and S327 of FIG. 30. The block S3311 shown by the dotted line in FIG. 31 corresponds to steps S192 and S193 of FIG. 28, steps S202 and S203 of FIG. 29, and steps S322 and S323 of FIG. 30. The block S3312 shown in FIG. 31 corresponds to steps S194 and S195 of FIG. 28. The block S3313 shown in FIG. 31 corresponds to steps S324 and S325 of FIG. 30. The processes of the blocks S3311, S3312 and S3313 may be executed in an order other than shown in FIG. 33.

According to the collision detection process shown in FIGS. 19 and 27, in a case where, after the power detection part 421 starts power sensing, a packet is transmitted by another radio before the transmission part 411 transmits a packet, the packet transmitted by the transmission part 411 cannot be correctly determined. On the other hand, according to the collision detection processes shown in FIGS. 29 and 29, the abovementioned problem can be solved. Further, a difference between the collision detection processes shown in FIGS. 28 and 29 is that the collision detection process shown in FIG. 29 allows collision detection from a pulse pattern without using the threshold A.

[Effect of Seventh Exemplary Embodiment]

According to this exemplary embodiment, the same effect as in the first and second exemplary embodiments can be obtained. Moreover, according to this exemplary embodiment, the following effect can be obtained: it is possible to make the accuracy of collision detection higher than in the first and second exemplary embodiment. This is because packet collision is detected by using chronological difference data showing the amount of change of power of a spatial radio signal and the direction of the change.

[Eighth Exemplary Embodiment of the Present Invention]

Next, an eighth exemplary embodiment of the present invention will be described. This exemplary embodiment is realized by causing the communication device 40 shown in FIG. 16 to execute processing shown in a flowchart of FIG. 32.

A difference between the flowchart according to this exemplary embodiment shown in FIG. 32 and the flowchart according to the seventh exemplary embodiment shown in FIG. 17 is as follows: step S131 is replaced with step S211; step S212 is inserted between step S134 and S135; and step S213 is inserted between step S136 and S137. Because the remaining part is the same as in the flowchart shown in FIG. 17, the difference will be mainly described below.

Figure 32:
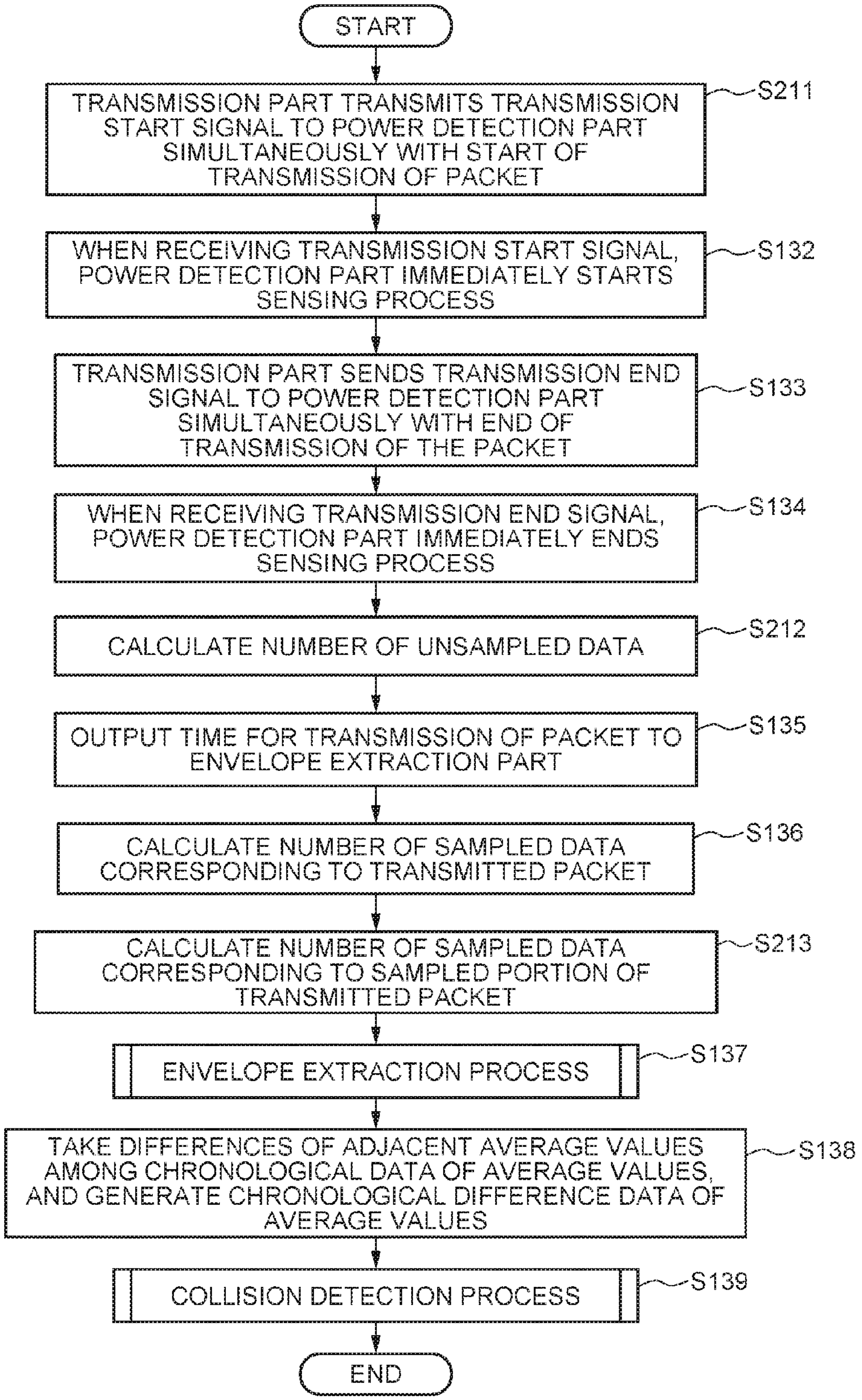
FIG. 32 is a flowchart showing an example of processing executed by a communication device according to an eighth exemplary embodiment of the present invention.

Referring to FIG. 32, the transmission part 411 outputs a transmission start signal showing start of transmission of a packet to the power detection part 421 simultaneously with start of transmission of the packet. Moreover, the information management part 412 outputs the transmission power of the packet (step S211). When receiving the transmission start signal, the power detection part 421 immediately starts a power sensing process (step S132). However, depending on the processing capacity of the power detection part 421, a delay time may be caused before starting the sensing process after transmission of a packet is started. In this case, an undetected portion that is not sensed (sampled) by the power detection part 421 is caused at the head portion of the packet transmitted by the transmission part 411. The undetected portion of the packet is, for example, a portion from d1 to d2 in FIG. 33.

At step S212, the power detection part 421 calculates the number of sampled data corresponding to the undetected portion (the number of unsampled data). To be specific, the power detection part 421 calculates a time interval between the reception time of the transmission signal and the starting time of the power sensing process, and multiplies the calculated time interval by the sampling frequency, thereby calculating an unsampled data number J corresponding to the undetected portion. The calculated unsampled data number J is output to the envelope extraction part 422.

At step S213, the envelope extraction part 422 subtracts the unsampled data number J corresponding to the undetected portion from the number of sampled data found at step S136, thereby calculating a sampled data number K corresponding to a detected portion sensed by the power detection part 421 of the packet transmitted by the transmission part 411.

At step S137, the values of N and M are regulated so that the product of N and M becomes the sampled data number K calculated by the power detection part 421. Further, at step S139, the processing shown in the flowcharts of FIG. 19 or FIG. 27 is executed. Because data is not present immediately before a plus pulse (+P), the processing at step S151 of FIG. 19 or step S181 of FIG. 27 is not executed.

[Effect of Eighth Exemplary Embodiment]

According to this exemplary embodiment, in addition to the effects obtained in the first and third exemplary embodiment, it is possible to obtain the following effect: packet collision can be detected even when reception of the head portion of a packet fails. This is because a sampled data number corresponding to an actually received portion of a packet is found and chronological difference data is generated by using the sampled data number.

[Ninth Exemplary Embodiment of the Present Invention]

Next, a ninth exemplary embodiment of the present invention will be described. This exemplary embodiment is realized by causing the communication device 40 shown in FIG. 16 to execute processing shown in a flowchart of FIG. 34.

To be specific, at step S231, before starting transmission of a packet, the transmission part 411 outputs the transmission time and transmission power of one packet or a plurality of packets to be transmitted, to the power detection part 421. The power and transmission time of the plurality of packets are the same.

Thus, the power detection part 421 starts a power sensing process with respect to a selected frequency band (step S232).

Next, the power detection part 421 ends the power sensing process after a preset power sensing time passes or after the power detection part 421 receives the transmission time or transmission power of the packet from the transmission part 411 (step S233). Further, in the case of stopping the sensing in response to reception of the transmission time or transmission power of the packet from the transmission part 411, the power detection part 421 restarts the sensing proves after stopping the sensing process.

After that, the power detection part 421 outputs the transmission time of the packet sent from the transmission part 411, to the envelope extraction part 422 (step S234). The processes of steps S136 to S139 thereafter can be the same as those of steps S136 to S139 of FIG. 17.

Figure 34:
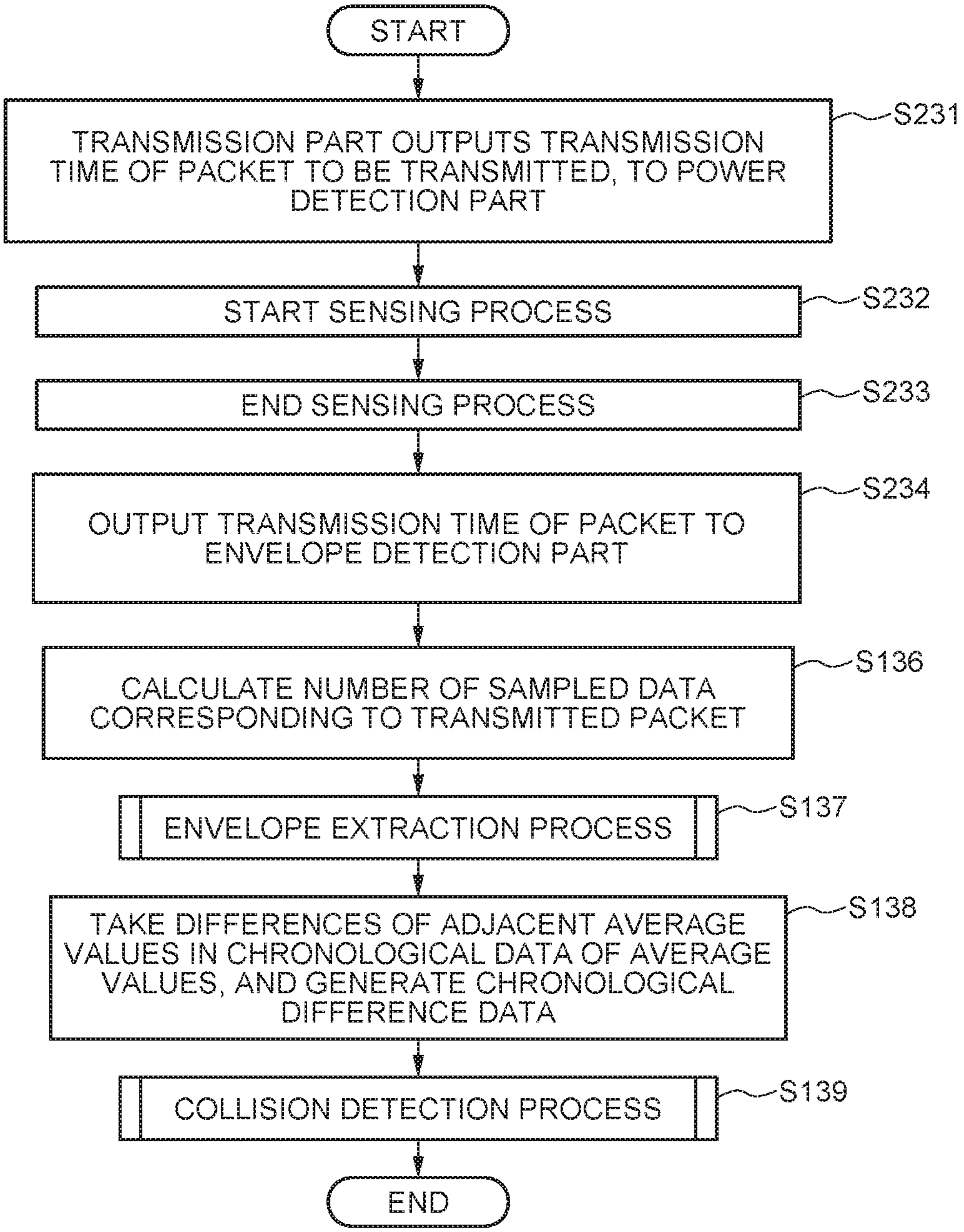
FIG. 34 is a flowchart showing an example of processing executed by a communication device according to a ninth exemplary embodiment of the present invention.
Figure 35:
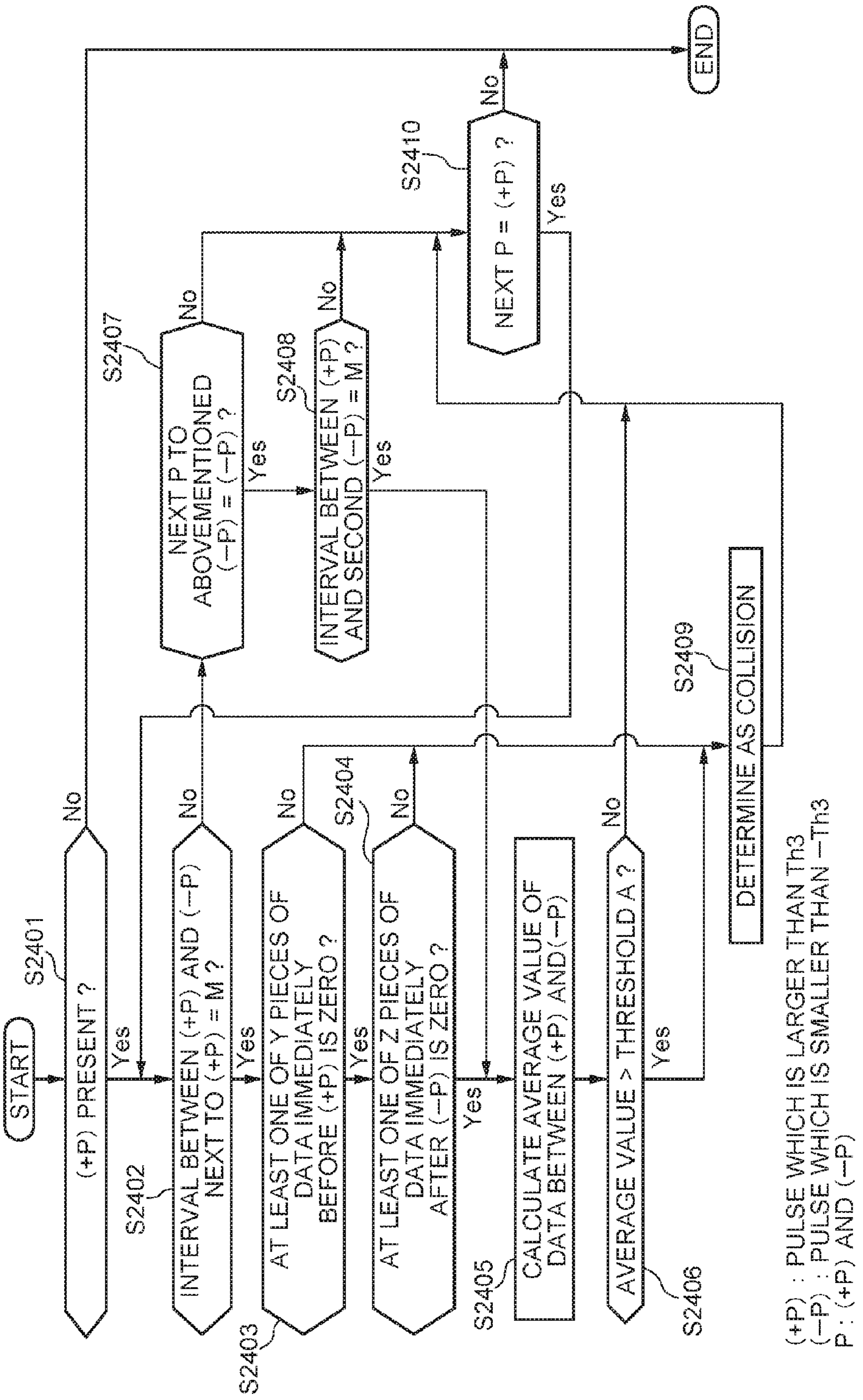
FIG. 35 is a flowchart showing an example of a collision detection process executed in the ninth exemplary embodiment of the present invention.

Further, operation at step S139 of FIG. 34 can be that shown in FIG. 35.

Referring to FIG. 35, at step S2401, the collision detection part 423 determines whether or not a plus pulse (+P) larger than the threshold Th3 is present in the chronological difference data generated at step S138 of FIG. 32 by the envelope extraction part 422. In the case of determining present (Yes at step S2401), the collision detection part 423 proceeds to step S2402. In the case of determining not present (No at step S2401), the collision detection part 423 ends the collision detection process.

At step S2402, the collision detection part 423 determines whether or not a minus pulse (−P) smaller than the negative threshold −Th3 is present in data after the pulse (+P) first exceeding the threshold Th3 in the chronological difference data mentioned above, and also, an interval between the plus pulse (+P) and a first minus pulse (−P) in the data after (+P) is equal to M.

In the case of determining the interval is equal to M (Yes at step S2402), the collision detection part 423 proceeds to step S2403. In the case of determining the interval is not equal to M (No at step S2402), the collision detection part 423 proceeds to step S2407.

At step S2403, the collision detection part 423 determines whether or not zero is included in Y pieces of consecutive data immediately before the plus pulse (+P) stated in step S2402. In the case of determining none of the Y pieces of data is zero (No at step S2403), the collision detection part 423 determines occurrence of packet collision is present (step S2409), and thereafter, proceeds to step S2410. On the other hand, in the case of determining zero is included in the Y pieces of data (Yes at step S2403), the collision detection part 423 proceeds to step S2404.

At step S2404, the collision detection part 423 determines whether or not zero is included in Z pieces of consecutive data immediately after the minus pulse (−P) stated in step S2402. In the case of determining none of the Z pieces of data is zero (No at step S2404), the collision detection part 423 determines occurrence of packet collision is present (step S2409). In the other case (Yes at step S2404), the collision detection part 423 proceeds to step S2405.

At step S2405, on the basis of the chronological data of power average values recorded in the storage device 424 by the envelope extraction part 422, the collision detection part 423 calculates the average value of power of a spatial radio signal in a packet transmission time, and proceeds to step S2406. A specific calculation method is as described for step S194 of FIG. 28.

At step S2406, the collision detection part 423 compares the average value of power calculated at step S2405 with the threshold A. In a case where the average value of power is more than the threshold A (Yes at step S2406), the collision detection part 423 determines occurrence of packet collision is present (step S2409). In the case of determining the average value of power is equal to or less than the threshold A (No at step S2406), the collision detection part 423 proceeds to step S2410.

At step S2407, the collision detection part 423 determines whether or not in data after the minus pulse (−P) stated at step S2402, a minus pulse (−P) appears earlier than a plus pulse (+P).

In the case of determining a minus pulse (−P) appears earlier (Yes at step S2407), the collision detection part 423 proceeds to step S2408. In the case of determining (−P) does not appear earlier (No at step S2407), the collision detection part 423 proceeds to step S2410.

At step S2408, the collision detection part 423 determines whether or not an interval between the plus pulse (+P) stated at step S202 and a second-appearing minus pulse (−P) in the data after the pulse (+P) is equal to M. In the case of determining the interval is equal to M (Yes at step S2408), the collision detection part 423 proceeds to step S2405. In the other case (No at step S2408), the collision detection part 423 proceeds to step S2410.

At step S2410, the collision detection part 423 determines whether or not a plus pulse (+P) larger than the threshold Th3 appears earlier than another minus pulse (−P) smaller than the negative threshold −Th3. In the case of determining (+P) appears earlier (Yes at step S2410), the collision detection part 423 proceeds to step S2402. In the case of determining (+P) does not appear earlier (No at step S2410), the collision detection part 423 ends the collision detection process.

Figure 37:
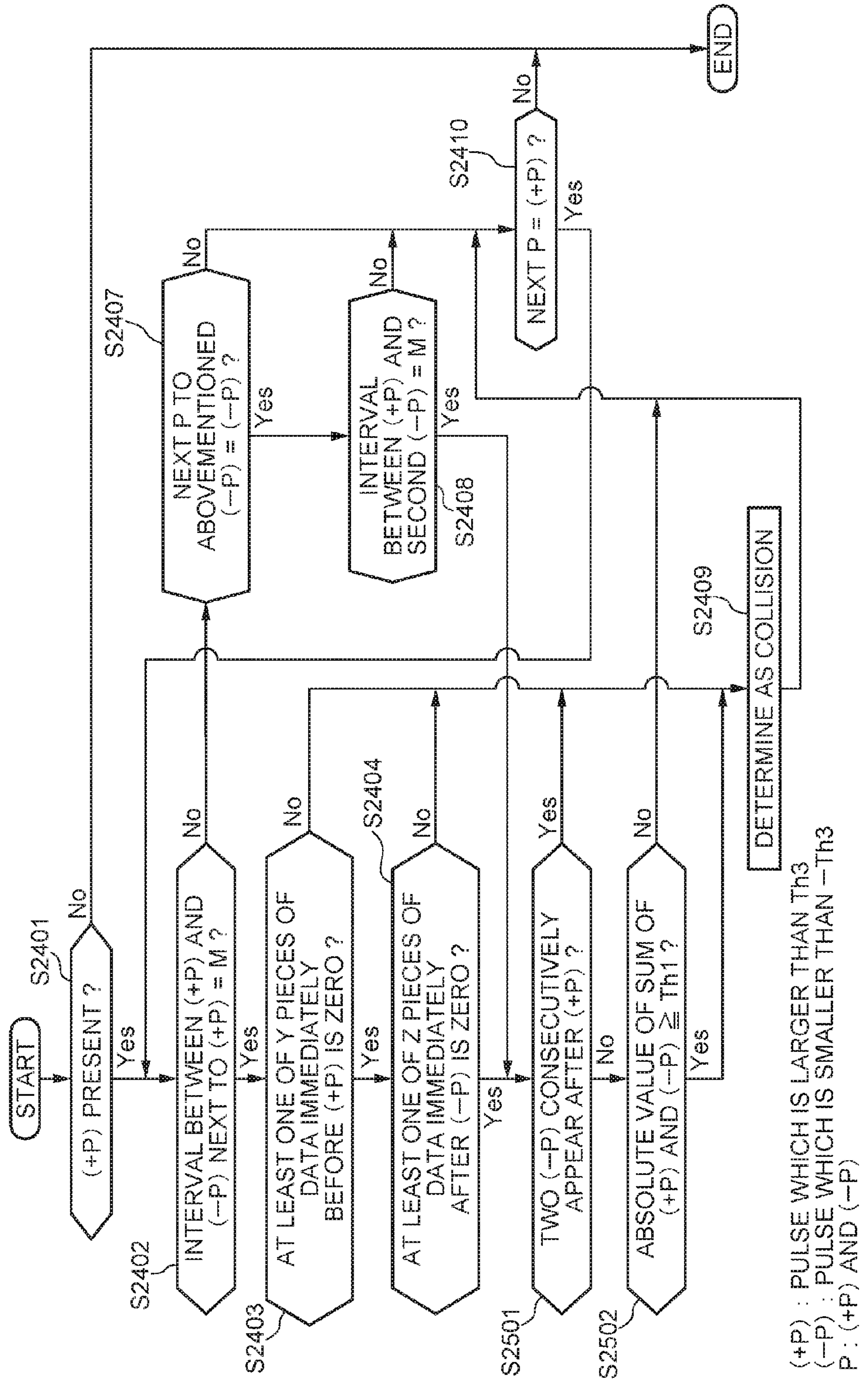
FIG. 37 is a flowchart showing another example of the collision detection process executed in the ninth exemplary embodiment of the present invention.

Further, as the collision detection process executed at step S139 of FIG. 34, processing shown in a flowchart of FIG. 37 may be executed. The difference between FIG. 35 and FIG. 37 is that processes of steps S2501 and S2502 are executed instead of the processes of steps S2405 and S2406.

At step S2501, the collision detection part 423 determines whether or not in the data after the plus pulse (+P) stated in step S2402, at least two minus pulses (−P) smaller than the negative threshold −Th3 appear earlier than a plus pulse (+P) larger than the threshold Th3. In a case where at least two minus pulses (−P) appear earlier (Yes at step S2501), the collision detection part 423 determines occurrence of packet collision is present (step S2409). In the other case (No at step S2501), the collision detection part 423 proceeds to step S2502.

At step S2502, the collision detection part 423 determines whether or not the absolute value of the sum of the plus pulse (+P) and minus pulse (−P) stated in step S2402 is equal to or more than the threshold Th1. In a case where the absolute value is equal to or more than the threshold Th1 (Yes at step S2502), the collision detection part 423 determines occurrence of packet collision is present (step S2409). In the other case (No at step S2502), the collision detection part 423 proceeds to step S2410.

The difference between the collision detections processes shown in FIGS. 37 and 35 is that the collision detection process shown in FIG. 37 allows collision detection from a pulse pattern without using the threshold A.

Figure 38:
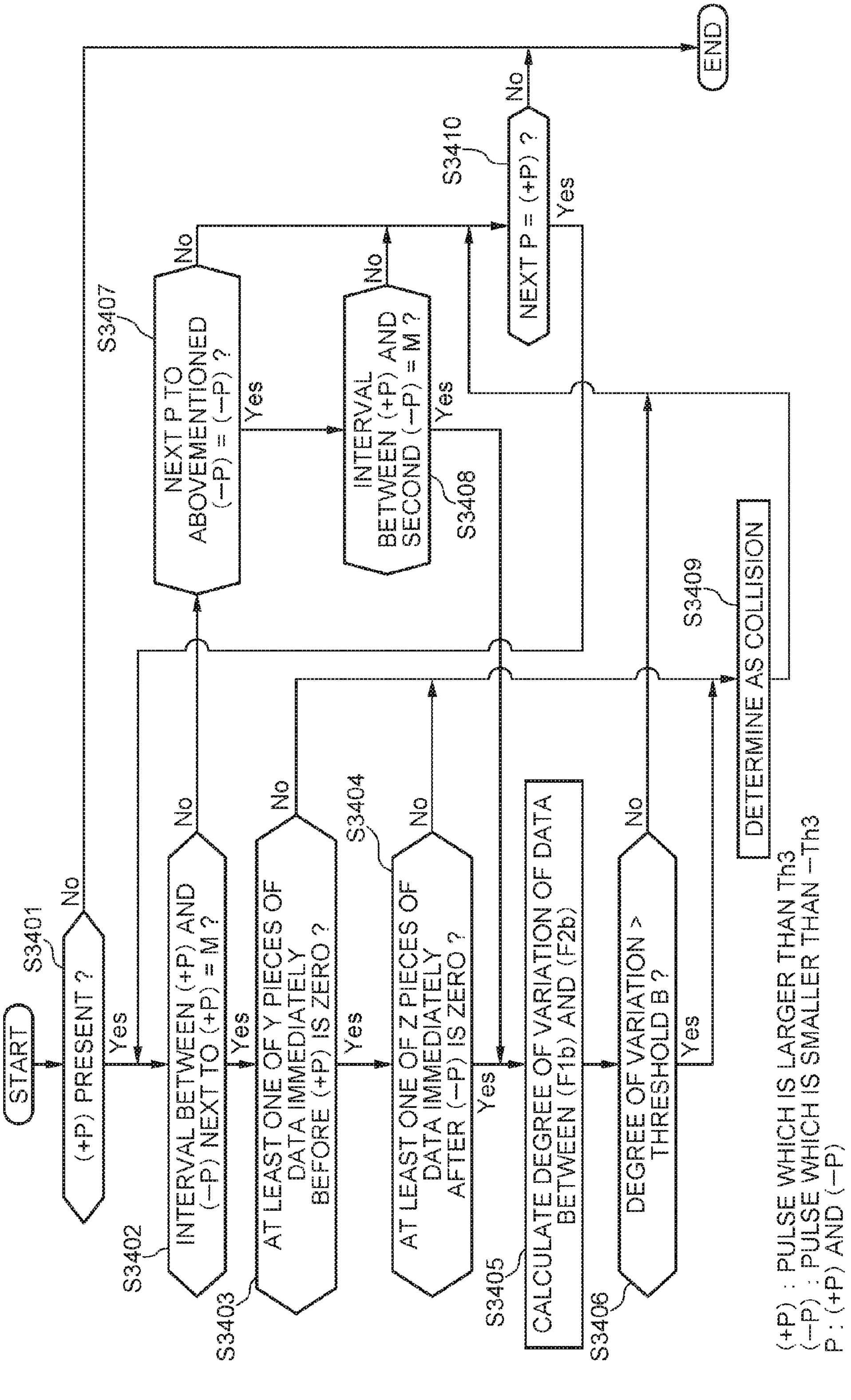
FIG. 38 is a flowchart showing another example of the collision detection process executed in the ninth exemplary embodiment of the present invention.

Further, as the collision detection process executed at step S139 of FIG. 34, processing shown in a flowchart of FIG. 38 may be executed. In this case, F1*b* of step S3405 represents data with a position number "K1+1" in the data calculated in the first average power calculation process. K1 represents the position number of a plus pulse (+P) calculated in a process of calculating a power difference of adjacent data. Assuming data calculated in the process of calculating a power difference of adjacent data is that shown in FIG. 25(*d*), the position number of a plus pulse (+P) is "6" and F1*b* represents $7^{th}$ data in the data stream shown in FIG. 25(*b*). Further, F2*b* of step S3405 represents data with a position number "K2" in the data calculated in the first average power calculation process. K2 represents the position number of a minus pulse (−P) calculated in a process of calculating a power difference of adjacent data. Assuming data calculated in the process of calculating a power difference of adjacent data is that shown in FIG. 25(*d*), the position number of a minus pulse (−P) is "11" and F1*b* represents $11^{th}$ data in the data stream shown in FIG. 25(*b*). Herein, the interval between the plus pulse (+P) and the minus pulse (−P) is M.

The difference between the collision detection process shown in FIG. 38 and the collision detection processes shown in FIGS. 35 and 37 will be described referring to FIG. 24. According to the collision detection process of FIG. 38, which is detecting packet collision on the basis of the degree of variation and the threshold B, even when reception power detected by the power detection part 421 decreases due to fluctuation, it is possible to detect packet collision as shown in FIG. 24(*b*). However, according to the collision detection processes shown in FIGS. 35 and 37, it is impossible to detect packet collision as shown in FIG. 24(*b*).

Figure 36:
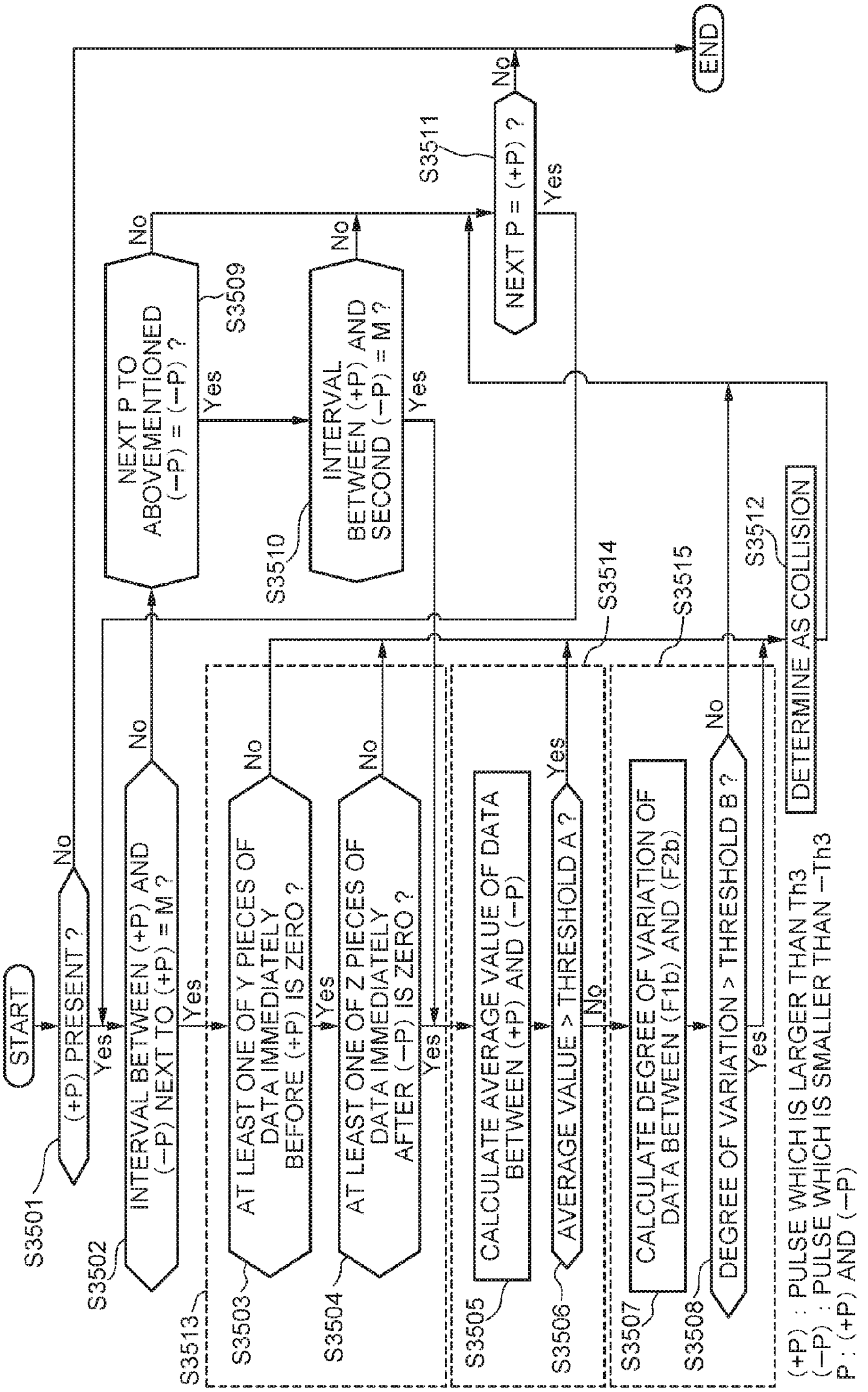
FIG. 36 is a flowchart showing another example of the collision detection process executed in the ninth exemplary embodiment of the present invention.

Further, as the collision detection process executed at step S139 of FIG. 34, processing shown in a flowchart of FIG. 36 may be executed. The collision detection process shown in FIG. 36 is combination of those shown in FIGS. 35, 37 and 38. Block S3513 represented by dotted lines in FIG. 36 corresponds to steps S2403 and S2402 of FIG. 35. The block S3514 corresponds to steps S2405 and S2406 of FIG. 35. The block S3515 corresponds to steps S3405 and S3406 of FIG. 38. The processes of blocks S3513, S3514 and S3515 may be executed in an order other than shown in FIG. 38.

[Effect of Ninth Exemplary Embodiment]

According to this exemplary embodiment, it is possible to obtain the same effects as in the first and third exemplary embodiments. Further, according to this exemplary embodiment, it is possible to obtain the following effect: the timing of start or end of the sensing process by the power detection part does not need to depend on the timing of start or end of packet transmission by the transmission part 411. This is because the envelope extraction part generates chronological difference data representing the amount of change of power of a spatial radio signal and the direction of the change by executing the following processes: a process of, on the basis of the transmission time of a packet and the frequency of sampling by the power detection part, calculating the number of sampled data corresponding to the packet; a process of obtaining two positive integers N and M which make the result of multiplication thereof to be the calculated number of sampled data; a process of putting the sampled data sampled by the power detection part into groups each including N pieces of adjacent sampled data, and calculating the average values for the respective groups; a process of, on the basis of the calculated average values for the respective groups, the first threshold Th1 larger than the clear channel assessment level and the second threshold larger than the threshold A, detecting a portion including M pieces of consecutive average values equal to or more than the first threshold Th1 from chronological data of the average values for the respective groups, replacing the average values less than the second threshold Th2 with an average value thereof in the average values for the respective groups included in the detected portion, and replacing average values equal to or more than the second threshold Th2 with an average value thereof; and a process of taking a difference of adjacent average values in chronological data after the replacement process.

[Tenth Exemplary Embodiment of the Present Invention]

Next, a communication device according to a tenth exemplary embodiment of the present invention will be described in detail.

Figure 39:
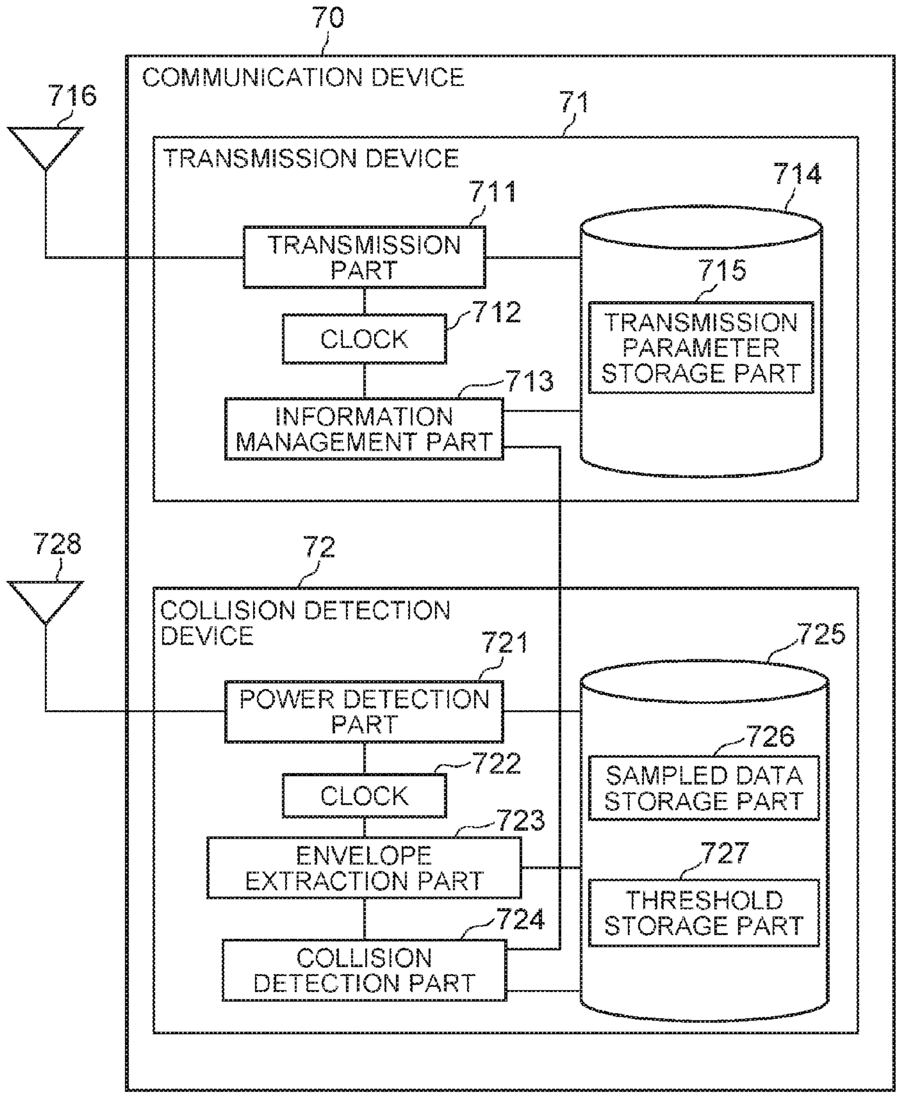
FIG. 39 is a block diagram showing an example of the configuration of a communication device according to a tenth exemplary embodiment of the present invention.

Referring to FIG. 39, a communication device 70 according to this exemplary embodiment includes a transmission device 71 and a collision detection device 72.

The transmission device 71 includes a transmission part 711, a clock 712, an information management part 173, a storage device 214, and an antenna 716.

The storage device 714 includes a transmission parameter storage part 715. In the transmission parameter storage part 715, transmission parameters including the transmission power, starting time of transmission, ending time of transmission and a transmission time of each of a plurality of transmitted packets are recorded. In this exemplary embodiment, transmission parameters include the starting time of transmission, the ending time of transmission and a transmission time, but transmission parameter may two of them. The starting time of transmission can be found from the ending time of transmission and a transmission time, the ending time of transmission can be found from the starting time of transmission and a transmission time, and a transmission time can be found from the starting time of transmission and the ending time of transmission. Thus, transmission parameters may include two of the starting time of transmission, the ending time of transmission, and a transmission time.

The transmission part 711 has the same function as the transmission part 111 in the first exemplary embodiment, except that transmission parameters recorded in the transmission parameter storage part 715 include a transmission time. The clock 712 has a function of displaying current time.

The information management part 713 has a function of, after the transmission part 711 completes transmission of a packet, retrieving transmission parameters of the transmitted packet from the transmission parameter storage part 715, and transmitting the transmission parameters to the collision detection device 72. In a case where the time of transmission is not included in the transmission parameters, the information management part 713 calculates a transmission time by executing an operation (ending time of transmission −starting time of transmission).

The transmission part 711 and the information management part 713 can be realized by a program-controlled CPU.

The collision detection device 72 includes a power detection part 721, a clock 722, an envelope extraction part 723, a collision detection part 724, a storage device 725, and an antenna 728.

The storage device 725 is provided with a sampled data storage part 726 and a threshold storage part 727. In the sampled data storage part 726, sampled data and sampling time are recorded in association with each other (see FIG. 3). In the threshold storage part 727, candidates for the thresholds A, Th1 and Th3 are recorded in association with a plurality of transmission power that may be taken by the transmission part 711.

The power detection part 721 has a function of sampling values of power of a spatial radio signal of a frequency band used in packet transmission by the transmission part 711, and recording sampled data and sampling time into the sampled data storage part 726 in association with each other. The clock 722 has a function of displaying current time.

The envelope extraction part 723 has a function of executing the same processing as mentioned before (the average power calculation shown in FIG. 25, the processing as shown in FIG. 18, and the like) on each of a plurality of packets transmitted by the transmission part 711, and generating chronological difference data for the respective packets.

The collision detection part 724 has a function of determining whether or not collision of a packet transmitted from the transmission part 711 with a packet transmitted from another radio is present on the basis of the chronological difference data for the respective packets generated by the envelope extraction part 723.

The power detection part 721, the envelope extraction part 723, and the collision detection part 724 can be realized by a program-controlled CPU.

[Operation in Tenth Exemplary Embodiment]

Figure 40:
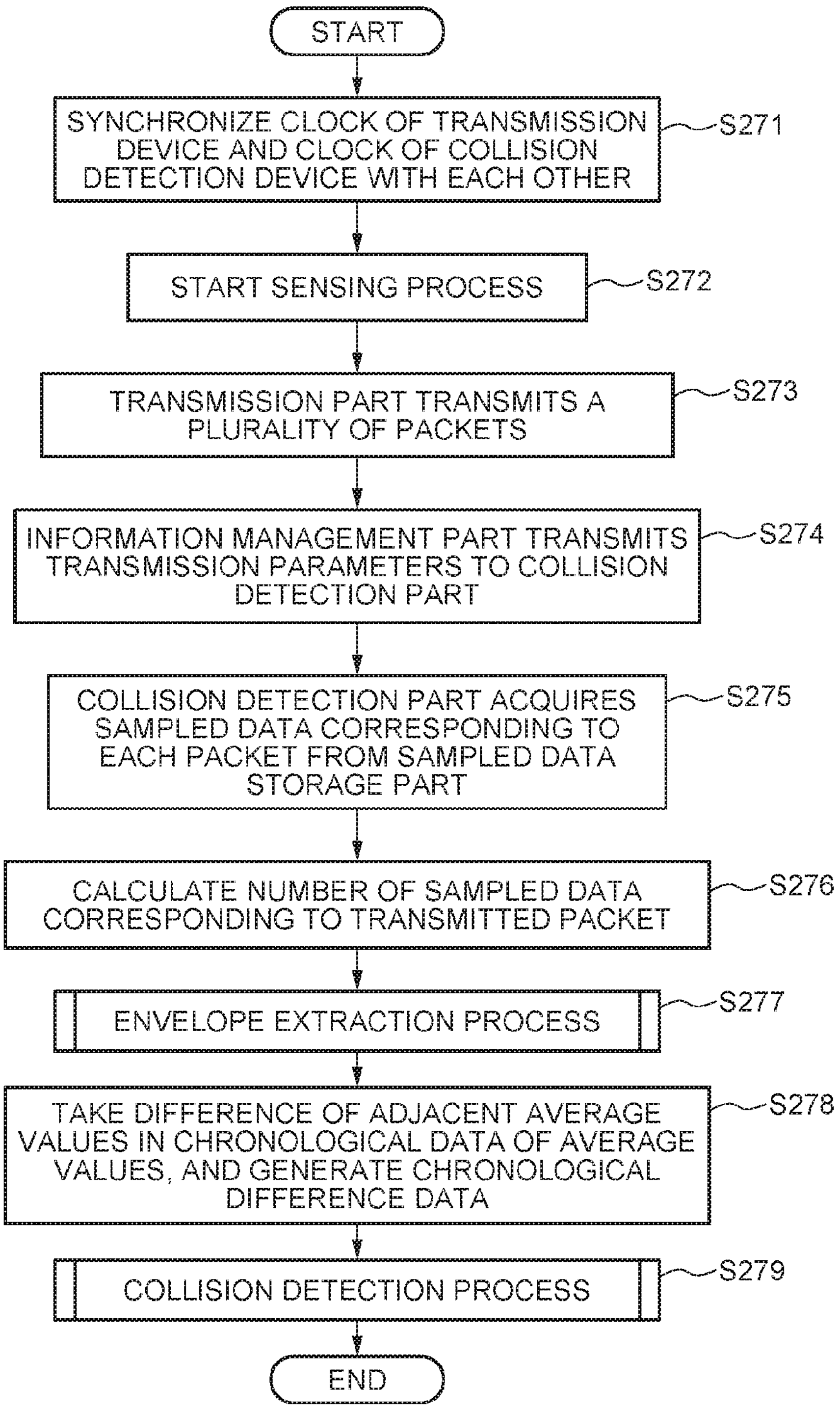
FIG. 40 is a flowchart showing an example of processing executed by the communication device according to the tenth exemplary embodiment of the present invention.

Next, operation in this exemplary embodiment will be described referring to a flowchart of FIG. 40.

First, a process of synchronizing time shown by the clock 712 of the transmission device 71 and time shown by the clock 722 of the collision detection device 72 with each other is executed (step S271). A specific processing content is the same as that executed at step S51 described before.

Next, the power detection part 721 starts a sensing process (step S272). In the sensing process, the power detection part 721 samples power of a spatial radio signal in a frequency band used in packet transmission by the transmission part 711, at a given sampling period, and records sampled data and sampling time into the sampled data storage part 726 in association with each other.

After that, the transmission part 711 transmits a plurality of packets (S273). In this process, the transmission part 711 records transmission parameters (transmission power, starting time of transmission, ending time of transmission, and a transmission time period) of each of the transmitted packets into the transmission parameter storage part 715.

When transmission of the packets by the transmission part 711 is completed, the information management part 713 retrieves the transmission parameters of the packets from the transmission parameter storage part 715 and transmits the transmission parameters to the collision detection device 72 (step S274).

When receiving the transmission parameters, the collision detection part 724 extracts sampled data corresponding to each of the packets transmitted at step S273 by the transmission part 711, on the basis of the starting time and ending time of transmission included in the transmission parameters and the sampling time recorded in the sampled data storage part 726. Then, for each of the packets, the collision detection part 724 passes the sampled data corresponding to the packet and the transmission power and transmission time of the packet included in the transmission parameters to the envelope extraction part 723 (step S275). Herein, in order to apply to a collision detection method (for example, S2403 and S2404 of FIG. 35), a plurality of sampled data before the start position of the sampled data of the transmitted packet and a plurality of sampled data after the end position of the same are extracted at the same time (for example, (M×N)×0.30 pieces of sampled data before the start position and (M×N)×0.30 pieces of sampled data after the end position are extracted at the same time).

For each of the packets transmitted at step S273 by the transmission part 711, the envelope extraction part 723 multiplies the transmission time of the packet by the frequency of sampling by the power detection part 721, thereby calculating the numbers of sampled data for the respective packets (step S276).

At step S277, the envelope extraction process of step S137 described before is executed on each of the packets. Moreover, at step S277, for each of the packets, two positive integers N and M which make the result of multiplication thereof to be the abovementioned number of sampled data are obtained.

At step S278, for each of the packets, the same process as that of step S138 is executed, and chronological difference data for each of the packets is generated.

Next, at step S279, for each of the packets, for example, the processing shown in the flowchart of FIG. 24 or 25 is executed, and it is determined for each of the packets whether or not collision is present.

Meanwhile, in a case where a plurality of packets of the same power and the same transmission time are consecutively transmitted at step S273, the following processes may be executed at steps 274 to 276. The information management part 713 transmits transmission parameters including the starting time of transmission of a first packet of the consecutive packets, the ending time of transmission of a last packet of the consecutive packets, transmission power and a transmission time (instead of transmission parameters including the starting time and ending time of transmission of each of the packets) to the collision detection part 724 (step S274). When receiving the transmission parameters, the collision detection part 724 extracts sampled data corresponding to a time period from the starting time of the first packet transmitted at step S273 by the transmission part 711 to the ending time of the last packet, on the basis of the starting time and ending time of transmission included in the transmission parameters and the sampling time recorded in the sampled data storage part 726. Then, the collision detection part 724 passes the extracted sampled data and the transmission power and transmission time of the packet included in the transmission parameters to the envelope extraction part 723 (step S275).

The envelope extraction part 723 multiplies the transmission time of the packet transmitted at step S273 by the transmission part 711 with the frequency of sampling by the power detection part 721, thereby calculating the number of sampled data of the packet (step S276).

[Effect of Tenth Exemplary Embodiment]

According to this exemplary embodiment, it is possible to obtain, in addition to the effects obtained in the first and third exemplary embodiments, an effect that it is possible to, with respect to a plurality of packets, collectively determine whether or not collision is present. This is because the power detection part 721 executes the sensing process on each of a plurality of packets transmitted from the transmission part 711, the envelope extraction part 723 generates chronological difference data for the respective packets, and the collision detection part 724 determines whether or not packet collision is present on the basis of the chronological difference data of the respective packets. Moreover, according to this exemplary embodiment, it is also possible to obtain an effect that there is no need to record a transmission time as in the sixth exemplary embodiment. This is because a transmission time is calculated on the basis of the starting time of transmission and the ending time of transmission.

[Eleventh Exemplary Embodiment of the Present Invention]

Next, a communication device according to an eleventh exemplary embodiment of the present invention will be described in detail.

Figure 41:
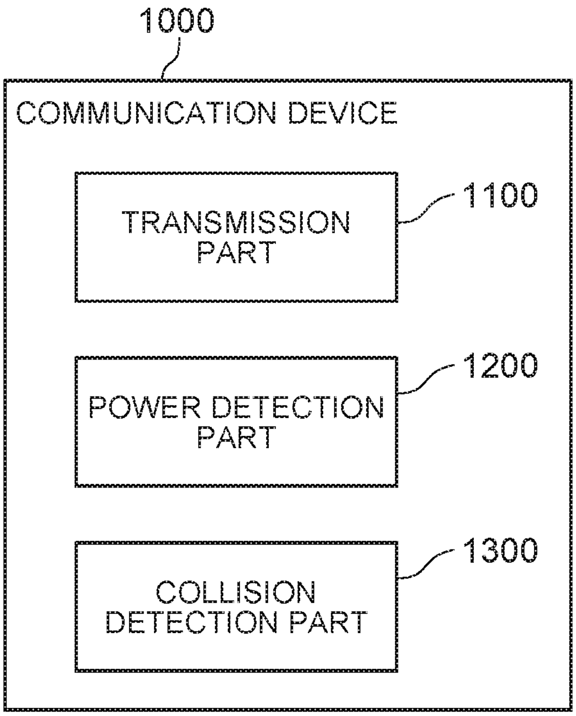
FIG. 41 is a block diagram showing an example of the configuration of a communication device according to an eleventh exemplary embodiment of the present invention.

Referring to FIG. 41, a communication device 1000 according to this exemplary embodiment includes a transmission part 1100, a power detection part 1200, and a collision detection part 1300.

The transmission part 1100 has a function of transmitting a packet by radio.

The power detection part 1200 has a function of, at a given cycle, sampling power of a spatial radio signal in a packet transmission period that the transmission part 1100 transmits a packet.

The collision detection part 1300 has a function of calculating, as an index value, at least one of the average value and the degree of variation of power of a spatial radio signal in the packet transmission period on the basis of sampled data obtained by sampling by the power detection part 1200. Moreover, the collision detection part 1300 has a function of determining a reference value on the basis of the transmission power of packets. Moreover, the collision detection part 1300 has a function of comparing the index value with the reference value, thereby detecting whether or not packet collision is present.

The transmission part 1100, the power detection part 1200, and the collision detection part 1300 can be realized by a program-controlled CPU, for example.

The communication device 1000 according to this exemplary embodiment configured as described above operates in the following manner. First, the transmission part 1100 transmits a packet by radio and, at a given cycle, the power detection part 1200 samples the power of a spatial radio signal in a packet transmission period that the transmission part 1100 transmits packets.

Next, the collision detection part 1300 calculates, as an index value, at least one of the average value and the degree of variation of the power of the spatial radio signal in the packet transmission time on the basis of sampled data obtained by sampling by the power detection part 1200. Next, the collision detection part 1300 determines a reference value on the basis of the transmission power of packets. Next, the collision detection part 1300 detects whether or not packet collision is present by comparing the index value with the reference value. To be specific, for example, the collision detection part 1300 detects packet collision is not present when the index value is larger than the reference value, and detects packet collision is present in the other case.

According to this exemplary embodiment, even when the transmission power of the transmission device changes, it is possible to correctly detect whether or not packet collision is present. This is because a reference value to be compared with an index value is determined on the basis of the transmission power of packets.

<Supplementary Notes>

The whole or part of the exemplary embodiments disclosed above can be described as, but not limited to, the following supplementary notes.

(Supplementary Note 1)

A collision detection device in a communication device having a transmission device transmitting a packet by radio, the collision detection device detecting collision of the transmitted packet with another packet, the collision detection device comprising:

a power detection part performing, at a given cycle, sampling of power of a spatial radio signal in a packet transmission period during which the transmission device transmits the packet; and a collision detection part calculating, as an index value, at least one of an average value and a degree of variation of power of the spatial radio signal in the packet transmission period on a basis of sampled data obtained in the sampling, and also determining a reference value on a basis of transmission power of the packet, and detecting whether or not collision of the packet is present by comparing the index value with the reference value.

(Supplementary Note 2)

The collision detection device according to Supplementary Note 1, comprising a reference value storage part storing the transmission power of the packet and the reference value in association with each other, wherein the collision detection part acquires transmission power of the packet from the transmission device, and acquires the reference value stored in the reference value storage part in association with the acquired transmission power of the packet.

(Supplementary Note 3)

The collision detection device according to Supplementary Note 1 or 2, wherein:

the transmission device outputs starting time of transmission of the packet and ending time of transmission of the packet to the collision detection part; and the collision detection part calculates the index value on a basis of the sampled data obtained in the sampling by the power detection part during a period between the starting time of transmission and the ending time of transmission.

(Supplementary Note 4)

The collision detection device according to Supplementary Note 1 or 2, wherein:

the transmission device outputs a transmission start signal when starting transmission of the packet, and outputs a transmission end signal when ending transmission of the packet;

the power detection part performs the sampling of power of the spatial radio signal during a period between output of the transmission start signal and output of the transmission end signal; and the collision detection part calculates the index value on a basis of the sampled data obtained in the sampling by the power detection part.

(Supplementary Note 5)

The collision detection device according to Supplementary Note 1 or 2, wherein:

the transmission device outputs a transmission start signal before starting transmission of the packet, and outputs a transmission end signal when ending transmission of the packet;

the power detection part performs the sampling of power of the spatial radio signal during a period between output of the transmission start signal and output of the transmission end signal; and the collision detection part compares a first threshold having a larger value than a clear channel assessment level with the sampled data obtained in the sampling by the power detection part, and calculates the index value on a basis of each of sampled data from the sampled data first exceeding the first threshold to the sampled data last exceeding the first threshold.

(Supplementary Note 6)

The collision detection device according to Supplementary Note 1 or 2, comprising an average value calculation part, wherein:

the transmission device outputs a transmission start signal before starting transmission of the packet, and outputs a transmission end signal when ending transmission of the packet;

the power detection part performs the sampling of power of the spatial radio signal during a period between output of the transmission start signal and output of the transmission end signal;

the average value calculation part puts the sampled data obtained in the sampling by the power detection part into groups and calculates average values for the respective groups, the groups each including N pieces (N is an integer equal to or more than 2) of the adjacent sampled data; and the collision detection part compares a first threshold having a larger value than a clear channel assessment level with the average values of the respective groups, and calculates the index value on a basis of each of average values from an average value first exceeding the first threshold to an average value last exceeding the first threshold.

(Supplementary Note 7)

The collision detection device according to Supplementary Note 1 or 2, comprising an envelope extraction part, wherein:

the transmission device executes a process of outputting a transmission start signal before starting transmission of the packet, a process of outputting a transmission end signal when ending transmission of the packet, and a process of outputting a transmission time necessary for transmitting the packet;

the power detection part performs the sampling of power of the spatial radio signal during a period between output of the transmission start signal and output of the transmission end signal;

the envelope extraction part executes:

a process of calculating a number of sampled data corresponding to the packet on a basis of the transmission time of the packet and a sampling frequency of the power detection part;

a process of finding two positive integers N and M which make a result of multiplication thereof become the calculated number of the sampled data;

a process of putting the sampled data obtained in the sampling by the power detection part into groups and calculating average values for the respective groups, the groups each including N pieces of the adjacent sampled data;

a process of, on a basis of the calculated average values for the respective groups, a first threshold more than a clear channel assessment level and a second threshold more than the first threshold, detecting a portion including M pieces of consecutive average values equal to more than the first threshold from chronological data of the average values of the respective groups and, among the average values of the respective groups included in the detected portion, replacing average values less than the second threshold with an average value thereof and replacing average values equal to or more than the second threshold with an average value thereof; and a process of taking a difference of adjacent average values in the chronological data of the average values after the replacing process, and thereby generating chronological difference data representing an amount of change of power of the spatial radio signal and a direction of the change; and the collision detection part calculates the index value and detects whether or not collision of the packet is present, on a basis of the chronological difference data generated by the envelope extraction part.

(Supplementary Note 8)

The collision detection device according to Supplementary Note 1 or 2, comprising an envelope extraction part, wherein:

the transmission device executes a process of outputting a transmission start signal when starting transmission of the packet, a process of outputting a transmission end signal when ending transmission of the packet, and a process of outputting a transmission time necessary for transmitting the packet;

the power detection part starts the sampling of power of the spatial radio signal upon receiving the transmission start signal, ends the sampling of power of the spatial radio signal upon receiving the transmission end signal, and calculates a number of unsampled data on a basis of reception time of receiving the transmission start signal, starting time of the sampling of the spatial radio signal and a sampling frequency, the number of the unsampled data being a number of data which should be sampled during a not-sampling period between the reception time and the starting time of the sampling;

the envelope extraction part executes:

a process of calculating a number of sampled data of a packet portion sampled by the power detection part, on a basis of the number of the unsampled data calculated by the power detection part, the transmission time of the packet and a sampling frequency of the power detection part;

a process of calculating two positive integers N and M which make a result of multiplication thereof become the calculated number of the sampled data;

a process of putting the sampled data obtained in the sampling by the power detection part into groups and calculating average values for the respective groups, the groups each including N pieces of the adjacent sampled data;

a process of, on a basis of the calculated average values for the respective groups, a first threshold more than a clear channel assessment level and a second threshold more than the first threshold, detecting a portion including M pieces of consecutive average values equal to more than the first threshold from chronological data of the average values of the respective groups and, among the average values of the respective groups included in the detected portion, replacing average values less than the second threshold with an average value thereof and replacing average values equal to or more than the second threshold with an average value thereof; and a process of taking a difference of adjacent average values in the chronological data of the average values after the replacing process, and thereby generating chronological difference data representing an amount of change of power of the spatial radio signal and a direction of the change; and the collision detection part calculates the index value and detects whether or not collision of the packet is present, on a basis of the chronological difference data generated by the envelope extraction part.

(Supplementary Note 9)

The collision detection device according to Supplementary Note 1 or 2, comprising an envelope extraction part, wherein:

the transmission device outputs a transmission time necessary for transmitting the packet;

the power detection part starts the sampling of power of the spatial radio signal upon receiving the transmission time, and ends the sampling of power of the spatial radio signal at predetermined timing;

the envelope extraction part executes:

a process of calculating a number of sampled data corresponding to the packet on a basis of the transmission time of the packet and a sampling frequency of the power detection part;

a process of finding two positive integers N and M which make a result of multiplication thereof become the calculated number of the sampled data;

a process of putting the sampled data obtained in the sampling by the power detection part into groups and calculating average values for the respective groups, the groups each including N pieces of the adjacent sampled data;

a process of, on a basis of the calculated average values for the respective groups, a first threshold more than a clear channel assessment level and a second threshold more than the first threshold, detecting a portion including M pieces of consecutive average values equal to more than the first threshold from chronological data of the average values of the respective groups and, among the average values of the respective groups included in the detected portion, replacing average values less than the second threshold with an average value thereof and replacing average values equal to or more than the second threshold with an average value thereof; and a process of taking a difference of adjacent average values in the chronological data of the average values after the replacing process, and thereby generating chronological difference data representing an amount of change of power of the spatial radio signal and a direction of the change; and the collision detection part calculates the index value and detects whether or not collision of the packet is present, on a basis of the chronological difference data generated by the envelope extraction part.

(Supplementary Note 10)

A communication device comprising:

a transmission part transmitting a packet by radio;

a power detection part performing, at a given cycle, sampling of power of a spatial radio signal in a packet transmission period during which the transmission part transmits the packet; and a collision detection part calculating, as an index value, at least one of an average value and a degree of variation of power of the spatial radio signal in the packet transmission period on a basis of sampled data obtained in the sampling by the power detection part, and also determining a reference value on a basis of transmission power of the packet, and detecting whether or not collision of the packet is present by comparing the index value with the reference value.

(Supplementary Note 11)

The communication device according to Supplementary Note 10, comprising:

a reference value storage part storing the transmission power of the packet and the reference value in association with each other, wherein the collision detection part acquires transmission power of the packet from the transmission device, and acquires the reference value stored in the reference value storage part in association with the acquired transmission power of the packet.

(Supplementary Note 12)

The communication device according to Supplementary Note 10 or 11, wherein:

the transmission part outputs starting time of transmission of the packet and ending time of transmission of the packet to the collision detection part; and the collision detection part calculates the index value on a basis of the sampled data obtained in the sampling by the power detection part during a period between the starting time of transmission and the ending time of transmission.

(Supplementary Note 13)

The communication device according to Supplementary Note 10 or 11, wherein:

the transmission part outputs a transmission start signal when starting transmission of the packet, and outputs a transmission end signal when ending transmission of the packet;

the power detection part performs the sampling of power of the spatial radio signal during a period between output of the transmission start signal and output of the transmission end signal; and the collision detection part calculates the index value on a basis of the sampled data obtained in the sampling by the power detection part.

(Supplementary Note 14)

A packet collision detection method executed by a communication device transmitting a packet by radio, the packet collision detection method comprising:

performing sampling of power of a spatial radio signal in a packet transmission period during which the packet is transmitted;

calculating, as an index value, at least one of an average value and a degree of variation of power of the spatial radio signal in the packet transmission period on a basis of sampled data obtained in the sampling;

determining a reference value on a basis of transmission power of the packet; and detecting whether or not collision of the packet with another packet is present by comparing the index value with the reference value.

(Supplementary Note 15)

The packet collision detection method according to Supplementary Note 14, wherein:

the communication device has a reference value storage part storing the transmission power of the packet and the reference value in association with each other, the packet collision detection method comprising:

in determining the reference value, acquiring transmission power of the packet, and acquiring the reference value stored in the reference value storage part in association with the acquired transmission power of the packet.

(Supplementary Note 16)

The packet collision detection method according to Supplementary Note 14 or 15, comprising:

in calculating the index value, calculating the index value on a basis of the sampled data obtained in the sampling during a period between starting time of transmission of the packet and ending time of transmission of the packet.

(Supplementary Note 17)

The packet collision detection method according to Supplementary Note 14 or 15, comprising:

in sampling the power, starting the sampling of power of the spatial radio signal when starting transmission of the packet, and ending the sampling when ending transmission of the packet.

(Supplementary Note 18)

A program comprising instructions for causing a computer to function as:

a transmission part transmitting a packet by radio;

a power detection part performing, at a given cycle, sampling of power of a spatial radio signal in a packet transmission period during which the transmission part transmits the packet; and a collision detection part calculating, as an index value, at least one of an average value and a degree of variation of power of the spatial radio signal in the packet transmission period on a basis of sampled data obtained in the sampling by the power detection part, and also determining a reference value on a basis of transmission power of the packet, and detecting whether or not collision of the packet is present by comparing the index value with the reference value.

(Supplementary Note 19)

The program according to Supplementary Note 18, wherein:

the computer has a reference value storage part storing transmission power of the packet and the reference value in association with each other; and the collision detection part acquires transmission power of the packet from the transmission part, and acquires the reference value stored in the reference value storage part in association with the acquired transmission power of the packet.

(Supplementary Note 20)

The program according to Supplementary Note 18 or 19, wherein:

the transmission part outputs starting time of transmission of the packet and ending time of transmission of the packet to the collision detection part; and the collision detection part calculates the index value on a basis of the sampled data obtained in the sampling by the power detection part during a period between the starting time of transmission and the ending time of transmission.

(Supplementary Note 21)

The program according to Supplementary Note 18 or 19, wherein:

the transmission part outputs a transmission start signal when starting transmission of the packet, and outputs a transmission end signal when ending transmission of the packet;

the power detection part performs the sampling of power of the spatial radio signal during a period between output of the transmission start signal and output of the transmission end signal; and the collision detection part calculates the index value on a basis of the sampled data obtained in the sampling by the power detection part.

(Supplementary Note 22)

The communication device according to Supplementary Note 10 or 11, wherein:

the transmission part outputs a transmission start signal when starting transmission of the packet, and outputs a transmission end signal when ending transmission of the packet;

the power detection part performs the sampling of power of the spatial radio signal during a period between output of the transmission start signal and output of the transmission end signal; and the collision detection part calculates the index value on a basis of the sampled data obtained in the sampling by the power detection part.

The present invention is based upon and claims the benefit of priority from Japanese patent application No. 2013-223060, filed on Oct. 28, 2013 and Japanese patent application No. 2014-026462, filed on Feb. 14, 2014, the disclosure of which is incorporated herein in its entirety by reference.

INDUSTRIAL APPLICABILITY

The present invention can be utilized in detection of packet collision in a wireless LAN.

DESCRIPTION OF NUMERALS

10 communication device
11 transmission device
111 transmission part
112 clock
113 information management part
114 storage device
115 transmission parameter storage part
116 antenna
12 collision detection device
121 power detection part
122 clock
123 collision detection part
124 storage device
125 sampled data storage part
126 threshold storage part
127 antenna
20 communication device
21 transmission device
211 transmission part
212 transmission power management part
213 antenna
22 collision detection device
221 power detection part
222 collision detection part
223 storage device
224 sampled data storage part
225 threshold storage part
226 antenna
30 communication device
31 transmission device
311 transmission part
312 transmission power management part
32 collision detection device
321 power detection part
322 average value calculation part
323 collision detection part
324 storage device
325 sampled data storage part
326 threshold storage part
327 antenna
40 communication device
41 transmission device
411 transmission part
412 transmission power management part
42 collision detection device
421 power detection part
422 average value calculation part
423 collision detection part
424 storage device
425 sampled data storage part
426 threshold storage part
427 antenna
70 communication device
71 transmission device
711 transmission part
712 clock
713 information management part
714 storage device
715 parameter storage part
716 antenna
72 collision detection device
721 power detection part
722 clock
723 envelope extraction part
724 collision detection part
725 storage device
726 sampled data storage part
727 threshold storage part
728 antenna

The invention claimed is:

1. A collision detection device in a communication device having a transmission device configured to transmit a packet by radio, the collision detection device configured to detect a collision of the transmitted packet with another packet, the collision detection device comprising:

an antenna configured to receive a spatial radio signal;

a processor for executing instructions that cause the processor to:

at a given cycle, perform sampling of power of the spatial radio signal in a packet transmission period during which the transmission device transmits the packet, calculate, as an index value, at least one of an average value and a degree of variation of power of the spatial radio signal in the packet transmission period based on sampled data obtained in the sampling, determine a reference value based on a transmission power of the packet, and compare the index value with the reference value to detect whether or not a collision of the packet is present; and storage configured to store the sampled data and the reference value.

2. The collision detection device according to claim 1, wherein:

the storage is configured to store the transmission power of the packet and the reference value in association with each other, and the processor is further configured to acquire transmission power of the packet from the transmission device, and acquire the reference value stored in the storage in association with the acquired transmission power of the packet.

3. The collision detection device according to claim 1, wherein:

the transmission device is configured to output starting time of transmission of the packet and ending time of transmission of the packet to the collision detector; and the processor is configured to calculate the index value based on the sampled data obtained in the sampling during a period between the starting time of transmission and the ending time of transmission.

4. The collision detection device according to claim 1, wherein:

the transmission device is configured to output a transmission start signal when starting transmission of the packet, and output a transmission end signal when ending transmission of the packet;

the processor is configured to perform the sampling of power of the spatial radio signal during a period between output of the transmission start signal and output of the transmission end signal; and calculate the index value based on the sampled data obtained in the sampling.

5. The collision detection device according to claim 1, wherein:

the transmission device is configured to output a transmission start signal before starting transmission of the packet, and output a transmission end signal when ending transmission of the packet;

the processor is configured to perform the sampling of power of the spatial radio signal during a period between output of the transmission start signal and output of the transmission end signal, and compare a first threshold having a larger value than a clear channel assessment level with the sampled data obtained in the sampling, and calculate the index value based on each of sampled data from the sampled data first exceeding the first threshold to the sampled data last exceeding the first threshold.

6. The collision detection device according to claim 1, wherein:

the transmission device is configured to output a transmission start signal before starting transmission of the packet, and output a transmission end signal when ending transmission of the packet; and the processor is configured to:

perform the sampling of power of the spatial radio signal during a period between output of the transmission start signal and output of the transmission end signal;

put the sampled data obtained in the sampling by the power detector into groups and calculate average values for the respective groups, the groups each including N pieces (N is an integer equal to or more than 2) of the adjacent sampled data; and compare a first threshold having a larger value than a clear channel assessment level with the average values of the respective groups, and calculate the index value based on each of average values from an average value first exceeding the first threshold to an average value last exceeding the first threshold.

7. The collision detection device according to claim 1, wherein:

the transmission device is configured to output a transmission start signal before starting transmission of the packet, output a transmission end signal when ending transmission of the packet, and output a transmission time necessary for transmitting the packet; and the processor is configured to:

perform the sampling of power of the spatial radio signal during a period between output of the transmission start signal and output of the transmission end signal;

calculate a number of sampled data corresponding to the packet based on the transmission time of the packet and a sampling frequency of the power detector;

find two positive integers N and M which make a result of multiplication thereof become the calculated number of the sampled data;

put the sampled data obtained in the sampling by the power detector into groups and calculate average values for the respective groups, the groups each including N pieces of the adjacent sampled data;

based on the calculated average values for the respective groups, a first threshold more than a clear channel assessment level and a second threshold more than the first threshold, detect M pieces of consecutive average values equal to more than the first threshold from chronological data of the average values of the respective groups, and replace average values less than the second threshold among the average values of the respective groups included in the M pieces, with an average value of the average values less than the second threshold, and replace average values equal to or more than the second threshold among the average values of the respective groups included in the M pieces, with an average value of the average values equal to or more than the second threshold;

take a difference of adjacent average values in the chronological data of the average values after replaced, and generate chronological difference data representing an amount of change of power of the spatial radio signal and a direction of the change based on the difference of adjacent average values;

calculate the index value and detect whether or not collision of the packet is present, based on the chronological difference data generated by the envelope extractor.

8. The collision detection device according to claim 1, wherein:

the transmission device is configured to output a transmission start signal when starting transmission of the packet, output a transmission end signal when ending transmission of the packet, and output a transmission time necessary for transmitting the packet; and the processor is configured to start the sampling of power of the spatial radio signal upon receiving the transmission start signal, end the sampling of power of the spatial radio signal upon receiving the transmission end signal, and calculate a number of unsampled data based on reception time of receiving the transmission start signal, starting time of the sampling of the spatial radio signal and a sampling frequency, the number of the unsampled data being a number of data which should be sampled during a not-sampling period between the reception time and the starting time of the sampling;

calculate a number of sampled data sampled by the power detector within the transmission time of the packet, based on the number of the unsampled data calculated by the power detector, the transmission time of the packet and a sampling frequency of the power detector;

calculate two positive integers N and M which make a result of multiplication thereof become the calculated number of the sampled data;

put the sampled data obtained in the sampling by the power detector into groups and calculate average values for the respective groups, the groups each including N pieces of the adjacent sampled data;

based on the calculated average values for the respective groups, a first threshold more than a clear channel assessment level and a second threshold more than the first threshold, detect M pieces of consecutive average values equal to more than the first threshold from chronological data of the average values of the respective groups, and replace average values less than the second threshold among the average values of the respective groups included in the M pieces, with an average value of the average values less than the second threshold, and replace average values equal to or more than the second threshold among the average values of the respective groups included in the M pieces, with an average value of the average values equal to or more than the second threshold;

take a difference of adjacent average values in the chronological data of the average values after replaced, and generate chronological difference data representing an amount of change of power of the spatial radio signal and a direction of the change based on the difference of adjacent average values; and calculate the index value and detect whether or not collision of the packet is present, based on the chronological difference data generated by the envelope extractor.

9. The collision detection device according to claim 1, wherein:

the transmission device is configured to output a transmission time necessary for transmitting the packet; and the processor is configured to start the sampling of power of the spatial radio signal upon receiving the transmission time, and end the sampling of power of the spatial radio signal at predetermined timing;

calculate a number of sampled data corresponding to the packet based on the transmission time of the packet and a sampling frequency of the power detector;

find two positive integers N and M which make a result of multiplication thereof become the calculated number of the sampled data;

put the sampled data obtained in the sampling by the power detector into groups and calculate average values for the respective groups, the groups each including N pieces of the adjacent sampled data;

based on the calculated average values for the respective groups, a first threshold more than a clear channel assessment level and a second threshold more than the first threshold, detect M pieces of consecutive average values equal to more than the first threshold from chronological data of the average values of the respective groups, and replace average values less than the second threshold among the average values of the respective groups included in the M pieces, with an average value of the average values less than the second threshold, and replace average values equal to or more than the second threshold among the average values of the respective groups included in the M pieces, with an average value of the average values equal to or more than the second threshold;

take a difference of adjacent average values in the chronological data of the average values after replaced, and generate chronological difference data representing an amount of change of power of the spatial radio signal and a direction of the change based on the difference of adjacent average values; and calculate the index value and detect whether or not collision of the packet is present, based on the chronological difference data generated by the envelope extractor.

10. A communication device comprising:

a transmitter configured to transmit a packet by radio;

an antenna configured to receive a spatial radio signal;

a processor;

configured to, at a given cycle, perform sampling of power of the spatial radio signal in a packet transmission period during which the transmitter transmits the packet, and calculate, as an index value, at least one of an average value and a degree of variation of power of the spatial radio signal in the packet transmission period based on sampled data obtained in the sampling by the power detector, determine a reference value based on transmission power of the packet, and then compare the index value with the reference value in order to detect whether or not collision of the packet is present; and storage configured to store the sampled data and the reference value.

11. The communication device according to claim 10, wherein the:

storage is configured to store the transmission power of the packet and the reference value in association with each other, wherein the processor is configured to acquire transmission power of the packet from the transmission device, and acquire the reference value stored in the storage in association with the acquired transmission power of the packet.

12. The communication device according to claim 10, wherein:

the transmitter is configured to output starting time of transmission of the packet and ending time of transmission of the packet to the collision detector; and the processor is configured to calculate the index value based on the sampled data obtained in the sampling by the power detector during a period between the starting time of transmission and the ending time of transmission.

13. The communication device according to claim 10, wherein:

the transmitter is configured to output a transmission start signal when starting transmission of the packet, and output a transmission end signal when ending transmission of the packet;

the processor is configured to perform the sampling of power of the spatial radio signal during a period between output of the transmission start signal and output of the transmission end signal, and calculate the index value based on the sampled data obtained in the sampling.

14. A packet collision detection method executed by a communication device transmitting a packet by radio, the packet collision detection method comprising:

receiving a spatial radio signal;

performing sampling of power of the spatial radio signal in a packet transmission period during which the packet is transmitted;

calculating, as an index value, at least one of an average value and a degree of variation of power of the spatial radio signal in the packet transmission period based on sampled data obtained in the sampling;

determining a reference value based on transmission power of the packet;

comparing the index value with the reference value in order to detect whether or not collision of the packet with another packet is present; and storing the sampled data and the reference value.

15. The packet collision detection method according to claim 14, wherein:

storage is configured to store the transmission power of the packet and the reference value in association with each other, the packet collision detection method further comprising:

in determining the reference value, acquiring transmission power of the packet, and acquiring the reference value stored in the storage in association with the acquired transmission power of the packet.

16. The packet collision detection method according to claim 14, comprising:

in calculating the index value, calculating the index value based on the sampled data obtained in the sampling during a period between starting time of transmission of the packet and ending time of transmission of the packet.

17. The packet collision detection method according to claim 14, comprising:

in sampling the power, starting the sampling of power of the spatial radio signal when starting transmission of the packet, and ending the sampling when ending transmission of the packet.

* * * * *